United States Patent
Haseba et al.

(10) Patent No.: US 7,722,783 B2
(45) Date of Patent: May 25, 2010

(54) OPTICALLY ISOTROPIC LIQUID CRYSTAL MEDIUM AND OPTICAL DEVICE

(75) Inventors: Yasuhiro Haseba, Chiba (JP); Takafumi Kuninobu, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 0 days.

(21) Appl. No.: 12/274,018

(22) Filed: Nov. 19, 2008

(65) Prior Publication Data

US 2009/0135368 A1 May 28, 2009

(30) Foreign Application Priority Data

Nov. 20, 2007 (JP) ............................. 2007-300694
Sep. 16, 2008 (JP) ............................. 2008-236049

(51) Int. Cl.
| C09K 19/00 | (2006.01) |
| C09K 19/06 | (2006.01) |
| C09K 19/52 | (2006.01) |
| G02F 1/03 | (2006.01) |
| G02F 1/13 | (2006.01) |

(52) U.S. Cl. ............................. 252/299.01; 252/299.66; 252/299.6; 252/299.61; 252/299.62; 252/299.63; 430/20; 428/1.1; 544/242; 349/1; 349/56; 570/128; 568/634

(58) Field of Classification Search ............ 252/299.01, 252/299.6, 299.61–63, 299.66; 430/20; 428/1.1; 544/242; 349/1, 56; 546/184; 570/128; 568/634

See application file for complete search history.

(56) References Cited

U.S. PATENT DOCUMENTS

2008/0280071 A1* 11/2008 Kikuchi et al. ............... 428/1.1
2009/0059157 A1* 3/2009 Haseba et al. ............... 349/182

FOREIGN PATENT DOCUMENTS

| JP | 2003-327966 | 11/2003 |
| JP | 2005-157109 | 6/2005 |
| JP | 2005-336477 | 12/2005 |
| JP | 2006-506477 | 2/2006 |
| JP | 2006-506515 | 2/2006 |
| JP | 2006-089622 | 4/2006 |
| JP | 2006-127707 | 5/2006 |
| JP | 2006-225655 | 8/2006 |
| JP | 2006-299084 | 11/2006 |
| WO | 2005-080529 | 9/2005 |
| WO | 2005-090520 | 9/2005 |
| WO | 2006/063662 | 6/2006 |

OTHER PUBLICATIONS

Article Titled "Polymer-Stabilized Liquid Crystal Blue Phases" jointly authored by Kikuchi et al., in Nature Materials, vol. 1, 2002. (pp. 64).
Article Titled "Large Electro-Optic Kerr Effect in Polymer-Stabilized Liquid-Crystalline Blue Phases" jointly authored by Hisakado et al., in Advanced Materials, vol. 17, 2005. (pp. 96).
Article Titled "Electro-Optic Effects of the Optically Isotropic State Induced by the Incorporative Effects of a Polymer Network and the Chirality of Liquid Crystal" jointly authored by Haseba et al., in Journal of the SID, vol. 14/6, 200. (pp. 551).

* cited by examiner

*Primary Examiner*—Geraldina Visconti
(74) *Attorney, Agent, or Firm*—J.C. Patents

(57) ABSTRACT

A liquid crystal medium is described, which has a wide temperature range of a liquid crystal phase, a large optical anisotropy and a large dielectric anisotropy and exhibits an optically isotropic liquid crystal phase. The liquid crystal medium is characterized in including a chiral dopant and a liquid crystal compound with a chlorophenyl ring and exhibiting an optically isotropic liquid crystal phase.

50 Claims, 2 Drawing Sheets

OPTICALLY ISOTROPIC LIQUID CRYSTAL MEDIUM AND OPTICAL DEVICE

CROSS-REFERENCE TO RELATED APPLICATION

This application claims the priority benefits of Japanese application serial no. 2008-236049, filed on Sep. 16, 2008. The prior application claims the priority benefits of Japanese application serial no. 2007-300694, filed on Nov. 20, 2007. The entirety of the above-mentioned patent applications is hereby incorporated by reference herein and made a part of this specification.

BACKGROUND OF THE INVENTION

1. Field of the Invention

This invention relates to a liquid crystal medium useful as a material for an optical device, and in particular, to a liquid crystal medium having a wide temperature range of a liquid crystal phase, a large dielectric anisotropy and a large refractive index anisotropy. This invention also relates to an optical device using the liquid crystal medium, and particularly to an optical device that can be used in a wide temperature range and driven at a low voltage and can achieve a high-speed electrooptical response.

2. Description of Related Art

Liquid crystal display (LCD) devices utilizing liquid crystal compositions are widely used in displays of clocks, calculators, word processors and so on. These LCD devices utilize the optical anisotropy and dielectric anisotropy, etc. of liquid crystal compounds. The operation modes of the LCD devices mainly include phase change (PC), twisted nematic (TN), super twisted nematic (STN), bistable twisted nematic (BTN), electrically controlled birefringence (ECB), optically compensated bend (OCB), in-plane switching (IPS), and vertical alignment (VA) and so on, which utilize one or more polarizers for display. Moreover, in recent years, more attention has been paid to the mode where an electric field is applied to an optically isotropic liquid crystal phase to induce electric birefringence (Patent References 1-9/Non-patent References 1-3).

Moreover, wavelength tunable filters, wavefront control devices, liquid crystal lenses, aberrational correction devices, aperture control devices and optical head devices etc. that utilize the electric birefringence in a blue phase as one of the optically isotropic liquid crystal phases have been proposed (Patent References 10-12).

According to the driving mode, LCD devices can be classified into passive matrix (PM) and active matrix (AM) types. The PM type is further classified into static type and multiplex type etc., and the AM type is further classified into thin film transistor (TFT) type, metal insulator metal (MIM) type and so on.

Such LCD devices contain liquid crystal compositions having suitable properties. To improve the characteristics of an LCD device, the liquid crystal composition preferably has suitable properties. A liquid crystal compound as a component of a liquid crystal composition needs to have the following general properties:
(1) chemical stability and physical stability;
(2) a high clearing point (phase transition temperature from the liquid crystal phase to the isotropic phase);
(3) a low lower-limit temperature of a liquid crystal phase (nematic phase, cholesteric phase, smectic phase, optically isotropic liquid crystal phase like blue phase, etc.);
(4) good compatibility with other liquid crystal compounds;
(5) a suitable dielectric anisotropy; and
(6) a suitable optical anisotropy.

Particularly, for an optically isotropic liquid crystal phase, a liquid crystal compound having a large dielectric anisotropy and a large optical anisotropy is preferred from the viewpoint of lowering the driving voltage.

When a composition containing a liquid crystal compound having chemical and physical stability ($1^{st}$ property) is used in an LCD device, the voltage holding ratio is improved.

Further, a liquid crystal composition containing a liquid crystal compound with a high clearing point or a low lower-limit temperature of a liquid crystal phase ($2^{nd}$ and $3^{rd}$ properties) can have a wide temperature range of a nematic phase or optically isotropic liquid crystal phase, and thus can be used in a display device in a wide temperature range. A liquid crystal compound is generally mixed with a number of other liquid crystal compounds to prepare a liquid crystal composition, so as to exhibit better properties that are difficult to develop by a single compound. Therefore, a liquid crystal compound having good compatibility with other liquid crystal compounds ($4^{th}$ property) is preferably used in an LCD device. In recent years, LCD devices with superior properties, especially display performances like contrast, display capacity, response time and so on, are required. In addition, regarding the liquid crystal material used, a liquid crystal composition having a low driving voltage is required. Further, in order to drive at low voltage an optical device that is driven in an optically isotropic liquid crystal phase, a liquid crystal compound with a large dielectric anisotropy and a large optical anisotropy is preferred.

The optically isotropic polymer/liquid crystal composite materials disclosed in Patent References 1-3 and Non-Patent References 1-3 require high voltages for device operation. Patent References 4-9 disclose optically isotropic liquid crystal compositions and polymer/liquid crystal composite materials being expected to have lower operation voltages; however, the optically isotropic liquid crystal composition and polymer/liquid crystal composite material containing a compound having chlorophenyl moiety according to this invention was not mentioned therein.

[Patent Reference 1] Japanese Patent Publication No. 2003-32796

[Patent Reference 2] International Publication No. 2005/90520

[Patent Reference 3] Japanese Patent Publication No. 2005-336477

[Patent Reference 4] Japanese Patent Publication No. 2006-89622

[Patent Reference 5] Japanese Patent Publication No. 2006-299084

[Patent Reference 6] Japanese Patent Publication No. 2006-506477

[Patent Reference 7] Japanese Patent Publication No. 2006-506515

[Patent Reference 8] International Publication No. 2006/063662

[Patent Reference 9] Japanese Patent Publication No. 2006-225655

[Patent Reference 10] Japanese Patent Publication No. 2005-157109

[Patent Reference 11] International Publication No. 2005/80529

[Patent Reference 12] Japanese Patent Publication No. 2006-127707

[Non-Patent Reference 1] *Nature Materials,* 1, 64, (2002)

[Non-Patent Reference 2] *Adv. Mater.,* 17, 96, (2005)

[Non-Patent Reference 3] *Journal of the SID*, 14, 551, (2006)

SUMMARY OF THE INVENTION

Accordingly, an object of this invention is to provide a liquid crystal medium, which is stable to heat, light and so on, has a wide temperature range of a liquid crystal phase, a large optical anisotropy, a large dielectric anisotropy, and exhibits an optically isotropic liquid crystal phase. Another object of this invention is to provide a variety of optical devices containing the liquid crystal medium, which can be used in a wide temperature range and has a short response time, a high contrast and a low driving voltage.

This invention provides a liquid crystal medium as a liquid crystal composition or a polymer/liquid crystal composite and an optical device containing the liquid crystal medium as follows.

[1] A liquid crystal composition, including a compound of formula (1) and a chiral dopant, and exhibiting an optically isotropic liquid crystal phase.

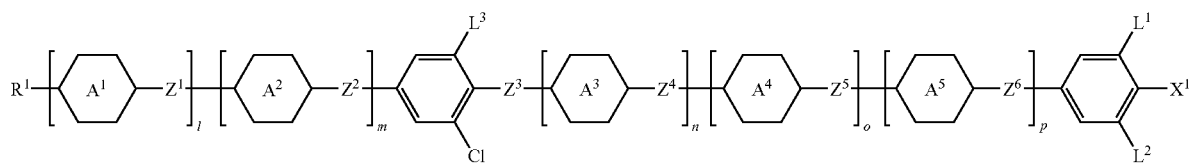

In formula (1), $R^1$ is a hydrogen atom, or $C_{1-20}$ alkyl in which arbitrary —$CH_2$— may be replaced by —O—, —S—, —COO—, —OCO—, —CH=CH—, —CF=CF— or —C≡C— and arbitrary hydrogen atom may be replaced by a halogen atom or $C_{1-3}$ alkyl; the rings $A^1$, $A^2$, $A^3$, $A^4$ and $A^5$ are each independently a benzene ring, a naphthalene ring, a thiophene ring, a piperidine ring, a cyclohexene ring, a bicyclooctane ring, a tetrahydronaphthalene ring or a cyclohexane ring, and in these rings arbitrary hydrogen atom may be replaced by a halogen atom, $C_{1-3}$ alkyl, $C_{1-3}$ alkoxy or $C_{1-3}$ haloalkyl, —$CH_2$— may be replaced by —O— or —S— and —CH= may be replaced by —N=; $Z^1$, $Z^2$, $Z^3$, $Z^4$, $Z^5$ and $Z^6$ are each independently a single bond, or $C_{1-4}$ alkylene in which arbitrary —$CH_2$— may be replaced by —O—, —S—, —COO—, —OCO—, —CSO—, —OCS—, —CH=CH—, —CF=CF— or —C≡C— and arbitrary hydrogen atom may be replaced by a halogen atom; $L^1$, $L^2$ and $L^3$ are each independently a hydrogen atom or a halogen atom; $X^1$ is a hydrogen atom, a halogen atom, —C≡N, —N=C=S, —C=C=C—N, —$SF_5$, or $C_{1-10}$ alkyl in which arbitrary —$CH_2$— may be replaced by —O—, —S—, —CH=CH— or —C≡C— and arbitrary hydrogen atom may be replaced by a halogen atom; l, m, n, o and p are each independently 0 or 1, and $l+m+n+o+p \leq 4$.

[2] The liquid crystal composition of Item [1], where in formula (1), $R^1$ is $C_{1-20}$ alkyl, $C_{2-21}$ alkenyl, $C_{2-21}$ alkynyl, $C_{1-19}$ alkoxy, $C_{2-20}$ alkenyloxy, $C_{1-19}$ alkylthio, $C_{1-19}$ alkenylthio, or —$(CH_2)_v$—CH=$CF_2$, in which v is 0 or an integer of 1-19; and $X^1$ is a hydrogen atom, a halogen atom, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2F$, —CH=$CHCF_3$, —$(CH_2)_2$—CH=$CF_2$, —$CH_2$CH=$CHCF_3$ or —CH=$CHCF_2CF_3$.

[3] The liquid crystal composition of Item [1] or [2], where in formula (1), $Z^1$, $Z^2$, $Z^3$, $Z^4$, $Z^5$ and $Z^6$ are each independently a single bond, —$CH_2CH_2$—, —CH=CH—, —C≡C—, —COO—, —$CF_2$O—, —$CH_2$O— or —$OCH_2$—.

[4] The liquid crystal composition of any one of Items [1]-[3], where the rings $A^1$, $A^2$, $A^3$, $A^4$ and $A^5$ are each independently a group represented by one of formulae (RG-1)-(RG-15), $Y^1$, $Y^2$, $Y^3$ and $Y^4$ are each independently a hydrogen atom or a halogen atom, and fn1, fn2 and fn3 are each independently 0, 1, 2 or 3.

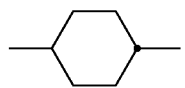 (RG-1)

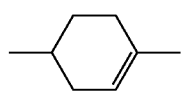 (RG-2)

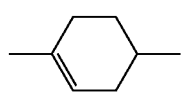 (RG-3)

 (RG-4)

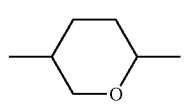 (RG-5)

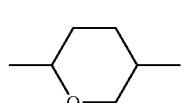 (RG-6)

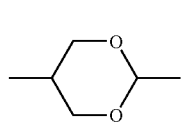 (RG-7)

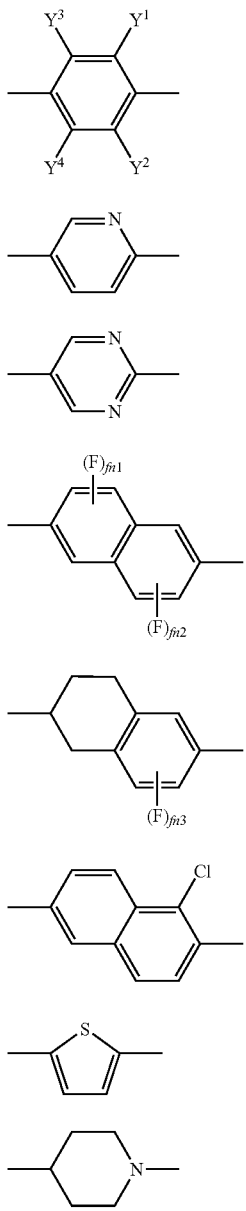
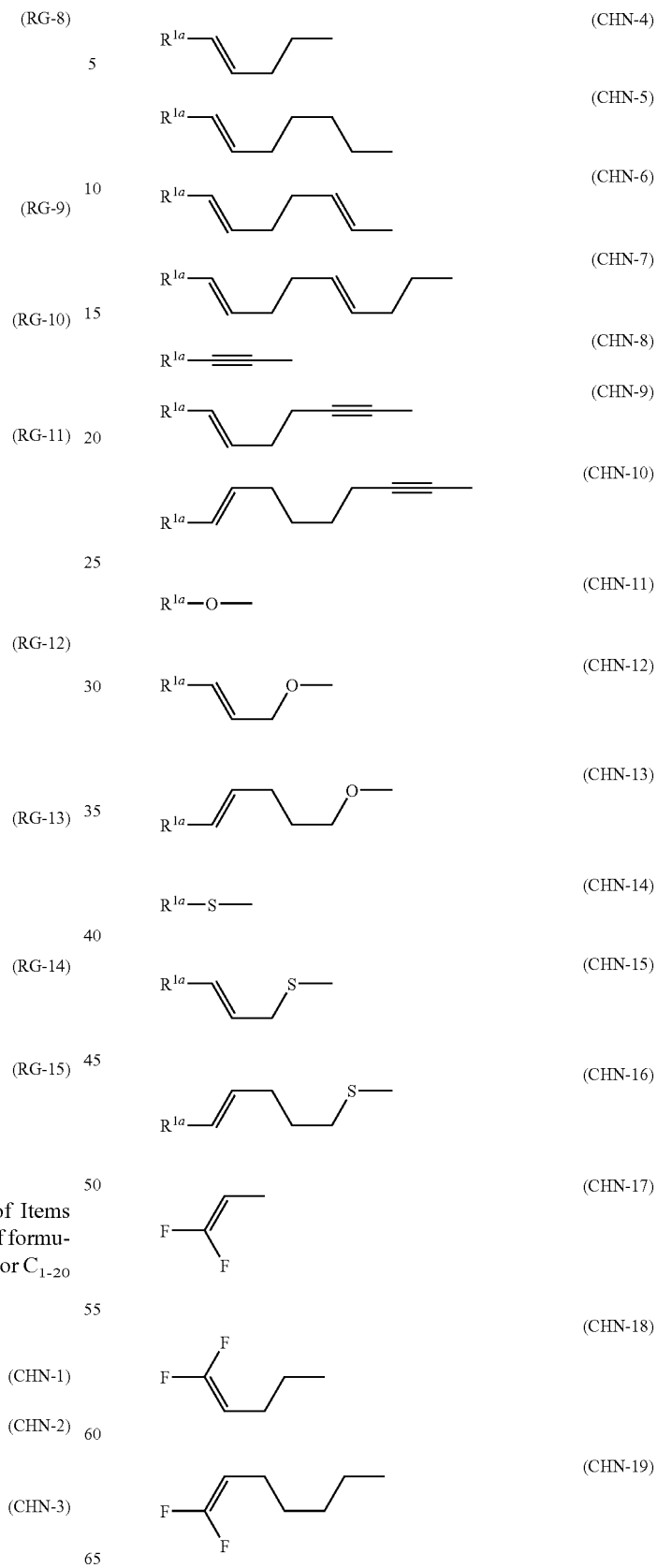
[5] The liquid crystal composition of any one of Items [1]-[4], where $R^1$ is a group represented by any one of formulae (CHN-1)-(CHN-19), and $R^{1a}$ is a hydrogen atom or $C_{1-20}$ alkyl.

[6] The liquid crystal composition of Item [1], including at least one compound selected from the group consisting of the compounds of formulae (1-1)-(1-9).

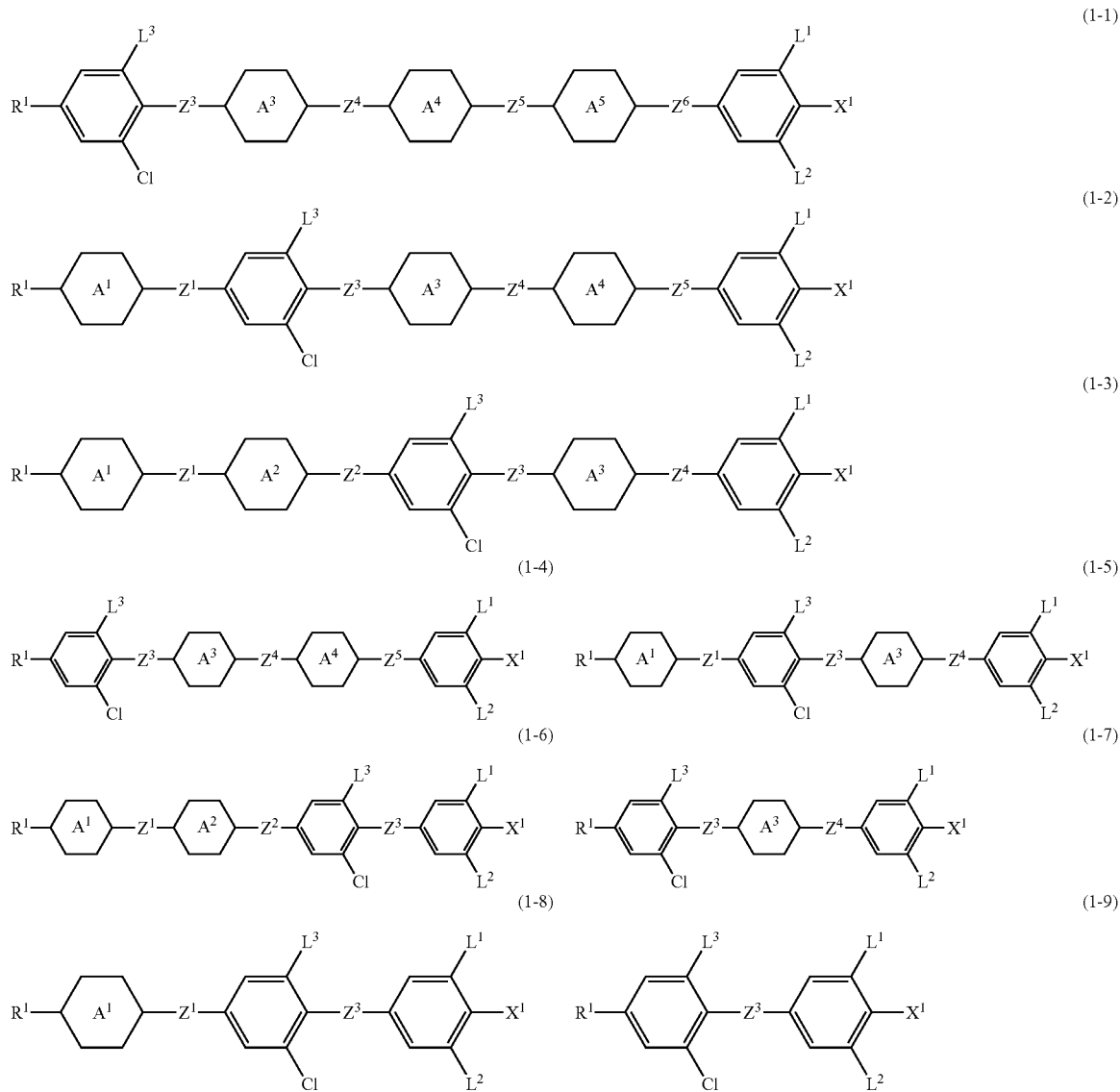

In these formulae, $R^1$ is a group represented by any one of formulae (CHN-1)-(CHN-19), $R^{1a}$ is a hydrogen atom or $C_{1-20}$ alkyl; the rings $A^1$, $A^2$, $A^3$, $A^4$ and $A^5$ are each independently a group represented by any one of formulae (RG-1), (RG-5), (RG-7), (RG-8-1)-(RG-8-5), (RG-9), (RG-10), (RG-11-1), (RG-13) and (RG-15); $Z^1$, $Z^2$, $Z^3$, $Z^4$, $Z^5$ and $Z^6$ are each independently a single bond, —$CH_2CH_2$—, —CH=CH—, —C≡C—, —COO—, —$CF_2O$—, —$CH_2O$— or —$OCH_2$—; $L^1$, $L^2$ and $L^3$ are each independently a hydrogen atom, a fluorine atom or a chlorine atom; and $X^1$ is a fluorine atom, a chlorine atom, —C≡N, —$CF_3$, —$CHF_2$, —$CH_2F$, —$OCF_3$, —$OCHF_2$, —$OCH_2F$ or —C≡C—$CF_3$.

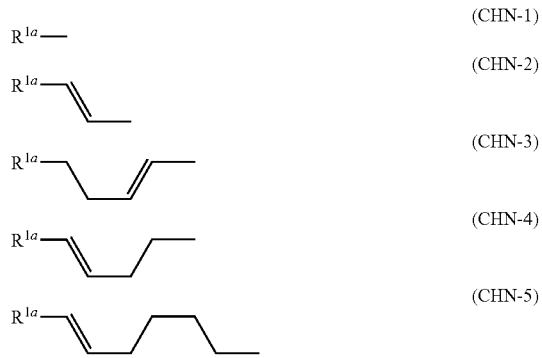

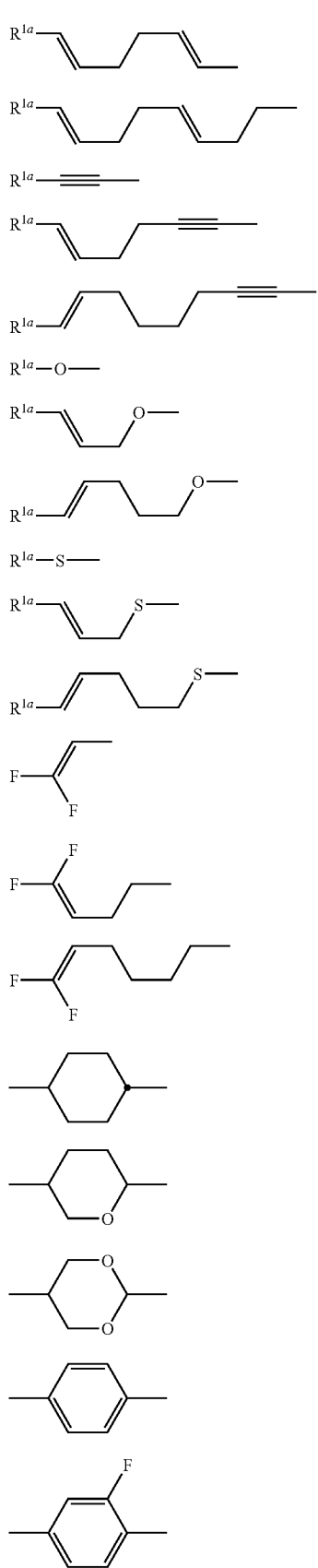
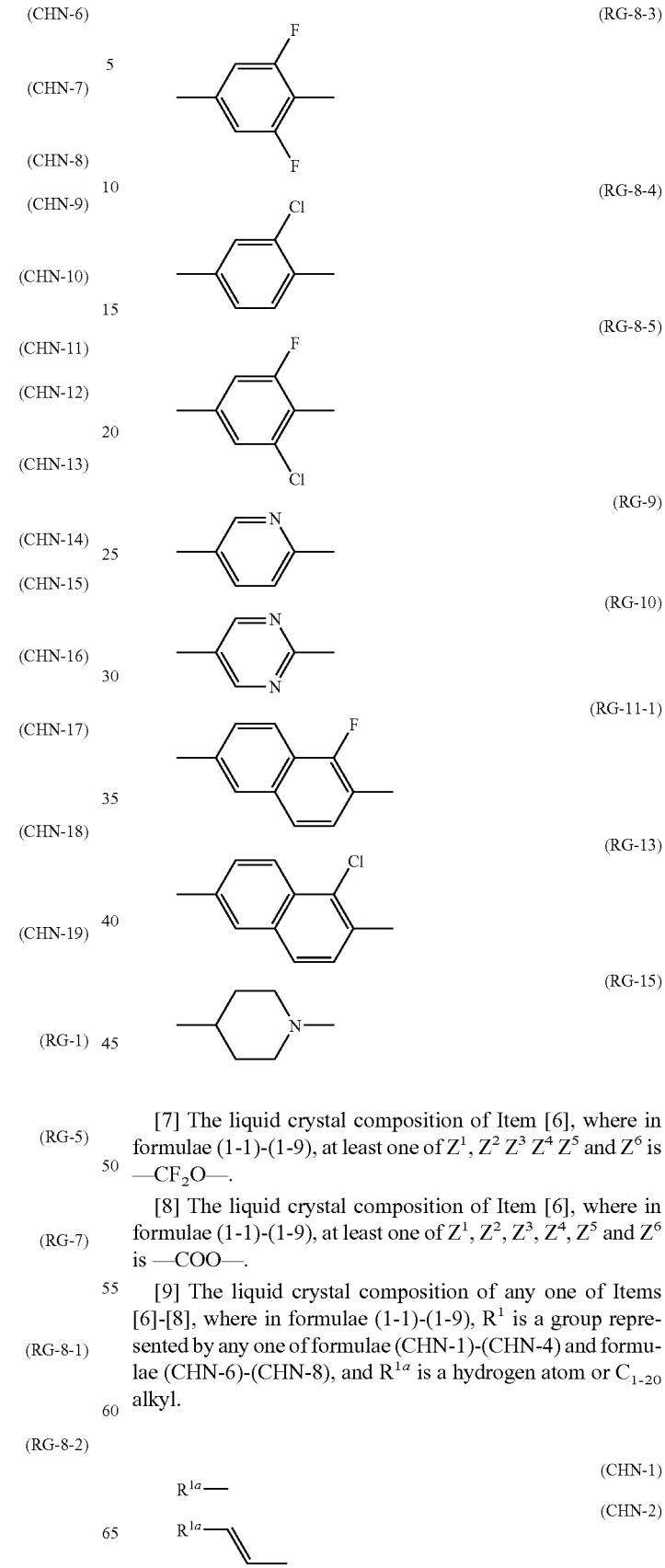

[7] The liquid crystal composition of Item [6], where in formulae (1-1)-(1-9), at least one of $Z^1$, $Z^2$ $Z^3$ $Z^4$ $Z^5$ and $Z^6$ is —CF$_2$O—.

[8] The liquid crystal composition of Item [6], where in formulae (1-1)-(1-9), at least one of $Z^1$, $Z^2$, $Z^3$, $Z^4$, $Z^5$ and $Z^6$ is —COO—.

[9] The liquid crystal composition of any one of Items [6]-[8], where in formulae (1-1)-(1-9), $R^1$ is a group represented by any one of formulae (CHN-1)-(CHN-4) and formulae (CHN-6)-(CHN-8), and $R^{1a}$ is a hydrogen atom or $C_{1-20}$ alkyl.

-continued

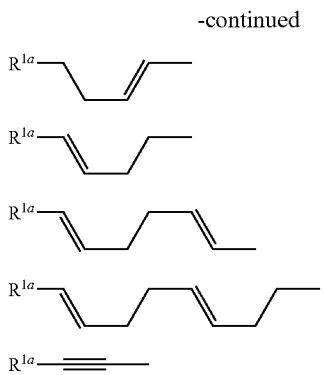

(CHN-3)
(CHN-4)
(CHN-6)
(CHN-7)
(CHN-8)

[10] The liquid crystal composition of any one of Items [1]-[9], further including at least one compound selected from the group consisting of the compounds of formulae (2), (3) and (4).

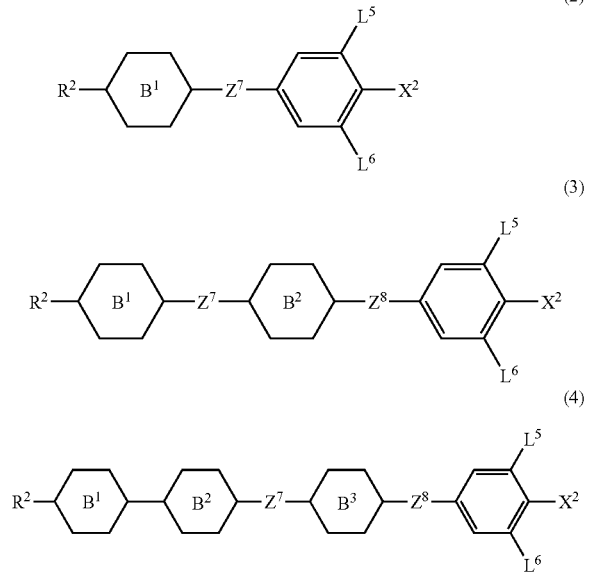

(2)
(3)
(4)

In these formulae, $R^2$ is $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; $X^2$ is a fluorine atom, a chlorine atom, —$OCF_3$, —$OCHF_2$, —$CF_3$, —$CHF_2$, —$CH_2F$, —$OCF_2CHF_2$ or —$OCF_2CHFCF_3$; the rings $B^1$, $B^2$ and $B^3$ are each independently 1,4-cyclohexylene, 1,3-dioxan-2,5-diyl, pyrimidin-2,5-diyl, tetrahydropyran-2,5-diyl, 1,4-phenylene, naphthalene-2,6-diyl, 1,4-phenylene in which arbitrary hydrogen atom is replaced by a fluorine atom, or naphthalene-2,6-diyl in which arbitrary hydrogen atom is replaced by a fluorine atom or a chlorine atom; $Z^7$ and $Z^8$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^5$ and $L^6$ are each independently a hydrogen atom or a fluorine atom.

[11] The liquid crystal composition of any of Items [1]-[9], further including at least one compound selected from a group consisting of the compounds of formula (5).

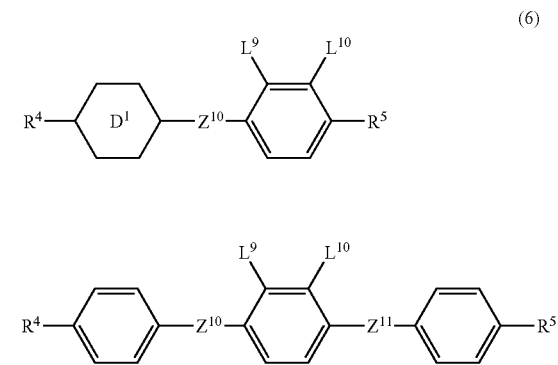

(5)

In the formula, $R^3$ is $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; $X^3$ is —C≡N or —C≡C—C≡N; the rings $C^1$, $C^2$ and $C^3$ are each independently 1,4-cyclohexylene, 1,4-phenylene, 1,4-phenylene in which arbitrary hydrogen atom is replaced by a fluorine atom, naphthalene-2,6-diyl, naphthalene-2,6-diyl in which arbitrary hydrogen atom is replaced by fluorine or chlorine, 1,3-dioxan-2,5-diyl, tetrahydropyran-2,5-diyl or pyrimidin-2,5-diyl; $Z^9$ is —$(CH_2)_2$—, —COO—, —$CF_2O$—, —$OCF_2$—, —C≡C—, —$CH_2O$— or a single bond; $L^7$ and $L^8$ are each independently a hydrogen atom or a fluorine atom; r is 0, 1 or 2, s is 0 or 1, and r+s=0, 1 or 2.

[12] The liquid crystal composition of any one of Items [1]-[9], further including at least one compound selected from the group consisting of the compounds of formulae (6), (7), (8), (9) and (10).

(6)
(7)
(8)

-continued

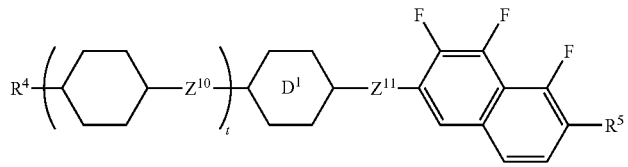
(9)

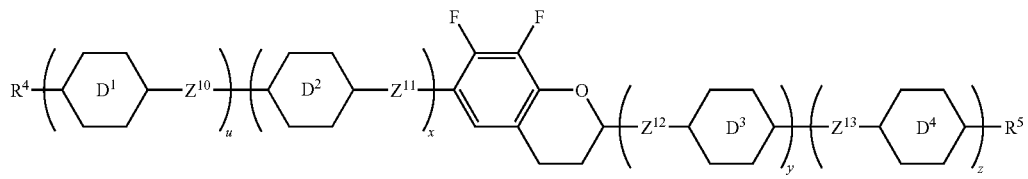
(10)

In these formulae, $R^4$ and $R^5$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $D^1$, $D^2$, $D^3$ and $D^4$ are each independently 1,4-cyclohexylene, 1,4-cyclohexenylene, 1,4-phenylene, 1,4-phenylene in which arbitrary hydrogen atom is replaced by a fluorine atom, tetrahydropyran-2,5-diyl or decahydronaphthalene-2,6-diyl; $Z^{10}$, $Z^{11}$, $Z^{12}$ and $Z^{13}$ are each independently —$(CH_2)_2$—, —COO—, —$CH_2O$—, —$OCF_2$—, —$OCF_2(CH_2)_2$— or a single bond; $L^9$ and $L^{10}$ are each independently a fluorine atom or a chlorine atom; t, u, x, y and z are each independently 0 or 1, and u+x+y+z is equal to 1 or 2.

[13] The liquid crystal composition of any one of Items [1]-[9], further including at least one compound selected from the group consisting of the compounds of formulae (11), (12) and (13).

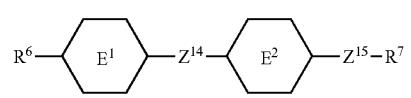
(11)

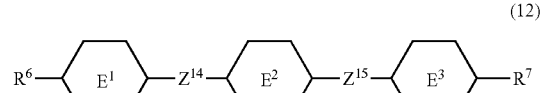
(12)

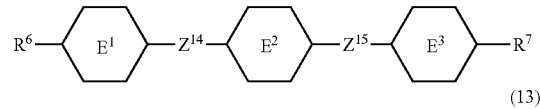
(13)

In this formulae, $R^6$ and $R^7$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; $Z^{14}$ and $Z^{15}$ are each independently —C≡C—, —COO—, —$(CH_2)_2$—, —CH=CH— or a single bond.

[14] The liquid crystal composition of Item [10], further including at least one compound selected from the group consisting of the compounds of formula (5) of Item [11].

[15] The liquid crystal composition of Item [10], further including at least one compound selected from the group consisting of the compounds of formulae (11), (12) and (13) of Item [13].

[16] The liquid crystal composition of Item [11], further including at least one compound selected from the group consisting of the compounds of formulae (11), (12) and (13) of Item [13].

[17] The liquid crystal composition of Item [12], further including at least one compound selected from the group consisting of the compounds of formulae (11), (12) and (13) of Item [13].

[18] The liquid crystal composition of any one of Items [1]-[9], further including at least one compound selected from the group consisting of the compounds of formulae (15), (16), (17) and (18).

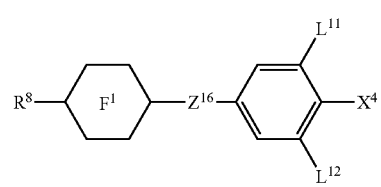
(15)

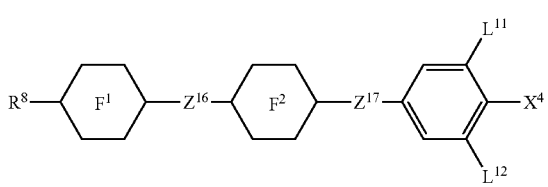
(16)

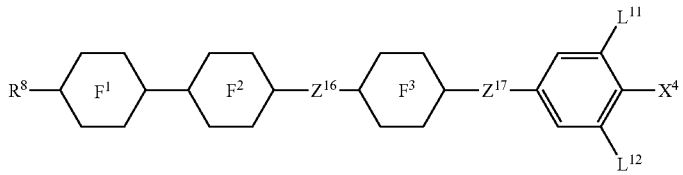

(17)

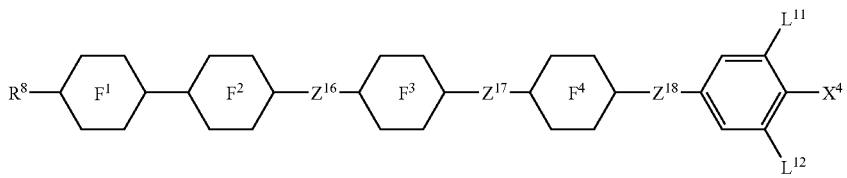

(18)

In these formulae, $R^8$ is $C_{1-10}$ alkyl, $C_{2-10}$ alkenyl or $C_{2-10}$ alkynyl, and in the alkyl, alkenyl or alkynyl arbitrary hydrogen atom may be replaced by a fluorine atom and arbitrary —$CH_2$— may be replaced by —O—; $X^4$ is a fluorine atom, a chlorine atom, —$SF_5$, —$OCF_3$, —$OCHF_2$, —$CF_3$, —$CHF_2$, —$CH_2F$, —$OCF_2CHF_2$ or —$OCF_2CHFCF_3$; the rings $F^1$, $F^2$, $F^3$ and $F^4$ are each independently 1,4-cyclohexylene, 1,3-dioxan-2,5-diyl, pyrimidin-2,5-diyl, tetrahydropyran-2,5-diyl, 1,4-phenylene, naphthalene-2,6-diyl, 1,4-phenylene in which arbitrary hydrogen atom is replaced by a fluorine atom or a chlorine atom, or naphthalene-2,6-diyl in which arbitrary hydrogen atom is replaced by a fluorine atom or a chlorine atom; $Z^{16}$, $Z^{17}$ and $Z^{18}$ are each independently —$(CH_2)_2$—, —$(CH_2)_4$—, —COO—, —$CF_2O$—, —$OCF_2$—, —CH═CH—, —C≡C—, —$CH_2O$— or a single bond; $L^{11}$ and $L^{12}$ are each independently a hydrogen atom or a fluorine atom.

[19] The liquid crystal composition of any of Items [1]-[9], further including at least one compound selected from a group consisting of the compounds of formula (19).

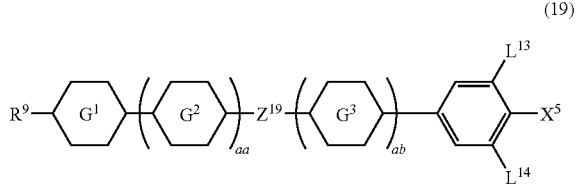

(19)

In this formula, $R^9$ is $C_{1-10}$ alkyl, $C_{2-10}$ alkenyl or $C_{2-10}$ alkynyl, and in the alkyl, alkenyl or alkynyl arbitrary hydrogen atom may be replaced by a fluorine atom and arbitrary —$CH_2$— may be replaced by —O—; $X^5$ is —C≡N, —N═C═S or —C≡C—C≡N; the rings $G^1$, $G^2$ and $G^3$ are each independently 1,4-cyclohexylene, 1,4-phenylene, 1,4-phenylene in which arbitrary hydrogen atom is replaced by a fluorine atom or a chlorine atom, naphthalene-2,6-diyl, naphthalene-2,6-diyl in which arbitrary hydrogen atom is replaced by a fluorine atom or a chlorine atom, 1,3-dioxan-2,5-diyl, tetrahydropyran-2,5-diyl or pyrimidin-2,5-diyl; $Z^{19}$ is —$(CH_2)_2$—, —COO—, —$CF_2O$—, —$OCF_2$—, —C≡C—, —$CH_2O$— or a single bond; $L^{13}$ and $L^{14}$ are each independently a hydrogen atom or a fluorine atom; aa is 0, 1 or 2, ab is 0 or 1, and aa+ab is equal to 0, 1 or 2.

[20] The liquid crystal composition of any one of Items [1]-[19], further including at least one antioxidant, at least one ultraviolet absorbent, or at least one antioxidant and at least one ultraviolet absorbent.

[21] The liquid crystal composition of any of Items [1]-[20], where the optically isotropic liquid crystal phase does not exhibit two or more colors of diffracted light.

[22] The liquid crystal composition of any one of Items [1]-[20], where the optically isotropic liquid crystal phase exhibits two or more colors of diffracted light.

[23] The liquid crystal composition of Item [21] or [22], which is obtained by adding a chiral dopant to a composition having a temperature difference of 3° C.-150° C. between the upper-limit temperature and the lower-limit temperature of the co-existence of a chiral nematic phase and an isotropic phase.

[24] The liquid crystal composition of Item [21] or [22], which is obtained by adding a chiral dopant to a composition having a temperature difference of 5° C.-150° C. between the upper-limit temperature and the lower-limit temperature of the co-existence of a chiral nematic phase and an isotropic phase.

[25] The liquid crystal composition of Item [21] or [22], which is obtained by adding a chiral dopant to a composition having a temperature difference of 3° C.-150° C. between the upper-limit temperature and the lower-limit temperature of the co-existence of a nematic phase and an isotropic phase.

[26] The liquid crystal composition of any one of Items [1]-[25], where the content of the chiral dopant is 1-40 wt % relative to the total weight of the liquid crystal composition.

[27] The liquid crystal composition of any one of Items [1]-[25], where the content of the chiral dopant is 5-15 wt % relative to the total weight of the liquid crystal composition.

[28] The liquid crystal composition of Item [26] or [27], which exhibits a chiral nematic phase at any temperature in the range of 70° C. to −20° C. and has a pitch of 700 nm or less at a temperature within at least a part of the range of 70° C. to −20° C.

[29] The liquid crystal composition of Items [26]-[28], wherein the chiral dopant includes at least one compound selected from the group consisting of the compounds of formulae (K1)-(K5).

(K1)
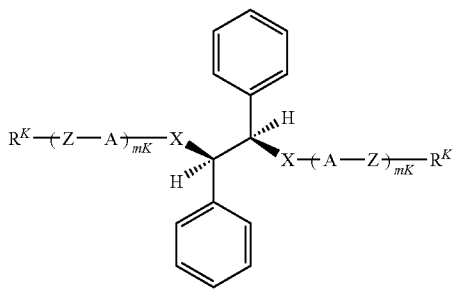

(K2)
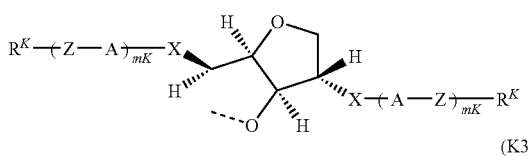

(K3)
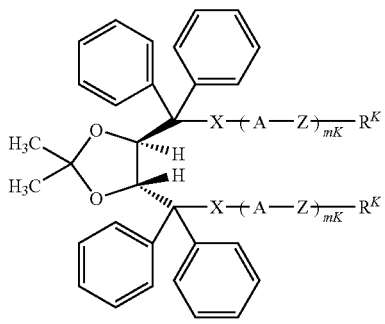

(K4)
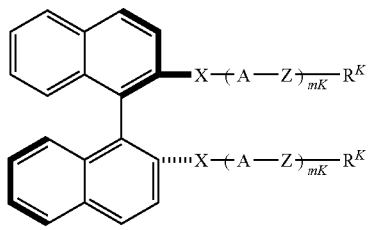

-continued (K5)
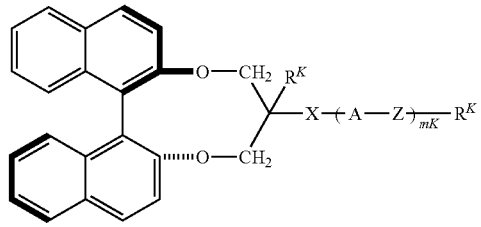

In formulae (K1)-(K5), each $R^K$ is independently a hydrogen atom, a halogen atom, —C≡N, —N=C=O, —N=C=S, or $C_{1-20}$ alkyl in which arbitrary —$CH_2$— may be replaced by —O—, —S—, —COO—, —OCO—, —CH=CH—, —CF=CF— or —C≡C— and arbitrary hydrogen atom can be replaced by a halogen atom; each A is independently an aromatic or non-aromatic three- to eight-membered ring, or a fused ring of 9 or more carbons, and in these rings arbitrary hydrogen atom may be replaced by a halogen atom, $C_{1-3}$ alkyl or $C_{1-3}$ haloalkyl, —$CH_2$— may be replaced by —O—, —S— or —NH— and —CH= may be replaced by —N=; each Z is independently a single bond, or $C_{1-8}$ alkylene wherein —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom; X is a single bond, —COO—, —OCO—, —$CH_2$O—, —O$CH_2$—, —$CF_2$O—, —O$CF_2$— or —$CH_2CH_2$—; and mK is an integer of 1-4.

[30] The liquid crystal composition of any one of Items [26]-[28], wherein the chiral dopant comprises at least one compound selected from the group consisting of the compounds of formulae (K2-1)-(K2-8) and (K5-1)-(K5-3).

(K2-1)
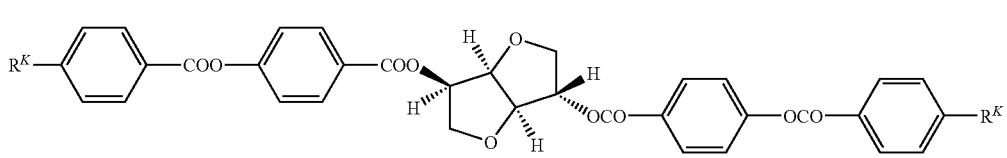

(K2-2)
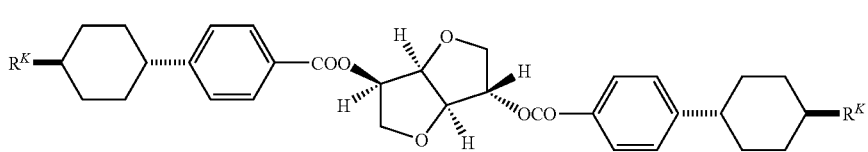

(K2-3)
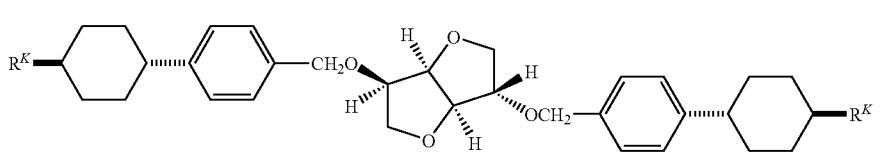

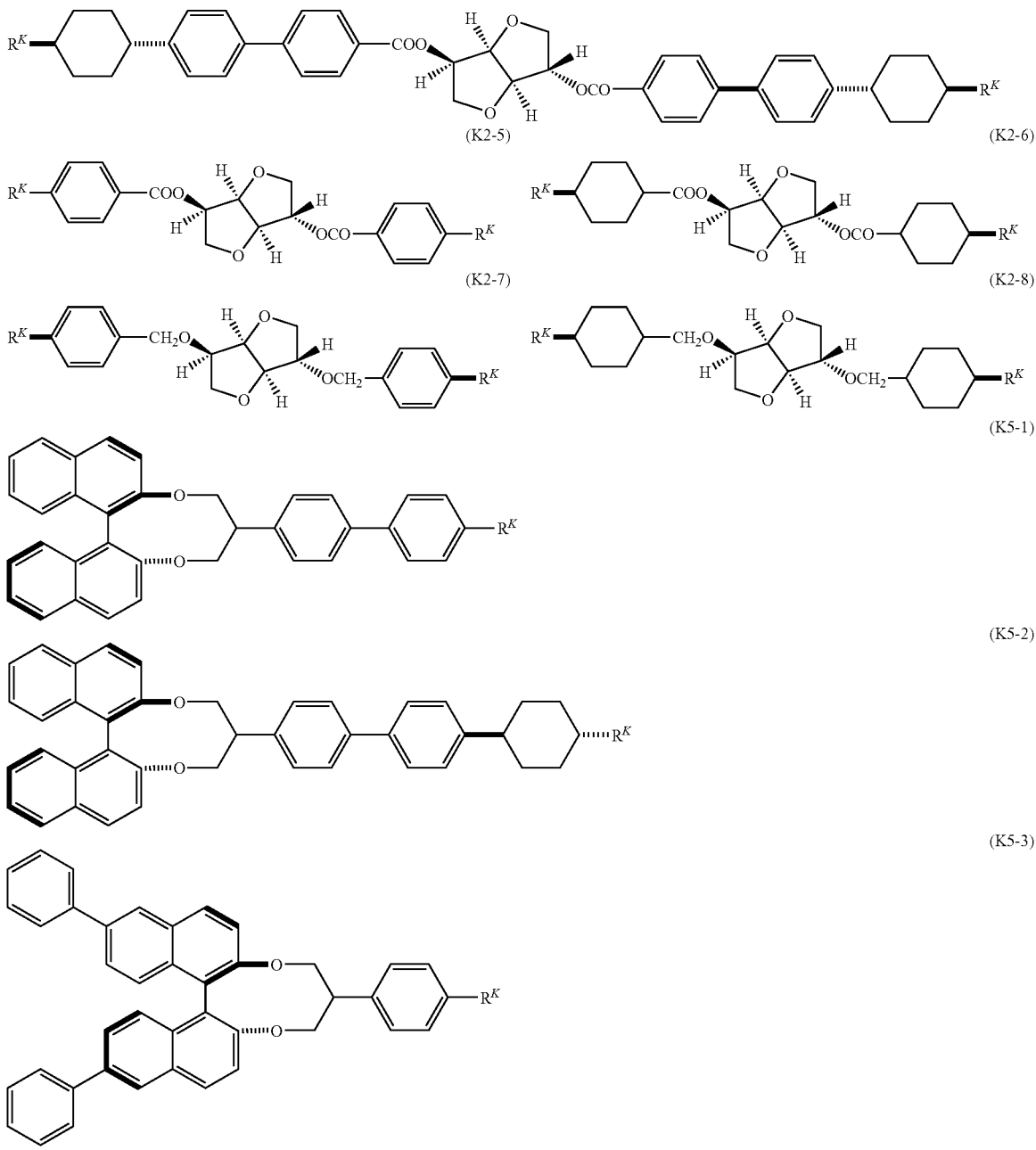

Each $R^K$ is independently $C_{3-10}$ alkyl, wherein the —$CH_2$— adjacent to a ring may be replaced by —O— and arbitrary —$CH_2$— may be replaced by —CH=CH—.

[31] A mixture, including the liquid crystal composition of any one of Items [1]-[30], and a polymerizable monomer.

[32] The mixture of Item [31], where the polymerizable monomer is a photo-polymerizable monomer or a thermo-polymerizable monomer.

[33] A polymer/liquid crystal composite material, which is obtained by polymerizing the mixture of Item [31] or [32], for use in a device driven in an optically isotropic liquid crystal phase.

[34] The polymer/liquid crystal composite material of Item [33], which is obtained by polymerizing the mixture of Item [31] or [32] in an isotropic phase or an optically isotropic liquid crystal phase.

[35] The polymer/liquid crystal composite material of Item [33], wherein the polymer has mesogen moieties.

[36] The polymer/liquid crystal composite material of any one of Items [33]-[35], wherein the polymer has a cross-linked structure.

[37] The polymer/liquid crystal composite material of any one of Items [33]-[36], wherein the content of the liquid crystal composition is 60-99 wt % and that of the polymer is 1-40 wt %.

[38] An optical device, including: two substrates, electrodes disposed on a surface of one or both of the substrates, a liquid crystal medium disposed between the two substrates and electric field applying means for applying an electric field to the liquid crystal medium via the electrodes, where the liquid crystal medium is the liquid crystal composition of any one of Items [26]-[30], or the polymer/liquid crystal composite material of any one of Items [33]-[37].

[39] An optical device, including: two substrates with one or both thereof disposed with electrodes thereon and at least one thereof being transparent, a liquid crystal medium disposed between the two substrates, a polarizer disposed on an outer side of the substrates, and electric field applying means for applying an electric field to the liquid crystal medium via the electrodes, where the liquid crystal medium is the liquid crystal composition of any one of Items [26]-[30], or the polymer/liquid crystal composite material of any one of Items [33]-[37].

[40] The optical device of Item [39], where on at least one of the two substrates, the electrodes are constructed in a manner such that the electric field is applied in at least two directions.

[41] The optical device of Item [39], where the two substrates are arranged parallel to each other, and on one or both of the two substrates, the electrodes are constructed in a manner such that the electric field is applied in at least two directions.

[42] The optical device of any one of Items [38]-[41], where the electrodes are disposed in a matrix form to form pixel electrodes, and each pixel is provided with an active device being a thin film transistor (TFT).

In this invention, "liquid crystal medium" is a generic term of a liquid crystal composition and a polymer/liquid crystal composite. Furthermore, "optical device" refers to various devices using electrooptical effect to achieve light modulation or optical switching etc., for example, display devices (LCD devices), light modulation devices used in optical communication systems, optical signal processing or various sensor systems. With respect to light modulation that utilizes a change in the refractive index of an optically isotropic liquid crystal medium caused by voltage application, the Kerr effect is known. The Kerr effect is an effect that the electric-birefringence $\Delta n(E)$ is proportional to the square of the electric field E, i.e. $\Delta n(E) = K \cdot \lambda \cdot E^2$ (K=Kerr constant, $\lambda$=wavelength), for a material exhibiting the Kerr effect. Herein, "electric-birefringence" refers to the optical anisotropy induced by applying an electric field to the isotropic liquid crystal medium.

The terms in the specification are defined below. "Liquid crystal compound" is a generic term of compounds having a liquid crystal phase, such as nematic phase or smectic phase etc., and compounds having no liquid crystal phase but being useful as a component of a liquid crystal composition. A chiral dopant is an optically active compound, which is added to impart a desired twisted molecular arrangement to the liquid crystal composition. "LCD device" is a generic term of LCD panels and LCD modules. "Liquid crystal compound", "liquid crystal composition" and "LCD device" are sometimes simply called "compound", "composition" and "device", respectively. Further, for example, the upper-limit temperature of a liquid crystal phase is the phase transition temperature from the liquid crystal phase to the isotropic phase, and sometimes simply called "clearing point" or "upper-limit temperature". The lower-limit temperature of a liquid crystal phase is sometimes simply called "lower-limit temperature". A compound represented by formula (1) is sometimes simply called a compound (1), and this rule also applies to a compound represented by formula (2), etc. In formulae (1)-(19), the symbols B, D and E etc. surrounded by hexagons respectively correspond to ring B, ring D and ring E etc. The compound content by percentage is weight percentage (wt %) relative to the total weight of the composition. Numerous identical symbols, such as the rings $A^1$, $Y^1$ or B etc., are included in the same or different formulae, but the groups represented by the same symbol can be identical or different from each other.

"Arbitrary" denotes not only arbitrary position but also arbitrary number, except for the case where the number is zero. The expression "arbitrary A may be replaced by B, C or D" not only means arbitrary A may be replaced by B, arbitrary A may be replaced by C or arbitrary A may be replaced by D, but also means that a plurality of A's may be replaced by at least two of B-D. For example, the scope of alkyl in which arbitrary —$CH_2$— may be replaced by —O— or —CH=CH— includes alkyl, alkenyl, alkoxy, alkoxyalkyl, alkoxyalkenyl and alkenyloxyalkyl, etc. Furthermore, in this invention, two contiguous —$CH_2$— being replaced by —O— to form —O—O— is not preferable, so is terminal —$CH_2$— of alkyl being replaced by —O—. This invention will be further described below. The terminal groups, rings and linking groups etc. of the compound of formula (1) will also be illustrated by way of preferred examples.

Effects of the Invention

The liquid crystal composition of this invention is stable to heat and light etc., exhibits a high upper-limit temperature and a low lower-limit temperature of an optically isotropic liquid crystal phase, and has a low driving voltage in a device driven in an optically isotropic liquid crystal phase. The polymer/liquid crystal composite material of this invention also exhibits an optically isotropic liquid crystal phase, has a high upper-limit temperature and a low lower-limit temperature of an optically isotropic liquid crystal phase, and has a low driving voltage in a device driven in an optically isotropic liquid crystal phase.

The optical device of this invention driven in an optically isotropic liquid crystal phase has a wide temperature range for use, a short response time, a high contrast and a low driving voltage.

Figure 1:
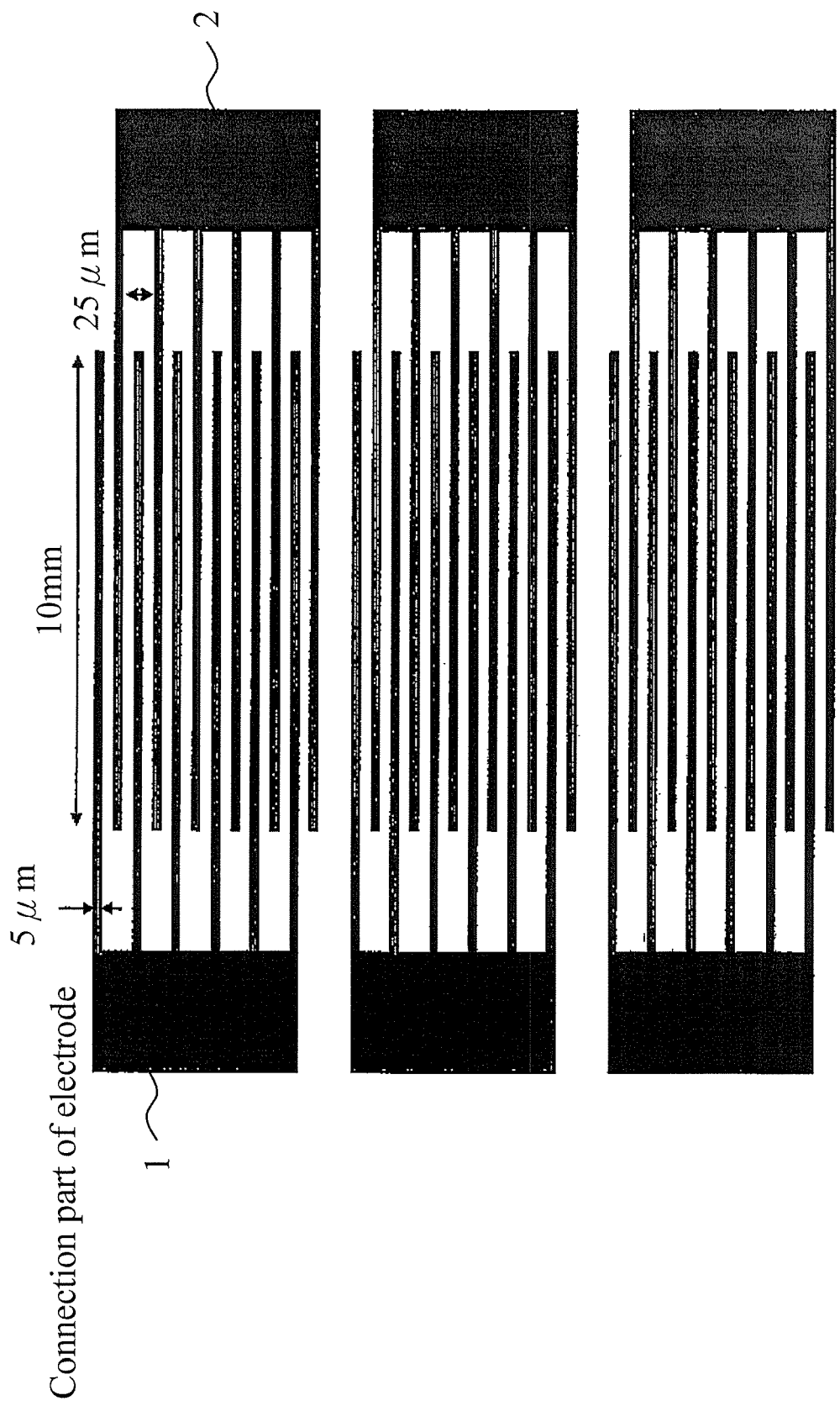
FIG. 1 shows a comb-like electrode substrate used in an embodiment.

DESCRIPTION OF THE EMBODIMENTS 1-1. Compound (1)

The liquid crystal composition having an optically isotropic liquid crystal phase of this invention comprises a compound of formula (1) as a component A. A first aspect of this invention relates to a composition containing the component A alone, or a composition containing the component A and other components not specifically mentioned in this specification. The compound of formula (1) is first described.

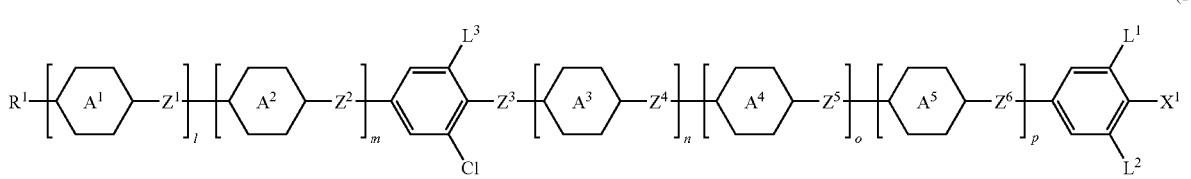

(1)

In formula (1), $R^1$ is a hydrogen atom, or $C_{1-20}$ alkyl in which arbitrary —$CH_2$— may be replaced by —O—, —S—, —COO—, —OCO—, —CH=CH—, —CF=CF— or —C≡C— and arbitrary hydrogen atom may be replaced by a halogen atom or $C_{1-3}$ alkyl.

For example, examples of the groups formed by substituting arbitrary —$CH_2$— in $CH_3(CH_2)_3$— with —O—, —S— or —CH=CH— are $CH_3(CH_2)_2O$—, $CH_3$—O—$(CH_2)_2$—, $CH_3$—O—$CH_2$—O—, $CH_3(CH_2)_2S$—, $CH_3$—S—$(CH_2)_2$—, $CH_3$—S—$CH_2$—S—, $CH_2$=CH—$(CH_2)_3$—, $CH_3$—CH=CH—$(CH_2)_2$—, $CH_3$—CH=CH—$CH_2$O— and $CH_3CH_2C$≡C—, etc. Also, examples of the group formed by substituting arbitrary hydrogen atom in $CH_3(CH_2)_3$—, or in a group formed by substituting arbitrary —$CH_2$— in $CH_3(CH_2)_3$— with —O—, —C≡C— or —CH=CH— with a halogen atom, are $ClCH_2(CH_2)_3$—, $CF_2$=CH—$(CH_2)_3$—, $CH_2F(CH_2)_2O$— and $CH_2FCH_2C$≡C—.

For such $R^1$, a linear group is preferred to a branched group. When $R^1$ is branched, it preferably has optical activity. The preferred stereo configuration of —CH=CH— in alkenyl depends on the position of the double bond. A trans-configuration is preferred for alkenyl having a double bond at an odd position, such as —CH=$CHCH_3$, —CH=$CHC_2H_5$, —CH=$CHC_3H_7$, —CH=$CHC_4H_9$, —$C_2H_4$—CH=$CHCH_3$ and —$C_2H_4$—CH=$CHC_2H_5$. A cis-configuration is preferred for alkenyl having a double bond at an even position, such as —$CH_2$CH=$CHCH_3$, —$CH_2$CH=$CHC_2H_5$ and —$CH_2$CH=$CHC_3H_7$. An alkenyl compound having a preferred stereo configuration has a high upper-limit temperature or a wide temperature range of a liquid crystal phase. This is detailed in *Mol. Cryst. Liq. Cryst.*, 1985, 131, 109 and *Mol. Cryst. Liq. Cryst.*, 1985, 131, 327.

Alkyl can be linear or branched; specific examples thereof include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$, —$C_{10}H_{21}$, —$C_{11}H_{23}$, —$C_{12}H_{25}$, —$C_{13}H_{27}$, —$C_{14}H_{29}$ and —$C_{15}H_{31}$.

Alkoxy can be linear or branched; specific examples thereof include —$OCH_3$, —$OC_2H_5$, —$OC_3H_7$, —$OC_4H_9$, —$OC_5H_{11}$, —$OC_6H_{13}$, —$OC_7H_{15}$, —$OC_8H_{17}$, —$OC_9H_{19}$, —$OC_{10}H_{21}$, —$OC_{11}H_{23}$, —$OC_{12}H_{25}$, —$OC_{13}H_{27}$ and —$OC_{14}H_{29}$.

Alkoxyalkyl can be linear or branched; specific examples thereof include —$CH_2OCH_3$, —$CH_2OC_2H_5$, —$CH_2OC_3H_7$, —$(CH_2)_2$—$OCH_3$, —$(CH_2)_2$—$OC_2H_5$, —$(CH_2)_2$—$OC_3H_7$, —$(CH_2)_3$—$OCH_3$, —$(CH_2)_4$—$OCH_3$, and —$(CH_2)_5$—$OCH_3$.

Alkenyl can be linear or branched; specific examples thereof include —CH=$CH_2$, —CH=$CHCH_3$, —$CH_2$CH=$CH_2$, —CH=$CHC_2H_5$, —$CH_2$CH=$CHCH_3$, —$(CH_2)_2$—CH=$CH_2$, —CH=$CHC_3H_7$, —$CH_2$CH=$CHC_2H_5$, —$(CH_2)_2$—CH=$CHCH_3$ and —$(CH_2)_3$—CH=$CH_2$.

Alkenyloxy can be linear or branched; specific examples thereof include —$OCH_2CH$=$CH_2$, —$OCH_2CH$=$CHCH_3$ and —$OCH_2CH$=$CHC_2H_5$.

Alkynyl can be linear or branched; specific examples thereof include —C≡CH, —C≡$CCH_3$, —$CH_2C$≡CH, —C≡$CC_2H_5$, —$CH_2C$≡$CCH_3$, —$(CH_2)_2$—C≡CH, —C≡$CC_3H_7$, —$CH_2C$≡$CC_2H_5$, —$(CH_2)_2$—C≡$CCH_3$ and —$CC(CH_2)_5$.

$R^1$ preferably has a structure represented by one of formulae (CHN-1)-(CHN-19). Herein, $R^{1a}$ is a hydrogen atom or $C_{1-20}$ alkyl. More preferably, $R^1$ has a structure represented by one of formulae (CHN-1)-(CHN-4) and (CHN-6)-(CHN-8).

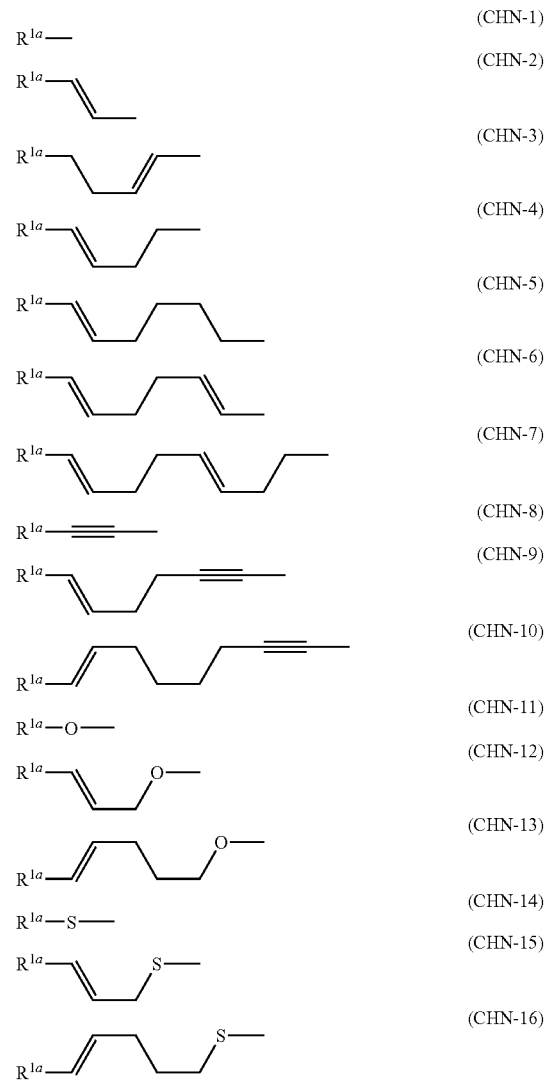

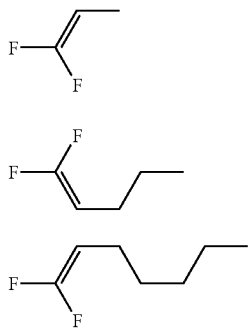

In formula (1), the rings $A^1$, $A^2$, $A^3$, $A^4$ and $A^5$ are each independently a benzene ring, a naphthalene ring, a thiophene ring, a cyclohexene ring, a bicyclooctane ring, a tetrahydronaphthalene ring or a cyclohexane ring. In these rings, arbitrary hydrogen atom may be replaced by a halogen atom, $C_{1-3}$ alkyl, $C_{1-3}$ alkoxy or $C_{1-3}$ haloalkyl, —$CH_2$— may be replaced by —O— or —S—, and —CH= may be replaced by —N=. Preferred examples of the rings $A^1$, $A^2$, $A^3$, $A^4$ and $A^5$ are formulae (RG-1)-(RG-15), wherein $Y^1$, $Y^2$, $Y^3$ and $Y^4$ are each independently a hydrogen atom or a halogen atom, and fn1, fn2 and fn3 are each independently 0, 1, 2 or 3.

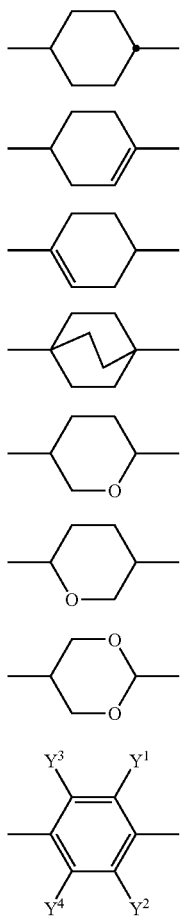

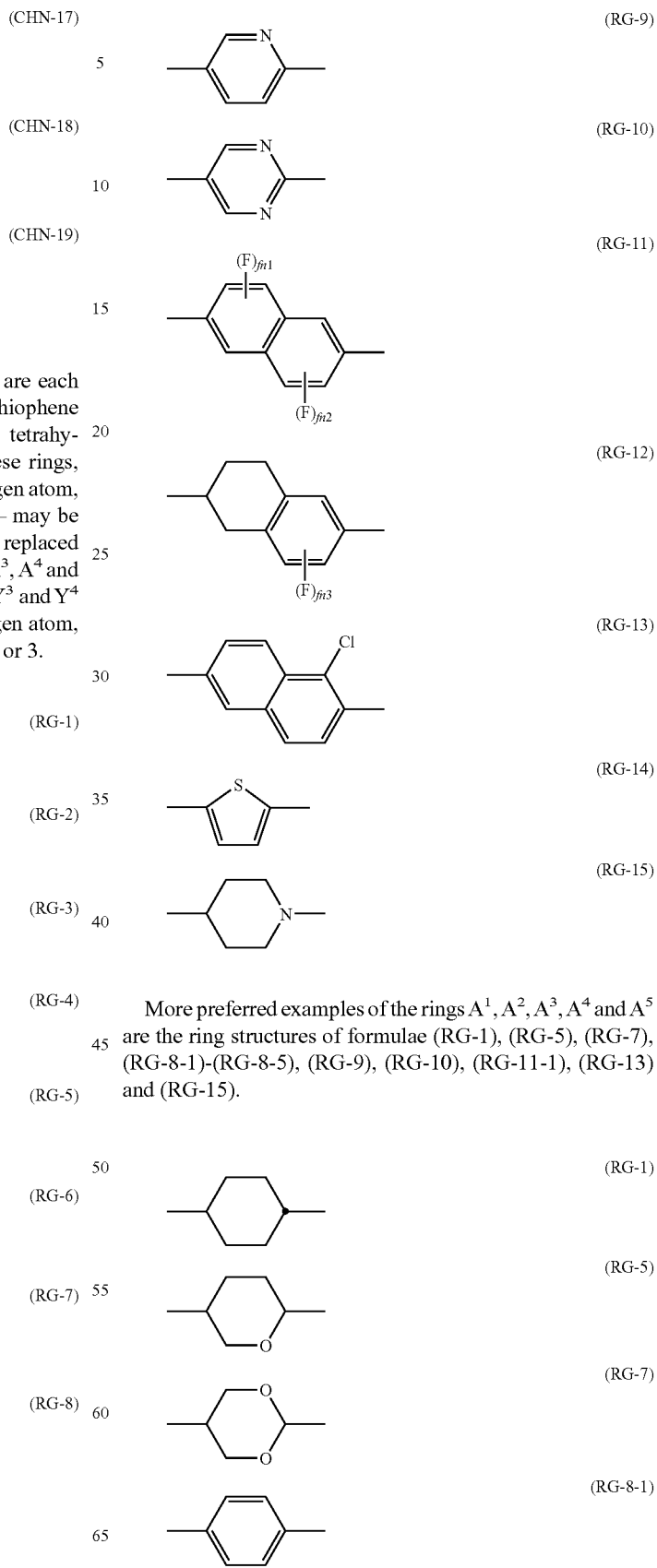

More preferred examples of the rings $A^1$, $A^2$, $A^3$, $A^4$ and $A^5$ are the ring structures of formulae (RG-1), (RG-5), (RG-7), (RG-8-1)-(RG-8-5), (RG-9), (RG-10), (RG-11-1), (RG-13) and (RG-15).

-continued

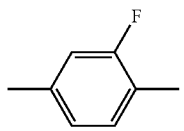 (RG-8-2)

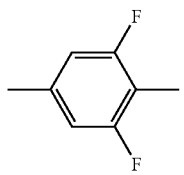 (RG-8-3)

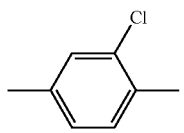 (RG-8-4)

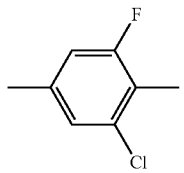 (RG-8-5)

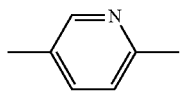 (RG-9)

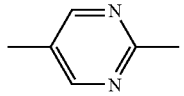 (RG-10)

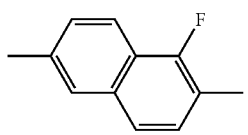 (RG-11-1)

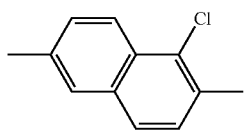 (RG-13)

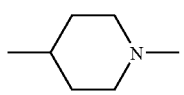 (RG-15)

In formula (1), $Z^1$, $Z^2$, $Z^3$, $Z^4$, $Z^5$ and $Z^6$ are each independently a single bond, or $C_{1-4}$ alkylene wherein arbitrary —CH$_2$— may be replaced by —O—, —S—, —COO—, —OCO—, —CSO—, —OCS—, —CH=CH—, —CF=CF— or —C≡C— and arbitrary hydrogen atom may be replaced by a halogen atom.

Preferred examples of $Z^1$, $Z^2$, $Z^3$, $Z^4$, $Z^5$ and $Z^6$ are a single bond, —CH$_2$CH$_2$—, —CH=CH—, —C≡C—, —COO—, —CF$_2$O—, —CH$_2$O— and —OCH$_2$—. For the stereo configuration of the double bond in the linking groups such as —CH=CH—, —CF=CF—, —CH=CH—(CH$_2$)$_2$— and —(CH$_2$)$_2$—CH=CH—, trans is preferred to cis. More preferably, $Z^1$, $Z^2$, $Z^3$, $Z^4$, $Z^5$ and $Z^6$ are each independently a single bond, —COO— or —CF$_2$O—.

In formula (1), $L^1$, $L^2$ and $L^3$ are each independently a hydrogen atom or a halogen atom. Further, $L^1$, $L^2$ and $L^3$ are preferably each independently a hydrogen atom or a fluorine atom.

In formula (1), $X^1$ is a hydrogen atom, a halogen atom, —C≡N, —N=C=S, —C≡C—C≡N, —SF$_5$, or $C_{1-10}$ alkyl wherein arbitrary —CH$_2$— may be replaced by —O—, —S—, —CH=CH— or —C≡C— and arbitrary hydrogen atom may be replaced by halogen atom.

Specific examples of alkyl in which arbitrary hydrogen atom is replaced by a halogen atom are —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F and —(CF$_2$)$_5$—F.

Specific examples of alkoxy in which arbitrary hydrogen atom is replaced by a halogen atom are —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F and —O—(CF$_2$)$_5$—F.

Specific examples of alkenyl in which arbitrary hydrogen atom is replaced by a halogen atom are —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of $X^1$ are hydrogen atom, fluorine atom, chlorine atom, —C≡N, —N=C=S, —SF$_5$, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_3$, —OC$_2$H$_5$, —OC$_3$H$_7$, —OC$_4$H$_9$, —OC$_5$H$_{11}$, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$, —(CH$_2$)$_3$—CH=CH$_2$, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Preferred examples of $X^1$ are fluorine atom, chlorine atom, —C≡N, —CF$_3$, —CHF$_2$, —CH$_2$F, —OCF$_3$, —OCHF$_2$ and —OCH$_2$F. More preferred examples of $X^1$ are fluorine atom, chlorine atom, —CF$_3$ and —OCF$_3$.

In formula (1), l, m, n, o and p are each independently 0 or 1, and l+m+n+o+p≦4. Preferably, l+m+n+o+p≦3, and more preferably, l+m+n+o+p≦2.

For formula (1), the preferred structures are represented by formulae (1-1)-(1-9).

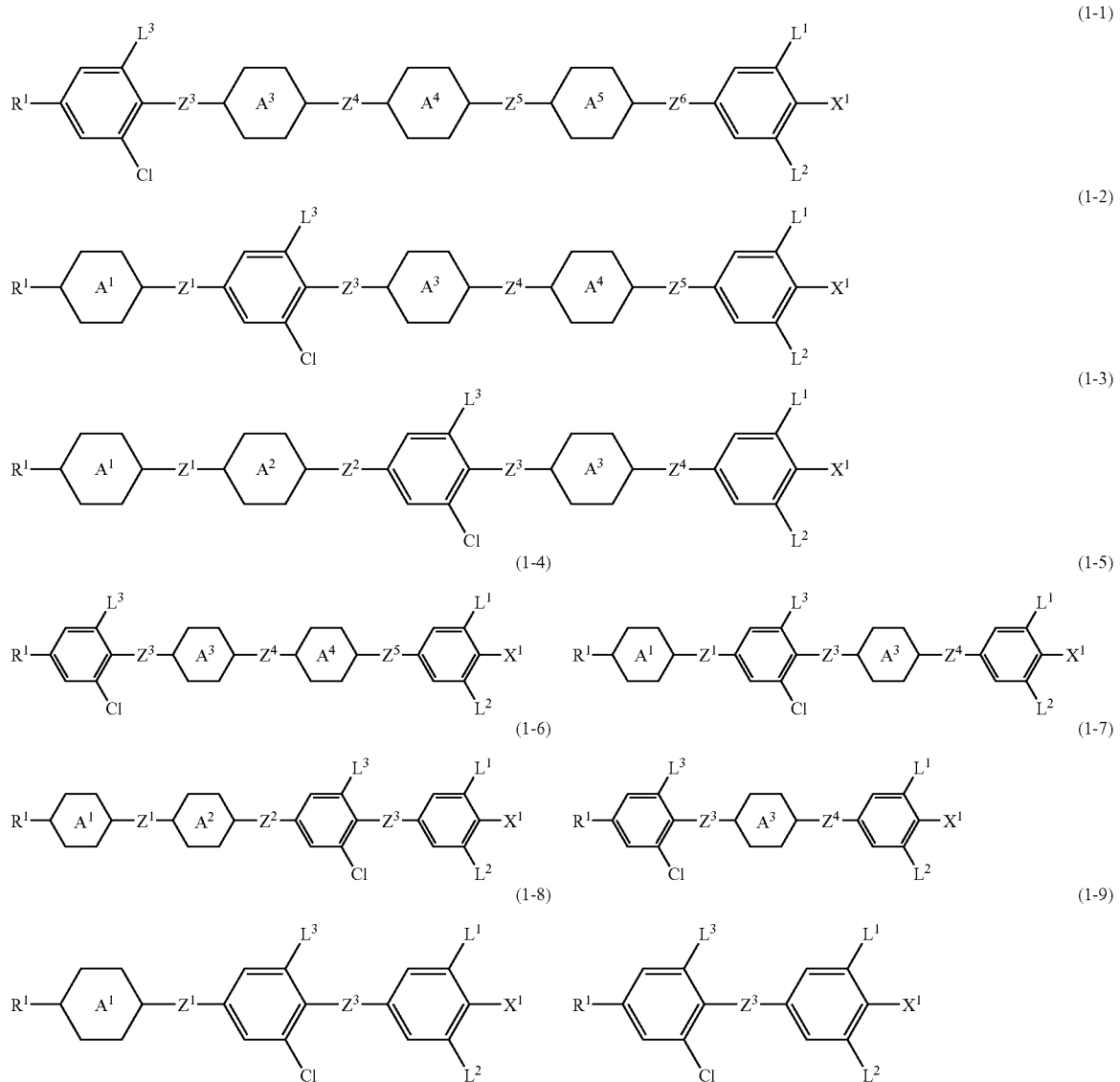

In these formulae, $R^1$ has a structure represented by any one of formulae (CHN-1)-(CHN-19), $R^{1a}$ is a hydrogen atom or $C_{1-20}$ alkyl. The rings $A^1$, $A^2$, $A^3$, $A^4$ and $A^5$ are each independently one of the structures represented by formulae (RG-1)-(RG-15), wherein $Y^1$, $Y^2$, $Y^3$ and $Y^4$ are each independently a hydrogen atom or a halogen atom and fn1, fn2 and fn3 are each independently 0, 1, 2 or 3. $Z^1$, $Z$, $Z4$, $Z^5$ and $Z^6$ are each independently a single bond, —$CH_2CH_2$—, —CH=CH—, —C≡C—, —COO—, —$CF_2O$—, —$CH_2O$— or —$OCH_2$—. $L^1$, $L^2$ and $L^3$ are each independently a hydrogen atom, a fluorine atom or a chlorine atom. $X^1$ is a fluorine atom, a chlorine atom, —C≡N, —$CF_3$, —$CHF_2$, —$CH_2F$, —$OCF_3$, —$OCHF_2$, —$OCH_2F$ or —C≡C—$CF_3$.

1-2. Properties of Compound (1)

Compound (1) used in this invention is further detailed below. A compound (1) is a liquid crystal compound bearing a chlorophenyl ring, which has very stable physical and chemical properties under the conditions where the device is usually used, has good compatibility with other liquid crystal compounds and is difficult to show smectic phase. A composition containing such a compound has stable physical and chemical properties under the conditions where the device is usually used. Therefore, the composition has a larger temperature range of the optically isotropic liquid crystal phase, and thus can be used in a display device in a wide temperature range. Moreover, due to large dielectric anisotropy and optical anisotropy, the compound can be used as a component for lowering the driving voltage in a composition driven in an optically isotropic liquid crystal phase.

By properly selecting the combination of l, m, n, o and p, the species of the rings $A^1$-$A^5$, the left terminal group $R^1$, the substituents on the most right phenyl ring and the substitution positions thereof ($L^1$, $L^2$ and $X^1$) or the linking groups $Z^1$-$Z^6$ of the compound (1), the physical properties such as clearing point, optical anisotropy and dielectric anisotropy can be adjusted at will. The effects of the combination of l, m, n, o and p, the species of the rings $A^1$-$A^5$, the left terminal group $R^1$, the right terminal group $X^1$, the linking groups $Z^1$-$Z^6$ and $L^1$, $L^2$ and $L^3$ to the physical properties of the compound (1) will be described below.

Generally, the larger the value l+m+n+o+p, the higher the clearing point; the smaller the value l+m+n+o+p, the lower the melting point.

The more the aromatic ring included in the rings $A^1$-$A^5$, the higher the optical anisotropy. The structures of formulae (RG-7), (RG-8-2)-(RG-8-5), (RG-9), (RG-10) and (RG-15) have an effect of making large dielectric anisotropy, the structures of formulae (RG-8-1)-(RG-8-5), (RG-9), (RG-10), (RG-11-1), (RG-13) and (RG-15) have an effect of making large optical anisotropy, and the structures of formulae (RG-1) and (RG-5) help to develop good compatibility.

When $R^1$ is linear, the compound (1) has a wide temperature range of a liquid crystal phase, and a low viscosity. When $R^1$ is branched, the compound (1) is well compatible with other liquid crystal compounds. A compound in which $R^1$ is an optically active group can be used as a chiral dopant. A compound in which $R^1$ is not an optically active group can be used as a component of the composition. When $R^1$ is alkenyl, the preferred stereo configuration depends on the position of the double bond. An alkenyl compound having a preferred stereo configuration has a high upper-limit temperature or a wide temperature range of a liquid crystal phase.

When the linking groups $Z^1$, $Z^2$, $Z^3$, $Z^4$, $Z^5$ and $Z^6$ are a single bond, —CH$_2$CH$_2$—, —CH=CH—, —CF$_2$O—, —OCF$_2$—, —CH$_2$O—, —OCH$_2$—, —CF=CF—, —(CH$_2$)$_3$—O—, —O—(CH$_2$)$_3$—, —(CH$_2$)$_2$—CF$_2$O—, —OCF$_2$—(CH$_2$)$_2$— or —(CH$_2$)$_4$—, the compound (1) has low viscosity. When the linking groups are a single bond, —(CH$_2$)$_2$—, —CF$_2$O—, —OCF$_2$— or —CH=CH—, the viscosity of the compound (1) is lower. When the linking groups are —CH=CH—, the compound (1) has a wide temperature range of a liquid crystal phase, and a large elastic constant ratio $K_{33}/K_{11}$ ($K_{33}$: bend elastic constant, $K_{11}$: splay elastic constant). When the linking groups are —C≡C—, the compound (1) has a large optical anisotropy. When the linking groups are —COO— and —CF$_2$O—, the compound (1) has a large dielectric anisotropy. Where $Z^1$, $Z^2$, $Z^3$, $Z^4$, $Z^5$ and $Z^6$ are a single bond, —(CH$_2$)$_2$—, —CH$_2$O—, —CF$_2$O—, —OCF$_2$— or —(CH$_2$)$_4$—, the compound (1) has relatively stable chemical properties and has less tendency to be degraded.

When the right terminal group $X^1$ is a fluorine atom, a chlorine atom, —C≡N, —N=C=S, —SF$_5$, —CF$_3$, —CHF$_2$, —CH$_2$F, —OCF$_3$, —OCHF$_2$ or —OCH$_2$F, the compound (1) has a large dielectric anisotropy. When $X^1$ is —C≡N, —N=C=S or alkenyl, the compound (1) has a large optical anisotropy. When $X^1$ is a fluorine atom, —OCF$_3$ or alkyl, the compound (1) has stable chemical properties.

When $L^1$ and $L^2$ are both fluorine atoms and $X^1$ is a fluorine atom, a chlorine atom, —C≡N, —N=C=S, —SF$_5$, —CF$_3$, —CHF$_2$, —CH$_2$F, —OCF$_3$, —OCHF$_2$ or —OCH$_2$F, the compound (1) has a large dielectric anisotropy. When $L^1$ is a fluorine atom and $X^1$ is —CF$_3$ or —OCF$_3$, when $L^1$ and $L^2$ are both fluorine atoms and $X^1$ is —CF$_3$ or —OCF$_3$, or when $L^1$, $L^2$ and $X^1$ are all fluorine atoms, the compound (1) has a large dielectric anisotropy value, a wide temperature range of a liquid crystal phase and stable chemical properties, and has less tendency to be degraded.

$L^3$ is preferably a hydrogen, chlorine or fluorine atom. Particularly, when a compound with a large dielectric anisotropy is desired, $L^3$ is preferably a chlorine atom or a fluorine atom, and more preferably a fluorine atom.

As described above, a compound with target properties can be obtained by properly selecting the species of the ring structures, terminal groups, linking groups, etc.

1-3. Specific Examples of Compound (1)

Preferred examples of the compound (1) are formulae (1-1)-(1-9). More preferred examples are formulae (1-2A)-(1-2C), (1-3A)-(1-3C), (1-4A)-(1-4E), (1-5A)-(1-5G), (1-6A)-(1-6G), (1-7A)-(1-7D), (1-8A)-(1-8E), (1-9A) and (1-10A)-(1-10C).

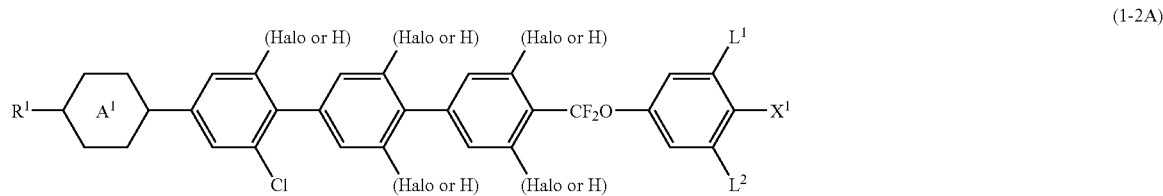

(1-2A)

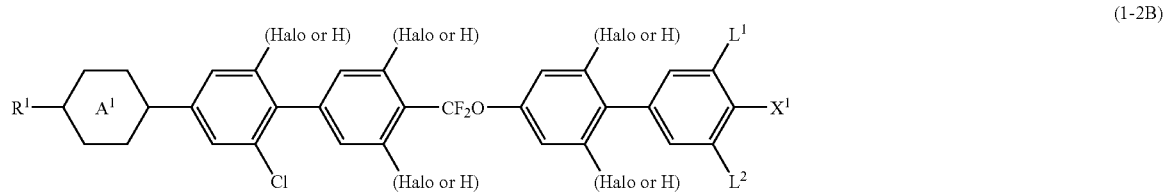

(1-2B)

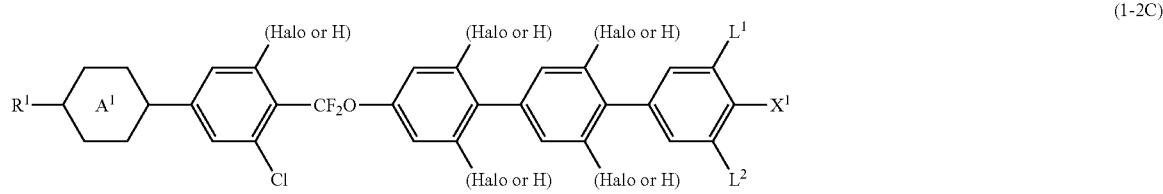

(1-2C)

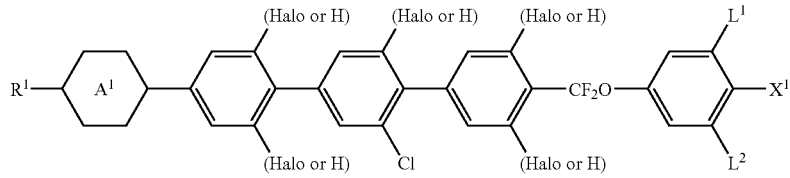
(1-3A)
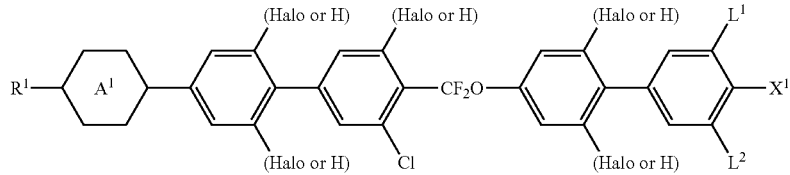
(1-3B)
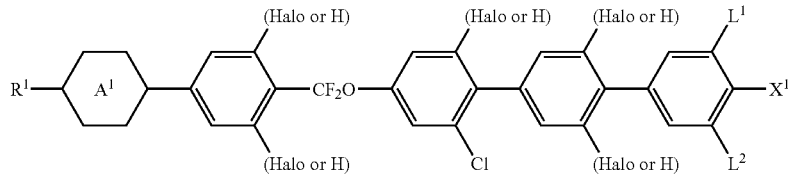
(1-3C)
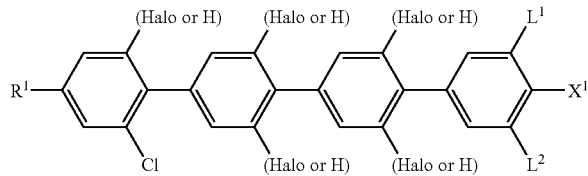
(1-4A)
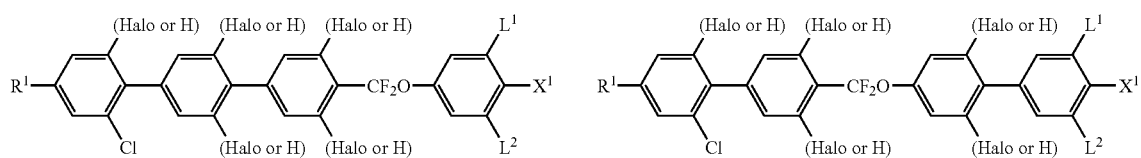
(1-4B) (1-4C)
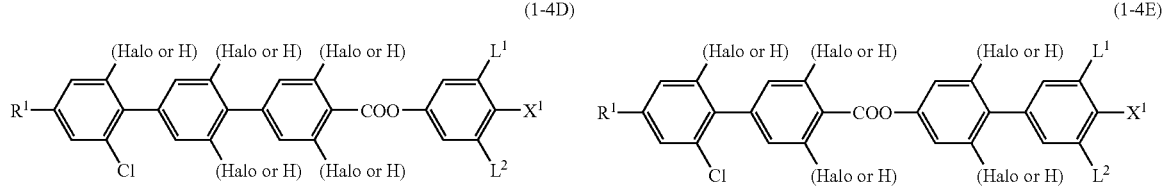
(1-4D) (1-4E)
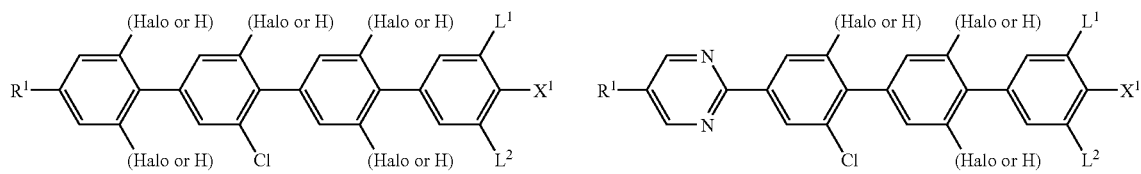
(1-5A) (1-5B)
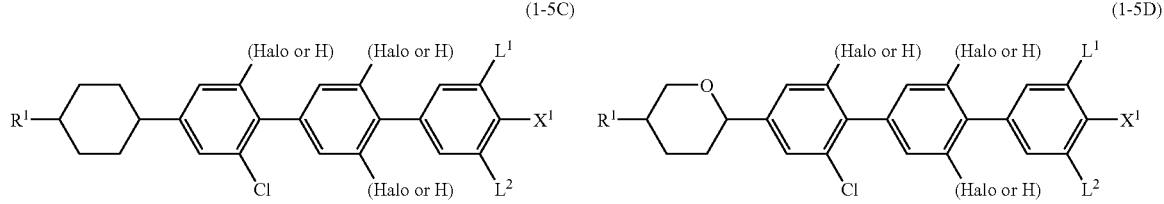
(1-5C) (1-5D)

-continued
(1-5E)
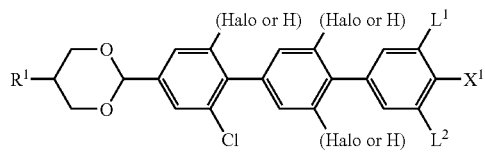
(1-5F)
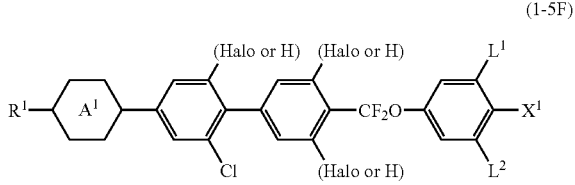
(1-5G)
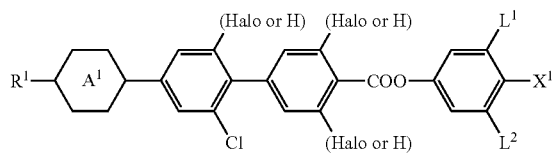
(1-6A)
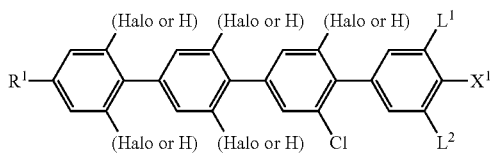
(1-6B)
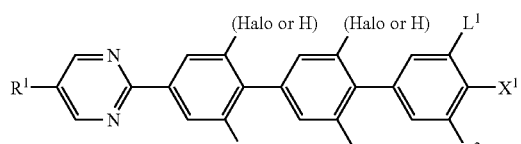
(1-6C)
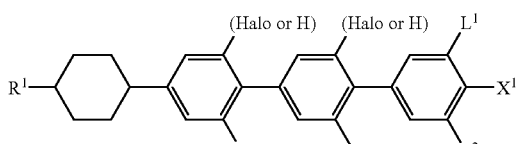
(1-6D)
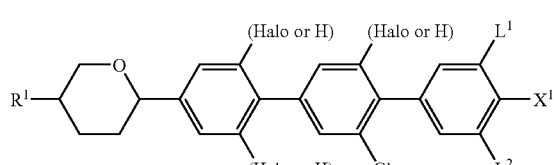
(1-6E)
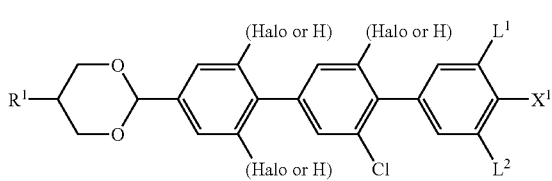
(1-6F)
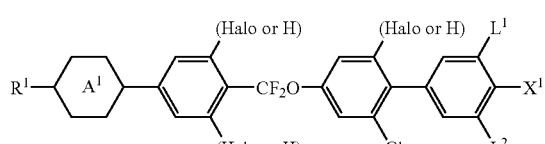
(1-6G)
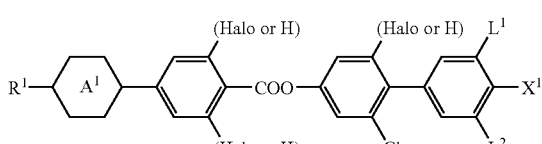
(1-7A)
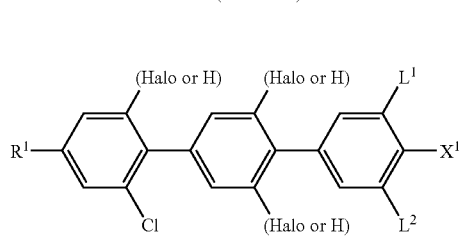
(1-7B)
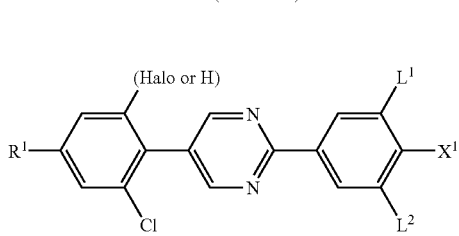
(1-7C)
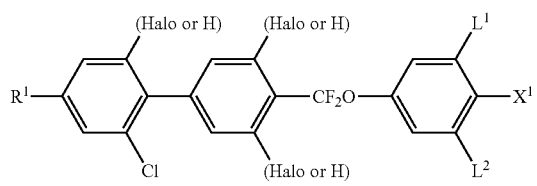
(1-7D)
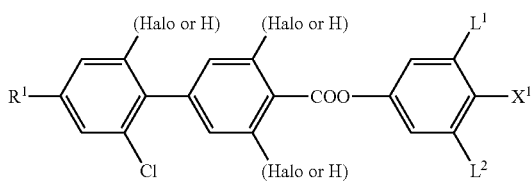
(1-8A)
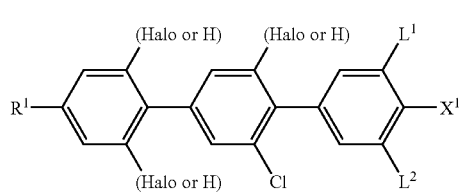
(1-8B)
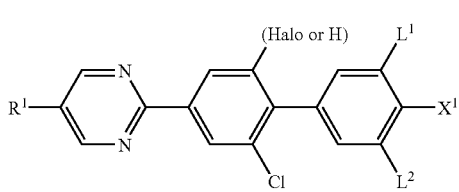

-continued

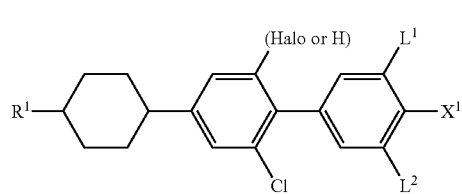

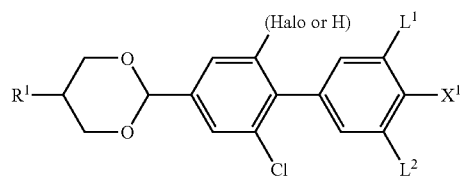

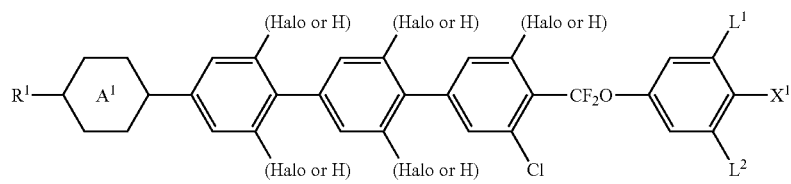

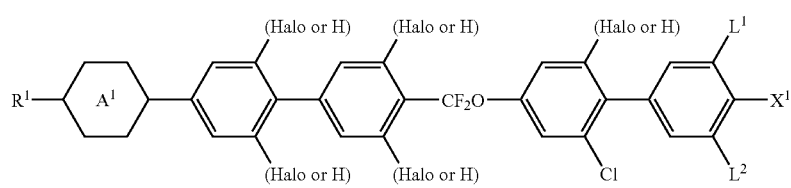

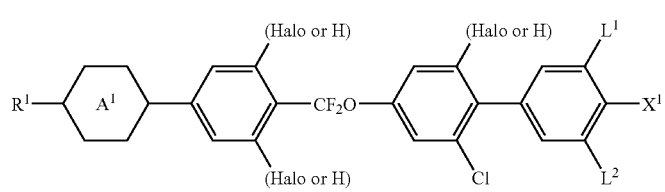

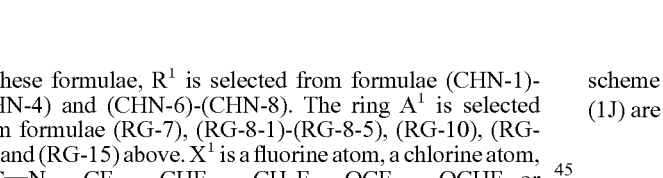

In these formulae, $R^1$ is selected from formulae (CHN-1)-(CHN-4) and (CHN-6)-(CHN-8). The ring $A^1$ is selected from formulae (RG-7), (RG-8-1)-(RG-8-5), (RG-10), (RG-13) and (RG-15) above. $X^1$ is a fluorine atom, a chlorine atom, —C≡N, —$CF_3$, —$CHF_2$, —$CH_2F$, —$OCF_3$, —$OCHF_2$ or —C≡C—$CF_3$.

1-4. Synthesis of Compound (1)

Synthesis of the compound (1) will be described next. A compound (1) can be synthesized by a suitable combination of organic synthesis methods. The methods for introducing target terminal groups, rings and linking groups in the starting compound are described in, for example, *Organic Syntheses*, John Wiley & Sons, Inc, Organic Reactions, John Wiley & Sons, Inc, *Comprehensive Organic Synthesis*, Pergamon Press, and New Lecture on Experimental Chemistry (Maruzen).

1-4-1. Chlorobenzene Ring

Chlorobenzene compounds such as 1-bromo-3-chloro-5-fluorobenzene and 3-chloro-5-fluorophenol are commercially available as reagents.

1-4-2. Formation of Linking Groups $Z^1$-$Z^6$

An example for forming the linking groups $Z^1$-$Z^6$ in the compound (1) is shown in the scheme below. In this scheme, $MSG^1$ or MSG2 is a monovalent organic group having at least one ring. The multiple $MSG^1$'s (or $MSG^2$'s) used in the scheme can be identical or different. The compounds (1A)-(1J) are within the scope of compound (1).

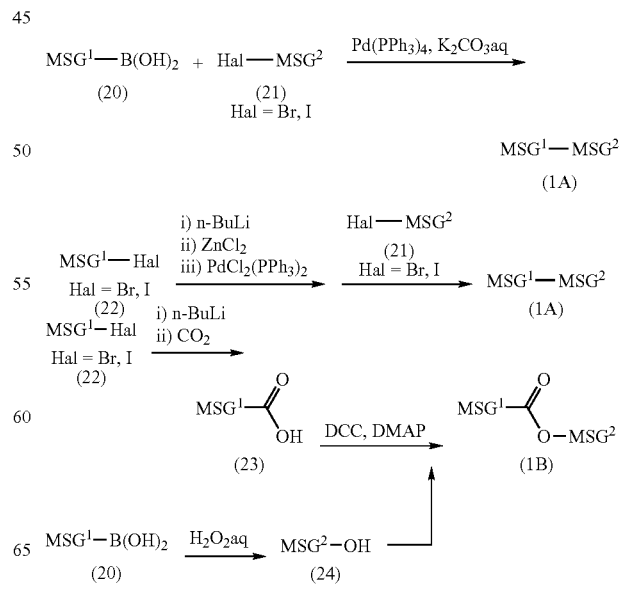

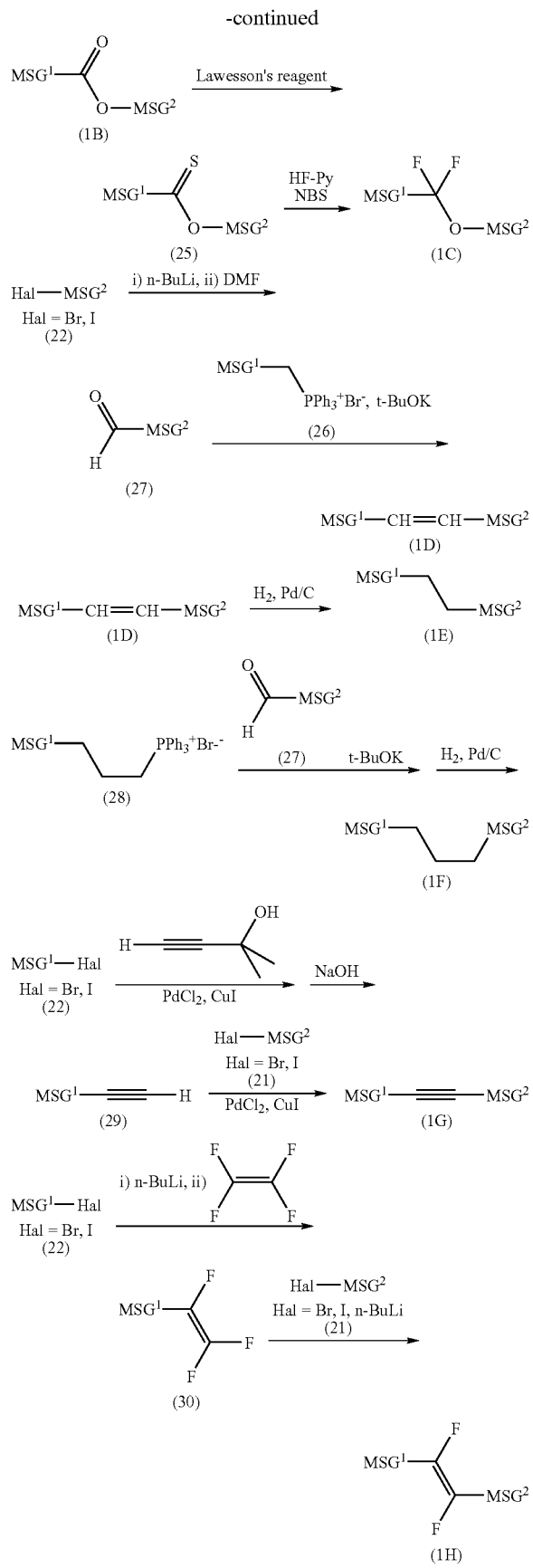
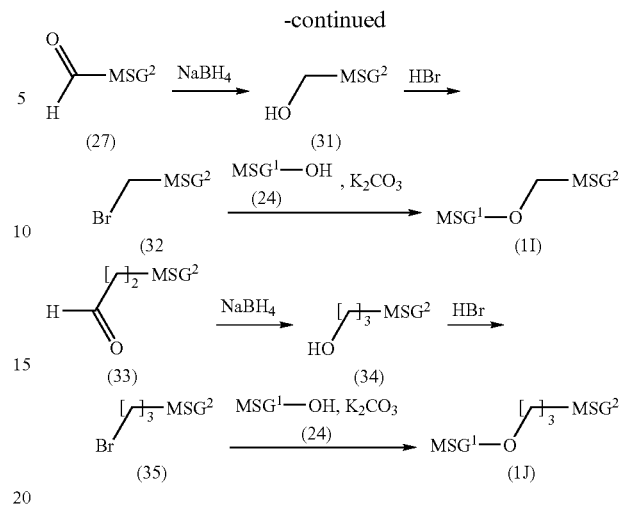

Next, the methods for forming each of the linking groups $Z^1$-$Z^6$ in the compound (1) are described in Items (I)-(X) below.

(I) Formation of Single Bond

Arylboric acid (20) is reacted with a compound (21) synthesized with a well-known method, in the presence of an aqueous carbonate solution and a catalyst such as tetrakis(triphenylphosphine)palladium, to synthesize a compound (1A). A compound (1A) could alternatively be synthesized by reacting n-butyl lithium with a compound (22) synthesized by a well-known method, with zinc chloride, and then with the compound (21) in the presence of a catalyst such as bis(triphenylphosphine)palladium dichloride.

(II) Formation of —COO— and —OCO—

A compound (22) is reacted with n-butyl lithium and then with carbon dioxide to produce a carboxylic acid (23). Next, the compound (23) and a phenol compound (24) synthesized with a well-known method are subjected to dehydration in the presence of 1,3-dicyclohexylcarbodiimide (DCC) and 4-dimethylaminopyridine (DMAP) to synthesize a compound (1B) having —COO—. A compound having —OCO— could also be synthesized through this process.

(III) Formation of —CF$_2$O— and —OCF$_2$—

The compound (1B) is treated with a vulcanizing agent such as Lawesson's reagent to produce a compound (25). Then the compound (25) is fluorinated with hydrogen fluoride pyridine complex and N-bromosuccinimide (NBS), to synthesize a compound (1C) having —CF$_2$O—, as described in M. Kuroboshi et al., *Chem. Lett.*, 1992, 827. Compound (1C) could alternatively be synthesized by fluorinating the compound (25) with (diethylamino)sulfur trifluoride (DAST), as described in W. H. Bunnelle et al., *J. Org. Chem.* 1990, 55, 768. A compound having —OCF$_2$— could also be synthesized through this process. These linking groups could alternatively be formed through the process described in Peer. Kirsch et al., *Angew. Chem. Int. Ed.* 2001, 40, 1480.

(IV) Formation of —CH═CH—

The compound (22) is treated with n-butyl lithium and then reacted with a formamide such as N,N-dimethylformamide (DMF) to produce aldehyde (27). Then, a phosphosium salt (26) synthesized with a well-known method is treated with a base such as potassium t-butoxide, so as to produce a phosphorus ylide, which is then reacted with the aldehyde (27) to produce a compound (1D). A cis-compound is produced under the above reaction conditions, and, if necessary, may be isomerized to a trans-compound by a well-known method.

(V) Formation of —(CH$_2$)$_2$—

The compound (1D) is hydrogenated in the presence of a catalyst, such as Pd/C, to produce a compound (1E).

(VI) Formation of —(CH$_2$)$_4$—

A compound having —(CH$_2$)$_2$—CH═CH— is produced following the process of (IV) using a phosphonium salt (28) instead of the phosphonium salt (26), which is then catalytically hydrogenated to produce a compound (1F).

(VII) Formation of —C≡C—

2-methyl-3-butyn-2-ol is reacted with the compound (22) in the presence of a catalyst containing palladium dichloride and copper halide, and then deprotected under a basic condition to produce a compound (29). Next, the compound (29) is reacted with the compound (21), in the presence of a catalyst containing bis(triphenylphosphine) palladium dichloride and copper halide, to produce a compound (1G).

(VIII) Formation of —CF═CF—

The compound (22) is treated with n-butyl lithium and then reacted with tetrafluoroethylene to produce a compound (30). The compound (21) is treated with n-butyl lithium and then reacted with the compound (30) to produce a compound (1H).

(IX) Formation of —CH$_2$O— or —OCH$_2$—

The compound (27) is reduced with a reductant such as sodium borohydride to produce a compound (31), which is then halogenated with, for example, hydrobromic acid, to produce a compound (32). Afterwards, the compound (32) is reacted with the compound (24) in the presence of, for example, potassium carbonate, to produce a compound (1I).

(X) Formation of —(CH$_2$)$_3$O— or —O(CH$_2$)$_3$—

A compound (1J) is synthesized according to the same process as (1X), using a compound (33) instead of the compound (27).

1-4-3. Synthesis of Rings A$^1$, A$^2$, A$^3$, A$^4$, A$^5$ and A$^6$

For the rings such as 1,4-cyclohexylene, 1,3-dioxan-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, pyrimidin-2,5-diyl and pyridin-2,5-diyl, the starting materials are commercially available or can be synthesized through a well-known synthesis process.

1-4-4. Synthesis of Compound (1)

There are numerous processes for synthesizing a compound of formula (1), suitably from commercially available reagents, in reference to the embodiments in this specification, or literatures and books.

2. Compounds (2)-(13)

A second aspect of this invention relates to a liquid crystal composition obtained by adding a component selected from the components B, C, D and E shown below to the compound of formula (1) (i.e., component A). As compared with a composition containing the component A alone, the liquid crystal composition can be adjusted for the driving voltage, temperature range of a liquid crystal phase, optical anisotropy, dielectric anisotropy, viscosity and so on.

Preferably, the component to be added into the component A is a mixture obtained by mixing a component B, C or D, wherein the component B includes at least one compound selected from the group consisting of the compounds of formulae (2), (3) and (4) above, the component C includes at least one compound selected from the group consisting of the compounds of formula (5) above, and the component D includes at least one compound selected from the group consisting of the compounds of formulae (6), (7), (8), (9) and (10) above.

Furthermore, a component E can be further mixed to adjust the threshold voltage, temperature range of a liquid crystal phase, optical anisotropy, dielectric anisotropy and viscosity etc., and such a component E contains at least one compound selected from the group consisting of formulae (11), (12) and (13).

Moreover, for each component of the liquid crystal composition used in this invention, even an analogue containing isotopes of the elements can be used due to the little difference in physical properties.

In the component B above, suitable examples of the compound of formula (2) are formulae (2-1)-(2-16), suitable examples of the compound of formula (3) are formulae (3-1)-(3-112), and suitable examples of the compound of formula (4) are formulae (4-1)-(4-52).

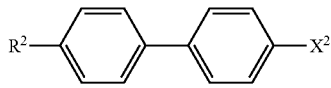 (2-1)

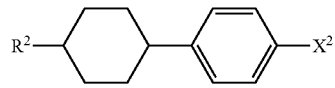 (2-2)

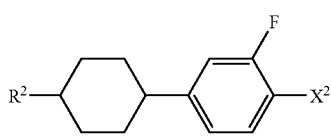 (2-3)

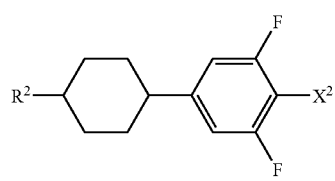 (2-4)

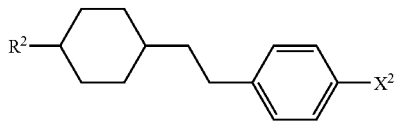 (2-5)

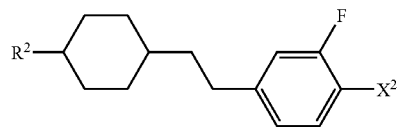 (2-6)

-continued
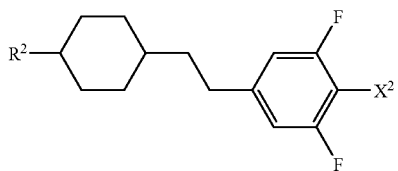
(2-7)
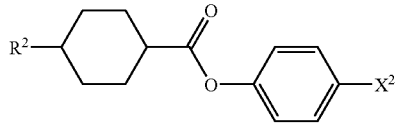
(2-8)
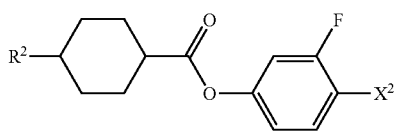
(2-9)
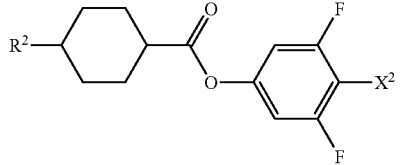
(2-10)
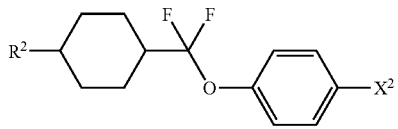
(2-11)
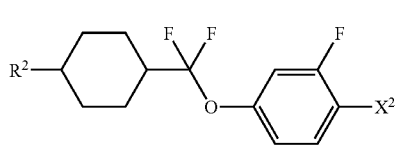
(2-12)
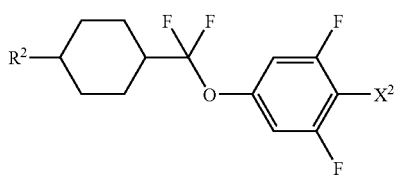
(2-13)
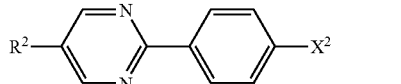
(2-14)
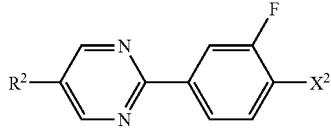
(2-15)
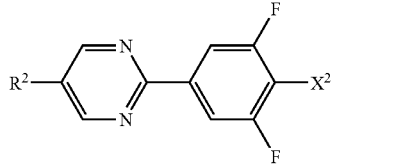
(2-16)
(3-1)
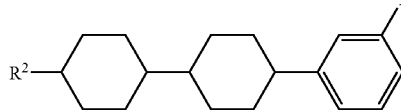
(3-2)
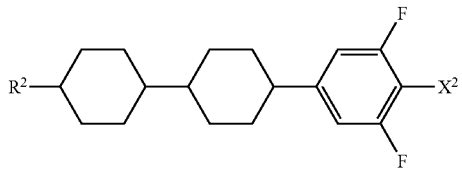
(3-3)
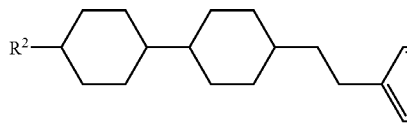
(3-4)
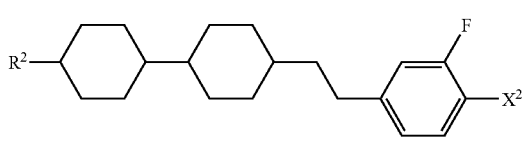
(3-5)
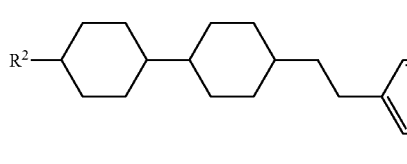
(3-6)
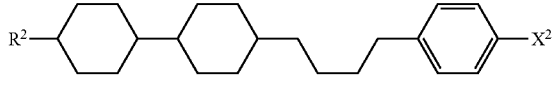
(3-7)
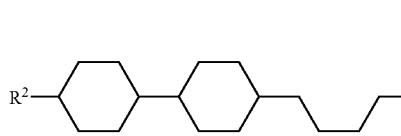
(3-8)

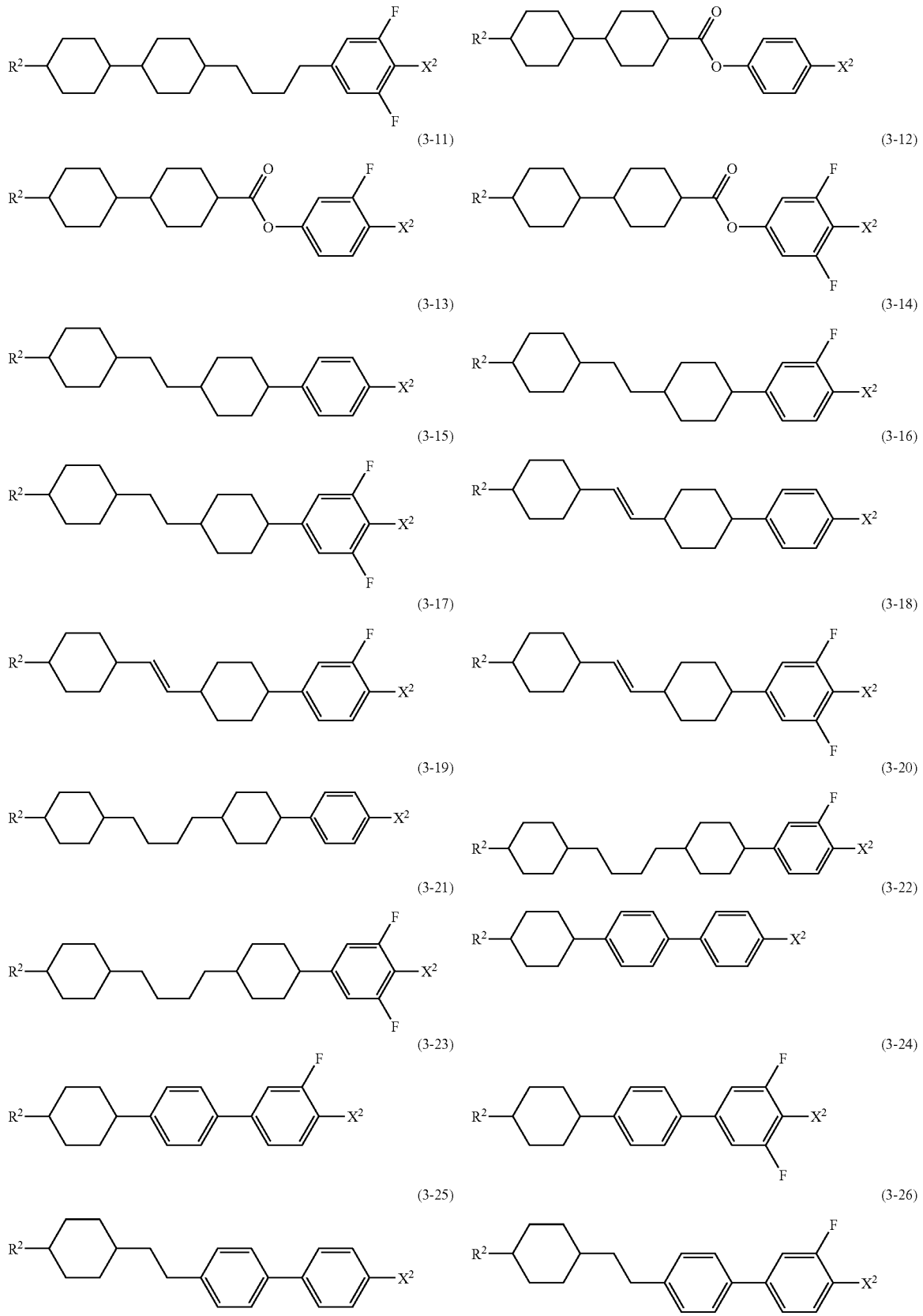

-continued
(3-27) 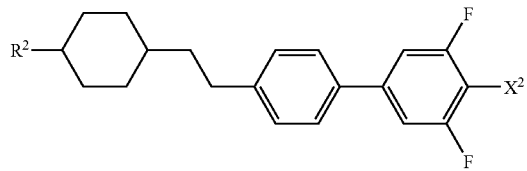
(3-28) 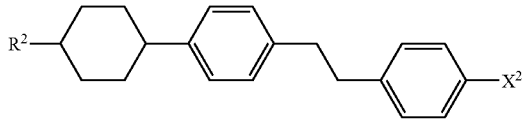
(3-29) 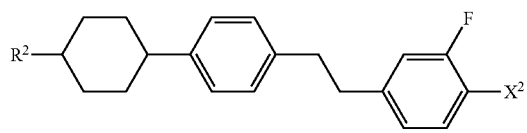
(3-30) 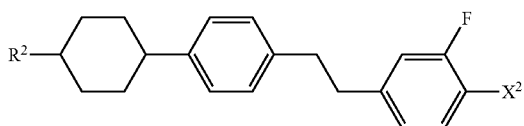
(3-31) 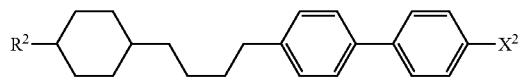
(3-32) 
(3-33) 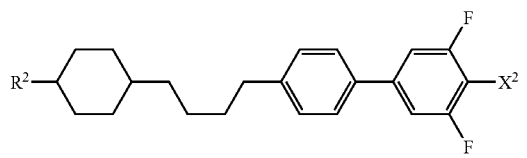
(3-34) 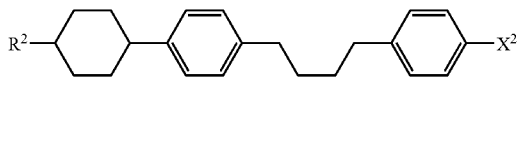
(3-35) 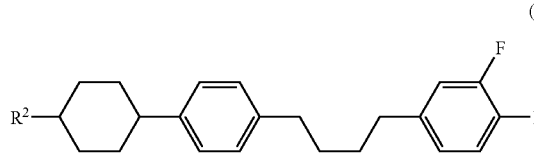
(3-36) 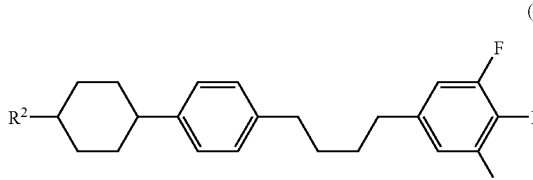
(3-37) 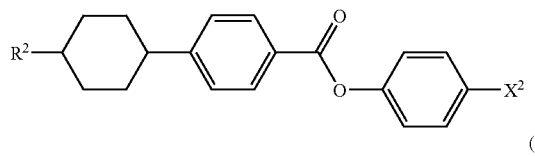
(3-38) 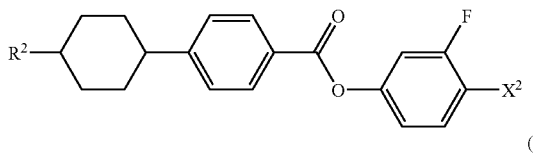
(3-39) 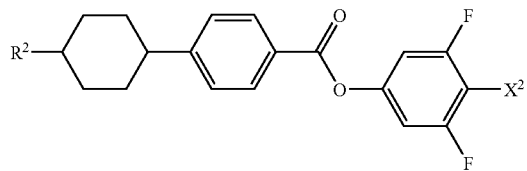
(3-40) 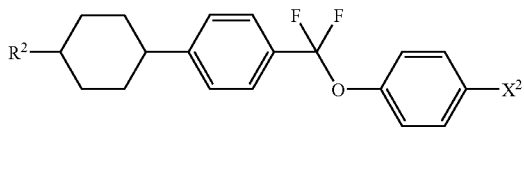
(3-41) 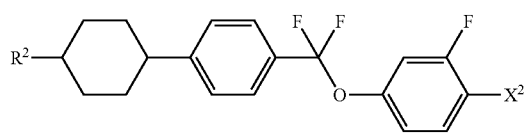
(3-42) 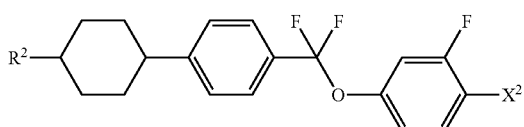
(3-43) 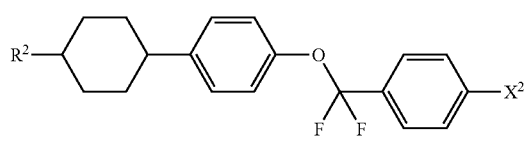
(3-44) 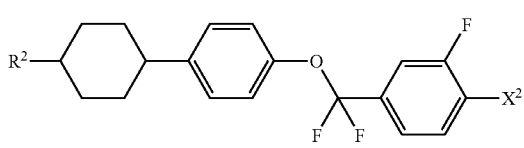

-continued
(3-45)
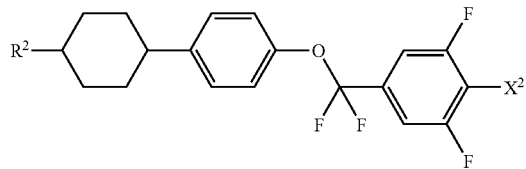
(3-46)
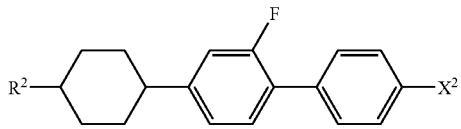
(3-47)
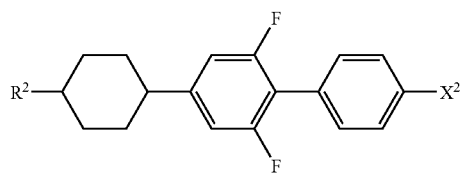
(3-48)
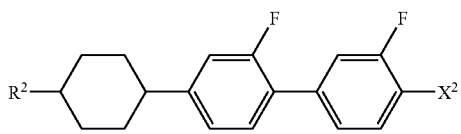
(3-49)
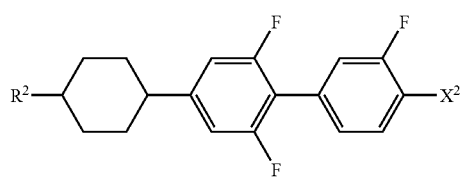
(3-50)
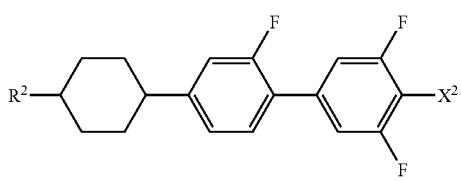
(3-51)
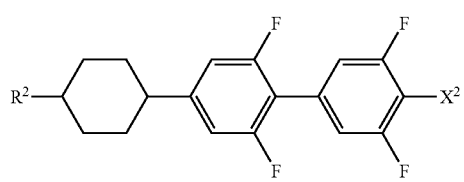
(3-52)
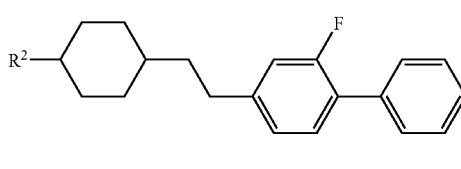
(3-53)
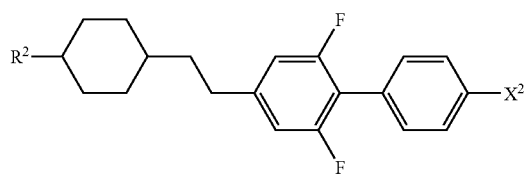
(3-54)
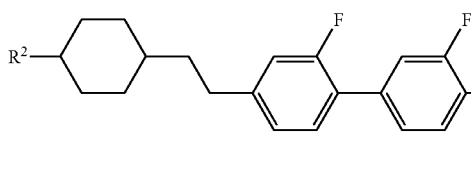
(3-55)
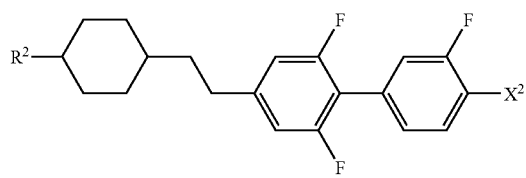
(3-56)
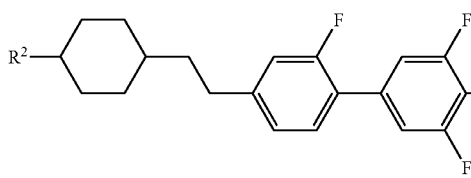
(3-57)
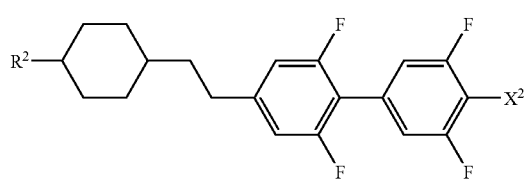
(3-58)
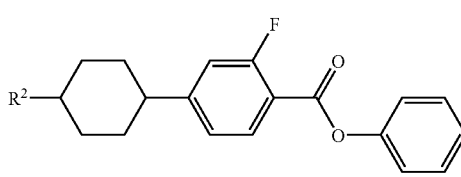
(3-59)
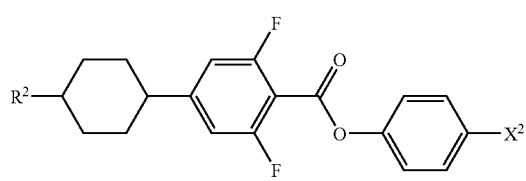
(3-60)
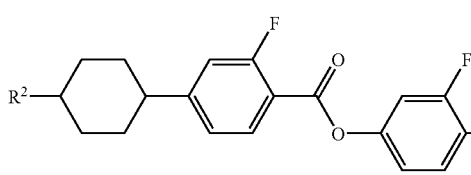

-continued
(3-61)
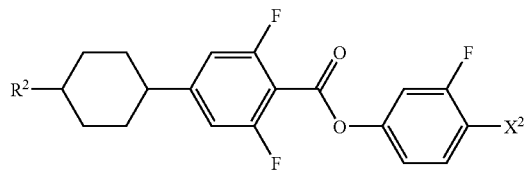
(3-62)
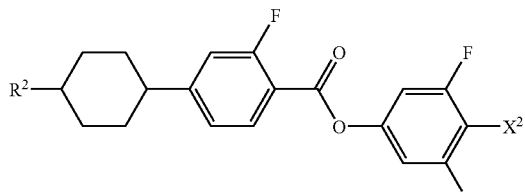
(3-63)
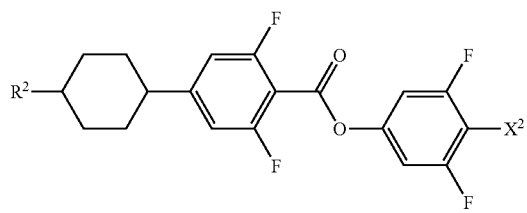
(3-64)
(3-65)
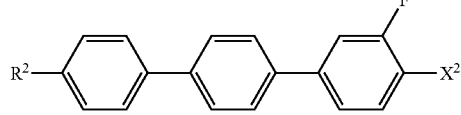
(3-66)
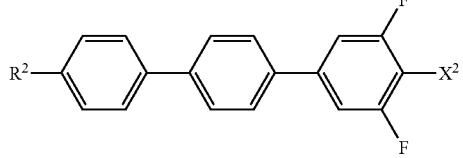
(3-67)
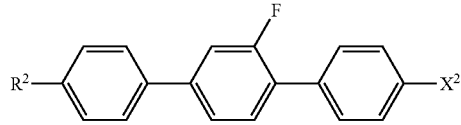
(3-68)
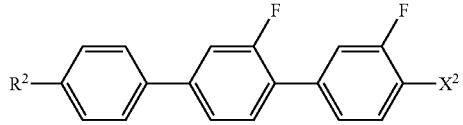
(3-69)
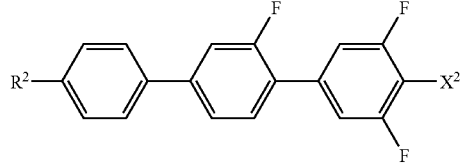
(3-70)
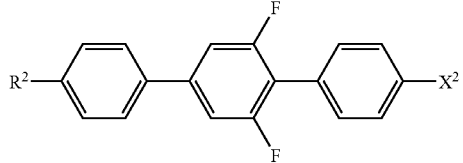
(3-71)
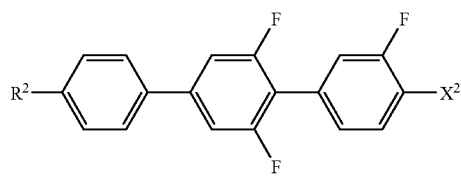
(3-72)
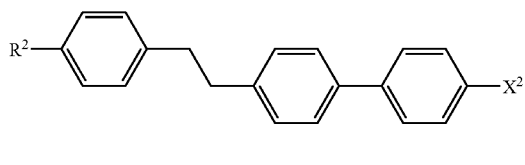
(3-73)
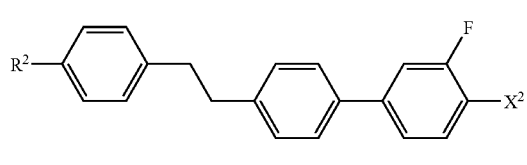
(3-74)
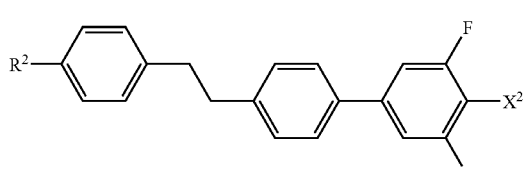
(3-75)
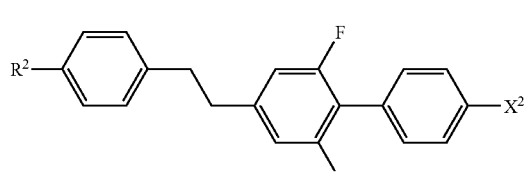
(3-76)
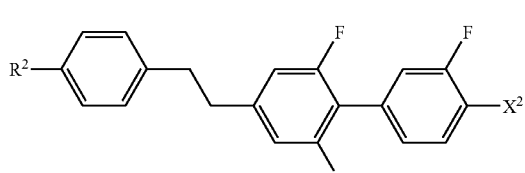

-continued
(3-77)
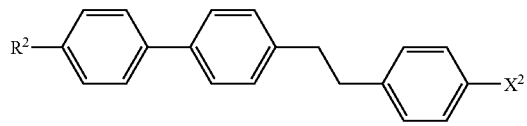
(3-78)
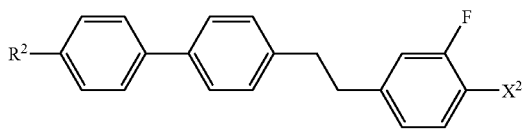
(3-79)
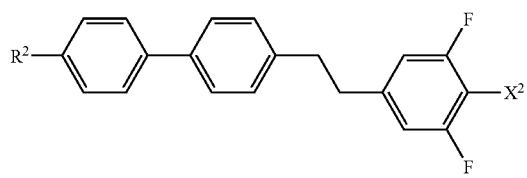
(3-80)
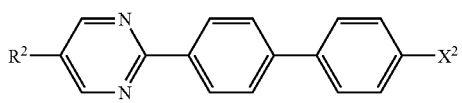
(3-81)
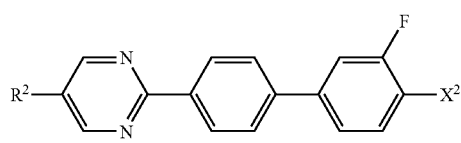
(3-82)
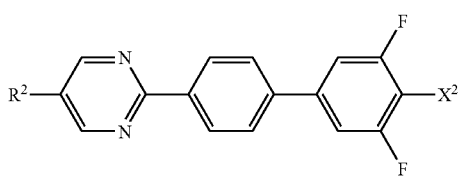
(3-83)
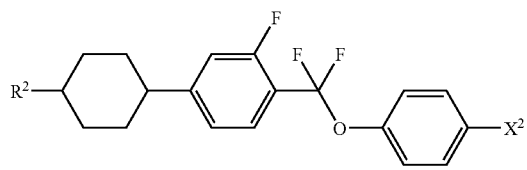
(3-84)
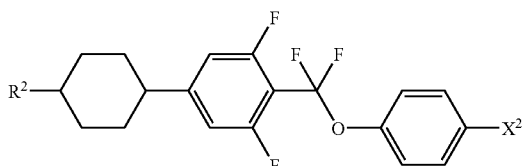
(3-85)
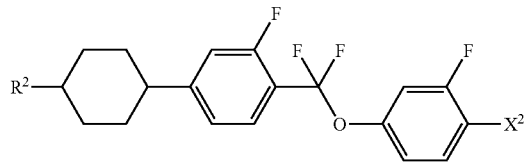
(3-86)
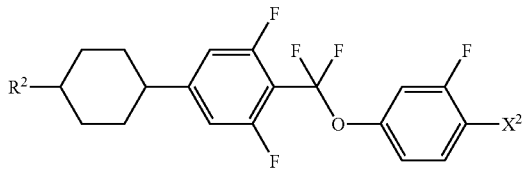
(3-87)
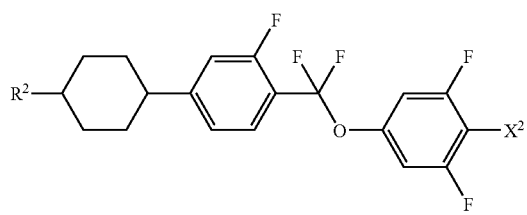
(3-88)
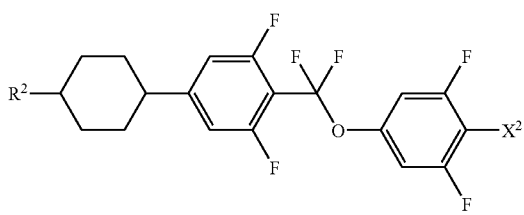
(3-89)
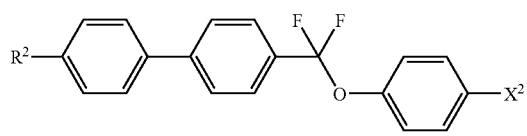
(3-90)
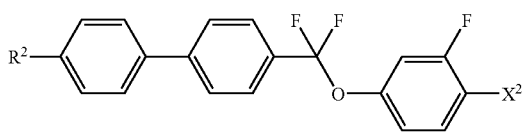
(3-91)
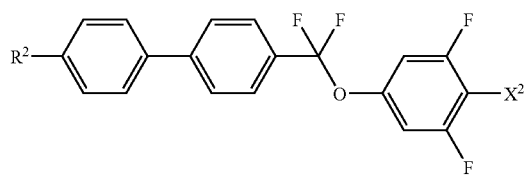
(3-92)
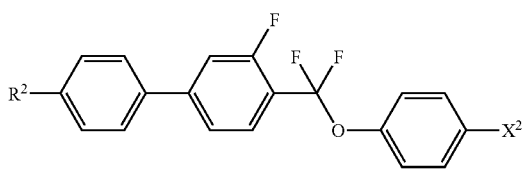

-continued
(3-93) 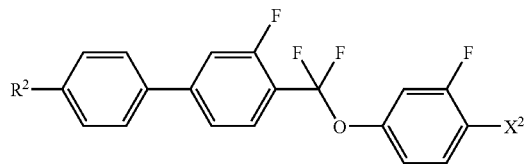
(3-94) 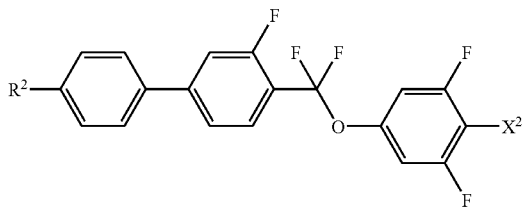
(3-95) 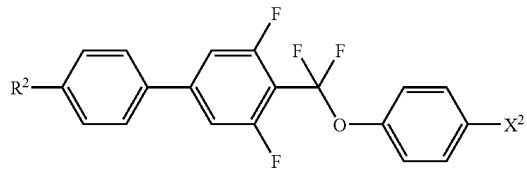
(3-96) 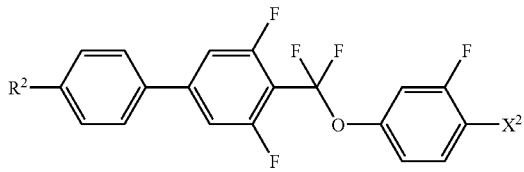
(3-97) 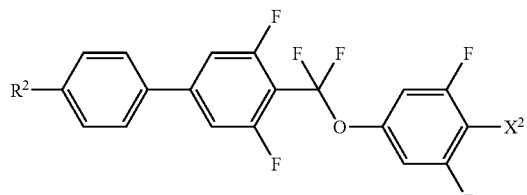
(3-98) 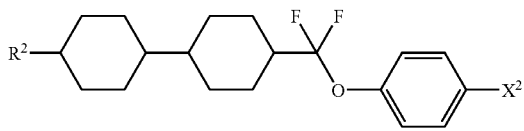
(3-99) 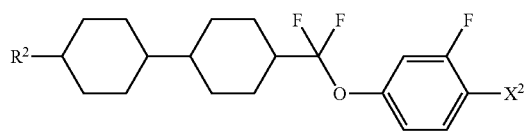
(3-100) 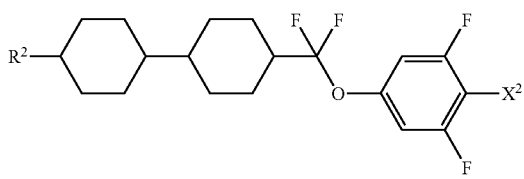
(3-101) 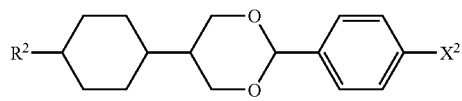
(3-102) 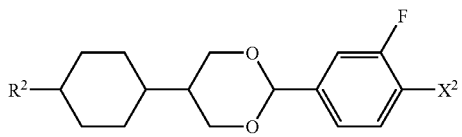
(3-103) 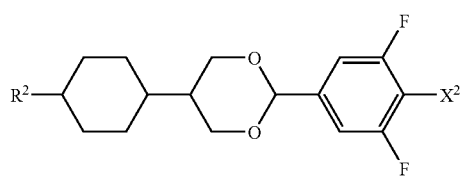
(3-104) 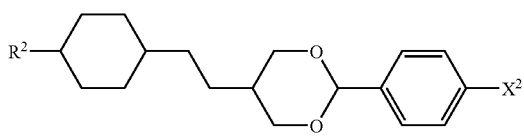
(3-105) 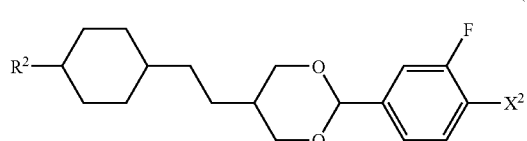
(3-106) 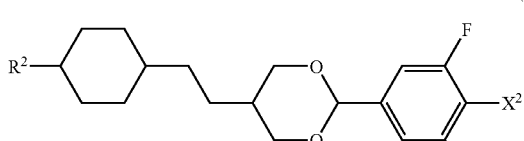
(3-107) 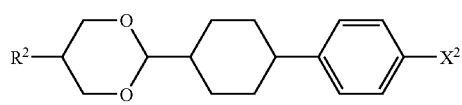
(3-108) 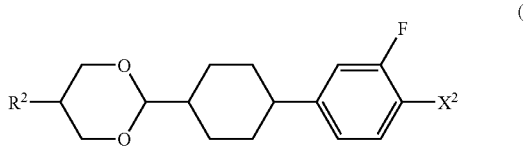

-continued
(3-109) 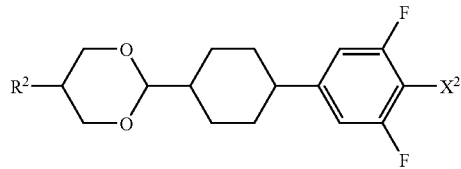
(3-110) 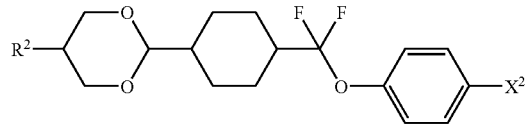
(3-111) 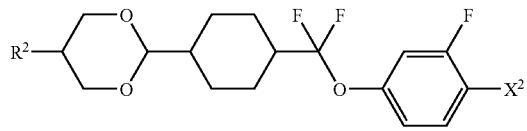
(3-112) 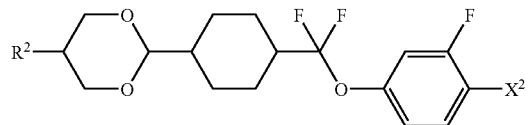
(4-1) 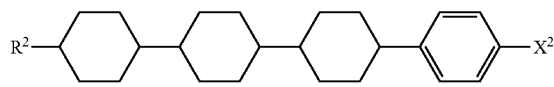
(4-2) 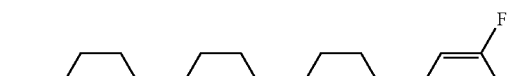
(4-3) 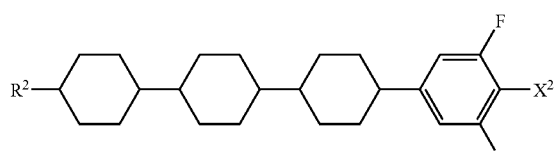
(4-4) 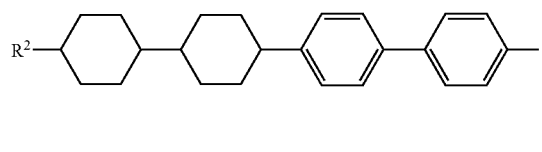
(4-5) 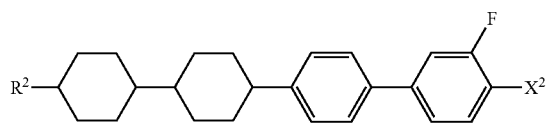
(4-6) 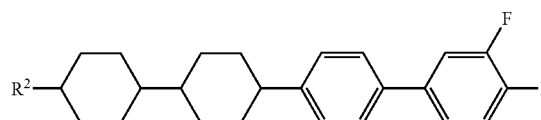
(4-7) 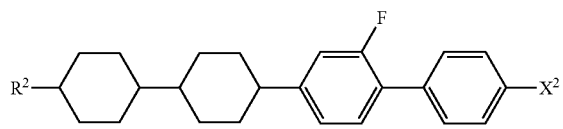
(4-8) 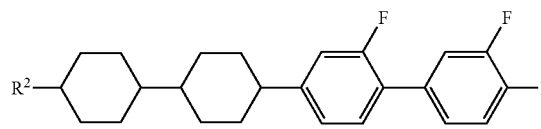
(4-9) 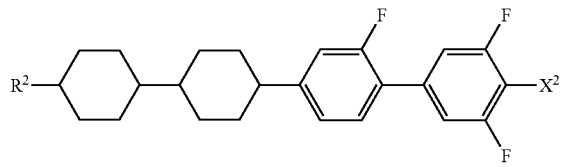
(4-10) 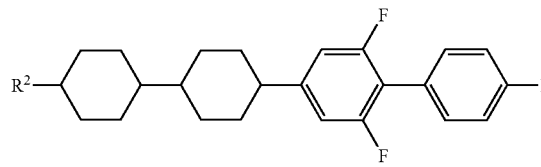
(4-11) 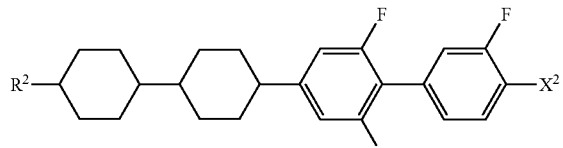
(4-12) 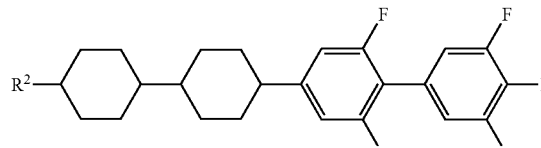
(4-13) 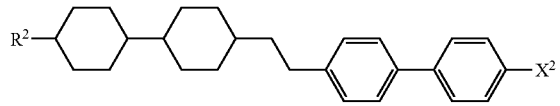
(4-14) 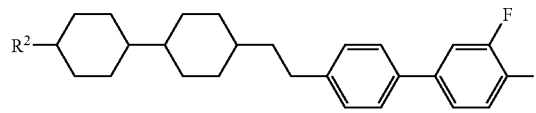

-continued
(4-15) 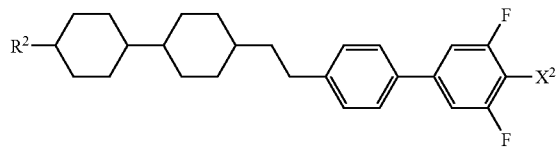
(4-16) 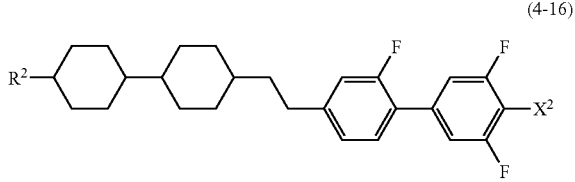
(4-17) 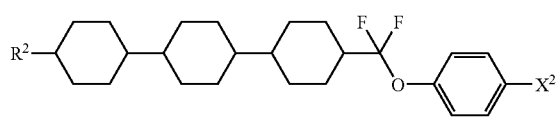
(4-18) 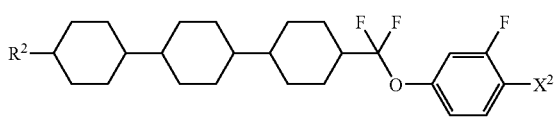
(4-19) 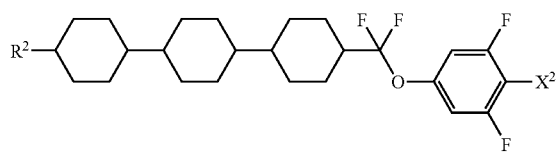
(4-20) 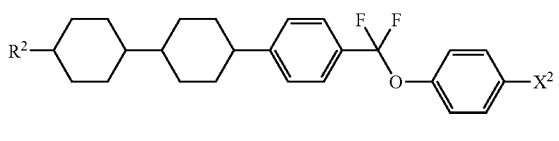
(4-21) 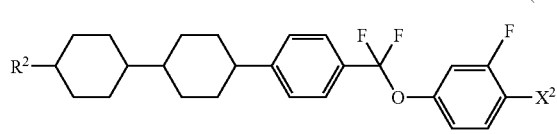
(4-22) 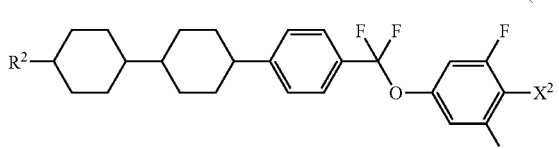
(4-23) 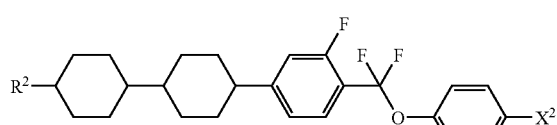
(4-24) 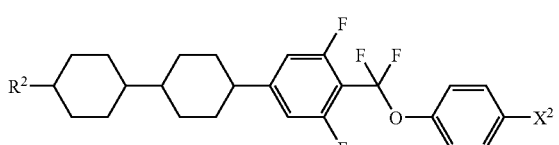
(4-25) 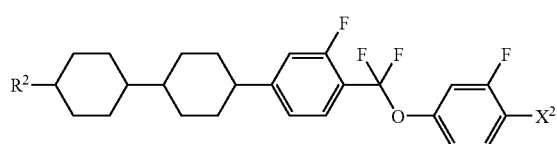
(4-26) 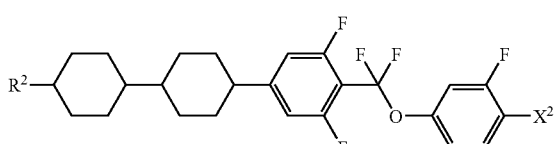
(4-27) 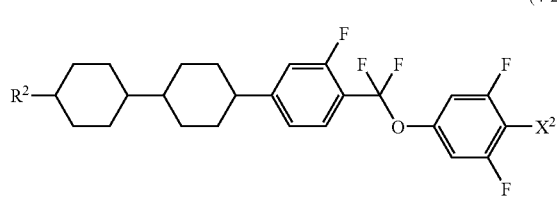
(4-28) 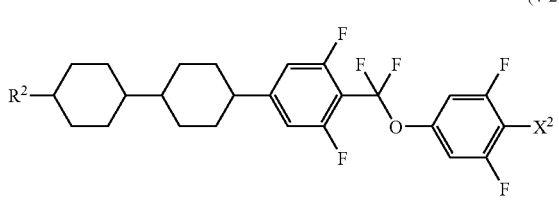
(4-29) 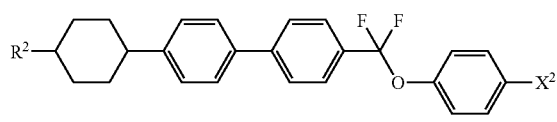
(4-30) 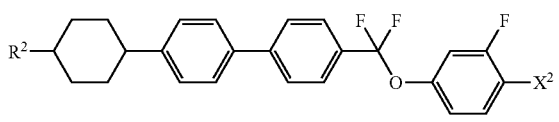
(4-31) 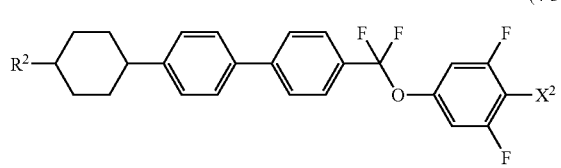
(4-32) 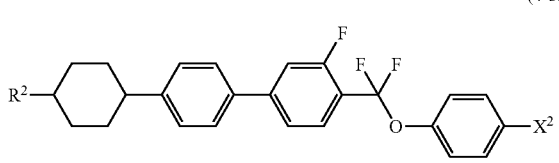

-continued
(4-33)
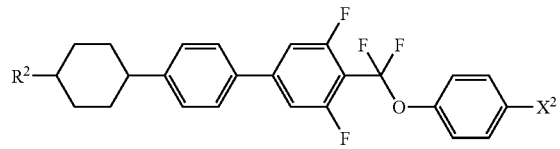
(4-34)
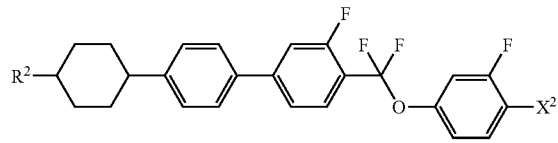
(4-35)
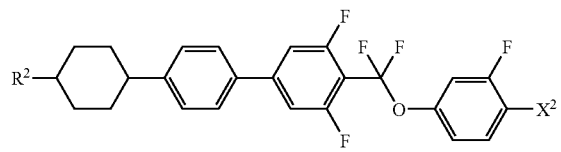
(4-36)
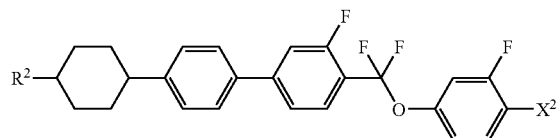
(4-37)
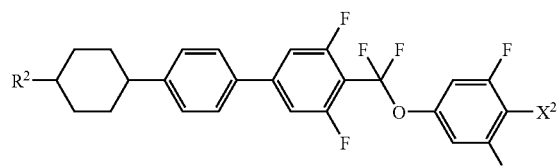
(4-38)
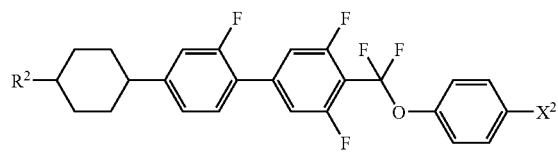
(4-39)
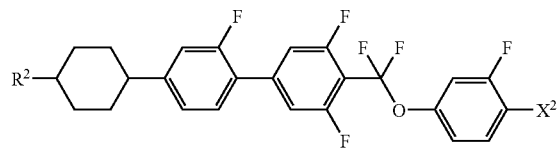
(4-40)
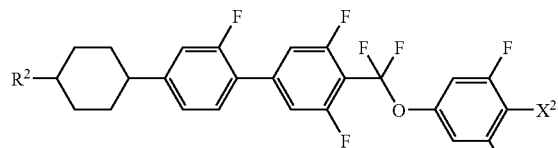
(4-41)
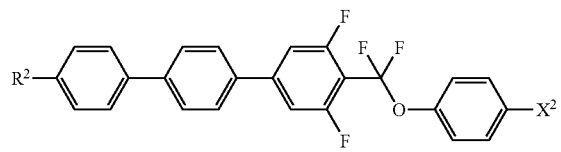
(4-42)
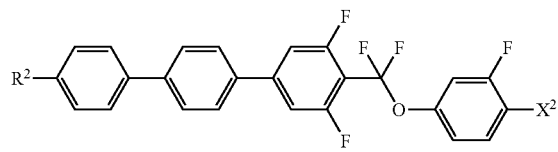
(4-43)
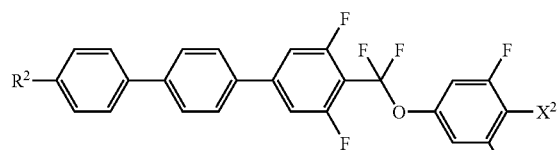
(4-44)
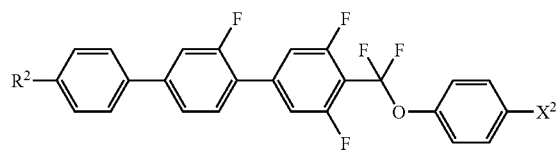
(4-45)
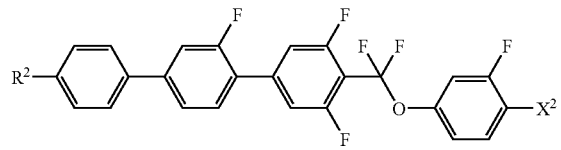
(4-46)
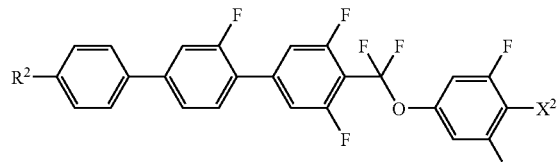
(4-47)
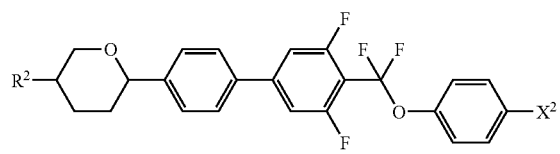
(4-48)
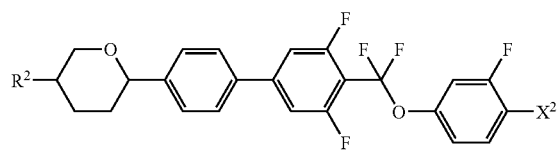

(4-49)
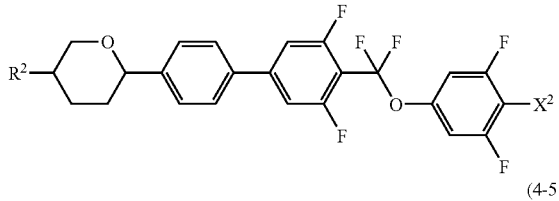

(4-50)
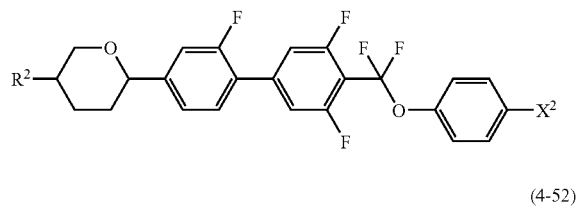

(4-51)
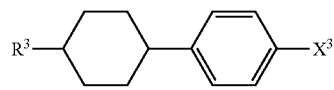

(4-52)

In these formulae, $R^2$ and $X^2$ are defined as above.

The compounds of formulae (2)-(4) (component B) have positive dielectric anisotropy and very high thermal or chemical stability, and are thus useful for preparing liquid crystal compositions for TFT devices. Relative to the total weight of the liquid crystal composition, the content of the component B may be 1-99 wt %, preferably 10-97 wt % and more preferably 40-95 wt %. When the composition further contains the compounds of formulae (11)-(13) (component E), the viscosity can be adjusted.

Suitable examples of the compounds of formula (5) (component C) are formulae (5-1)-(5-62).

(5-1)
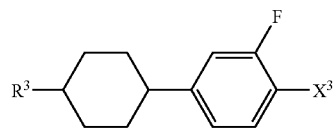

(5-2)
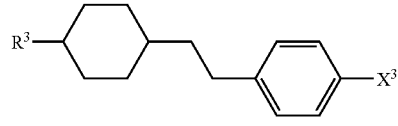

(5-3)
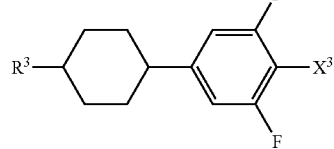

(5-4)
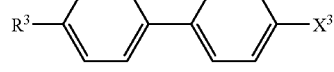

(5-5)
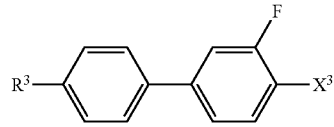

(5-6)

(5-7)
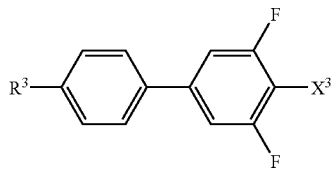

(5-8)

(5-9)
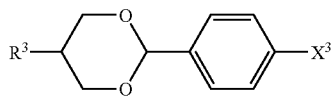

(5-10)
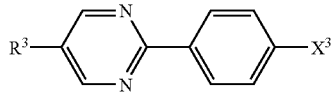

(5-11)
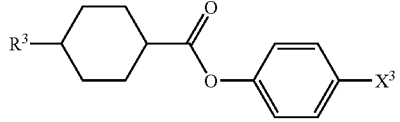

(5-12)
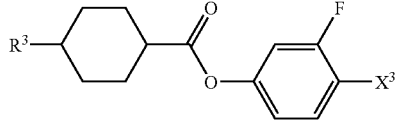

(5-13)
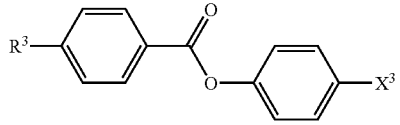

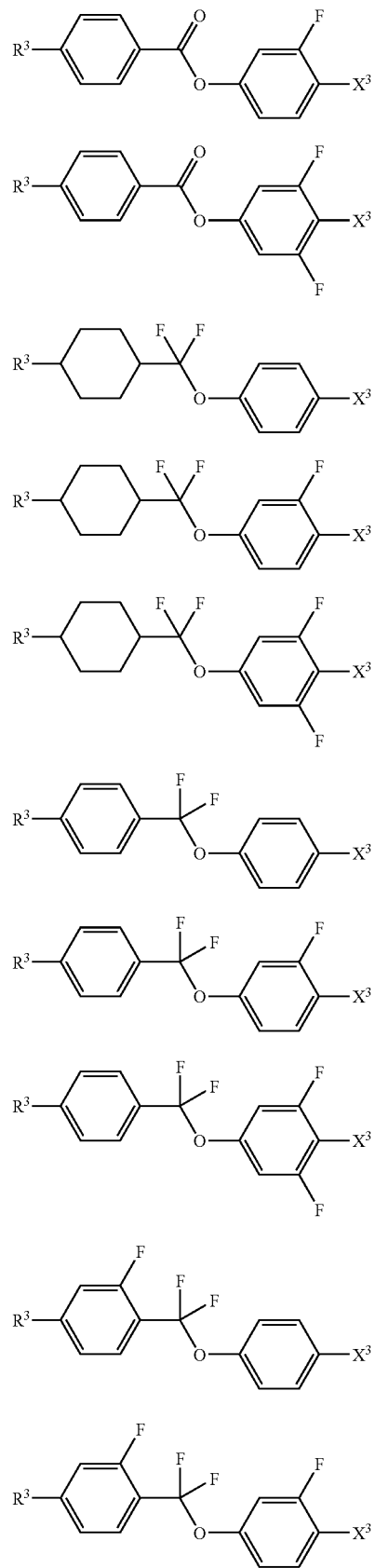
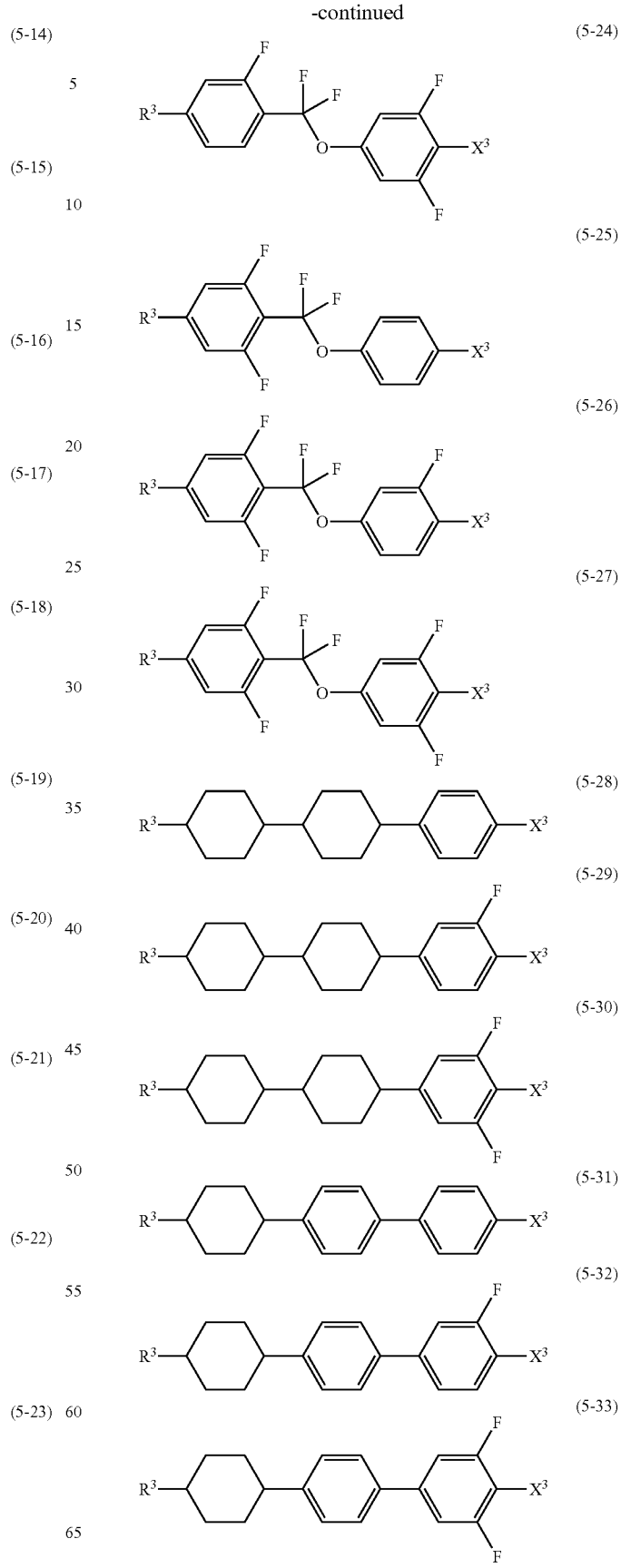

-continued
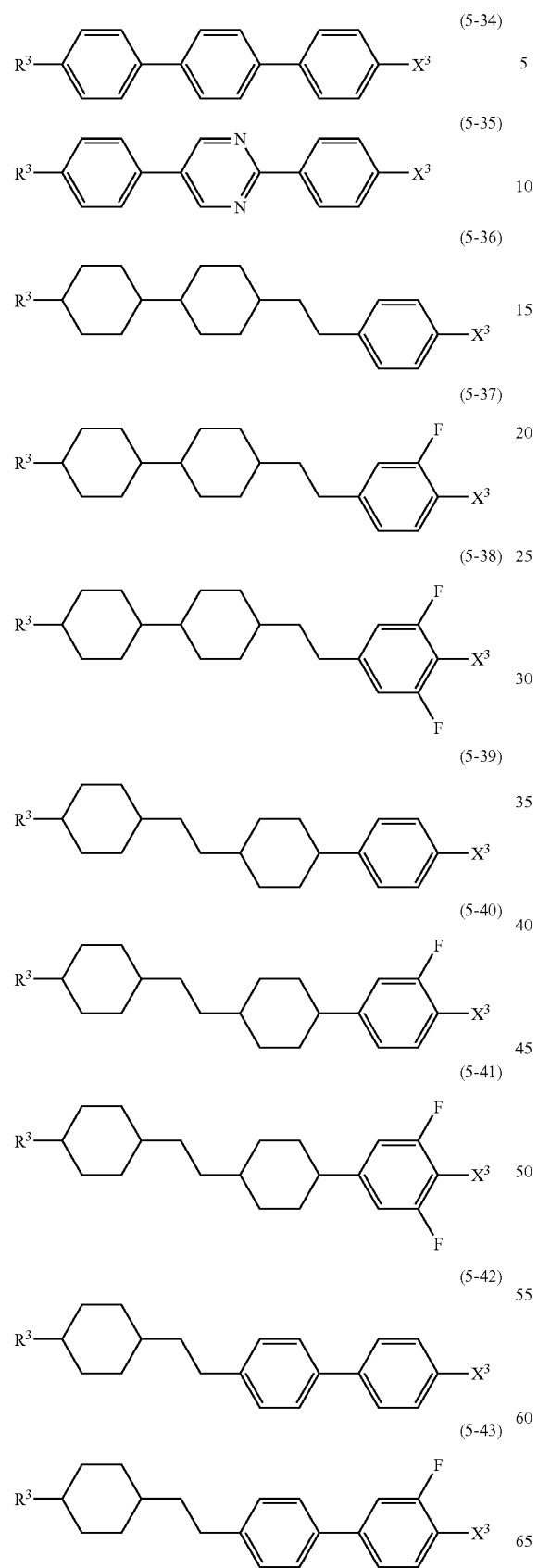
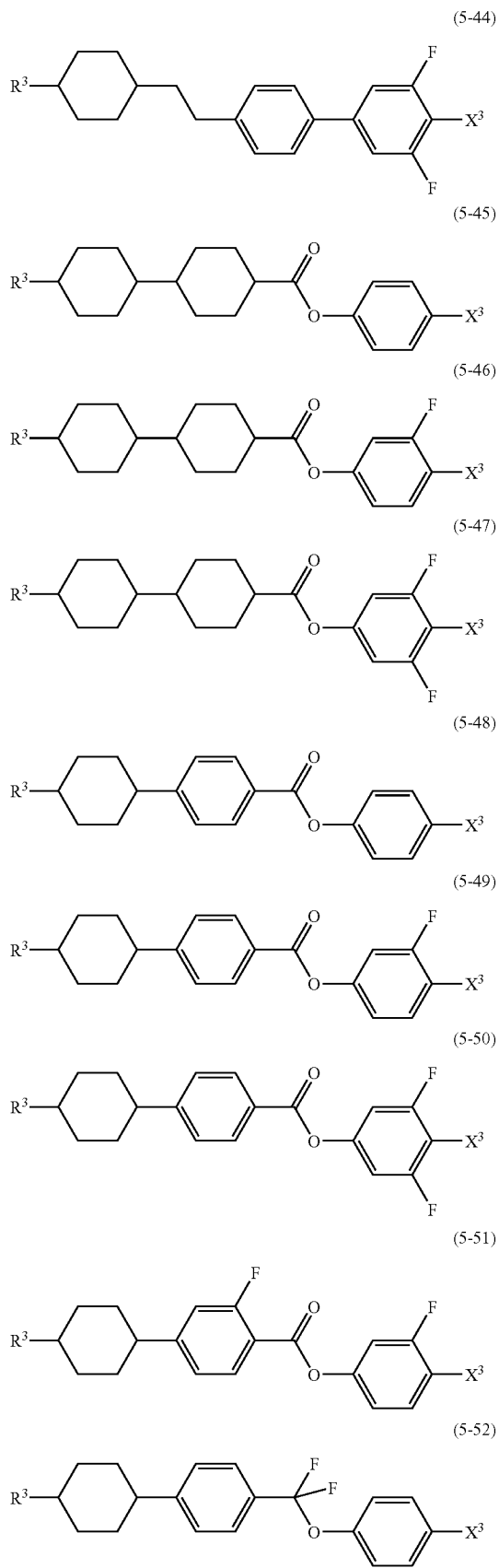

-continued

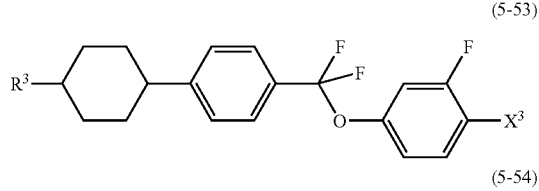
(5-53)

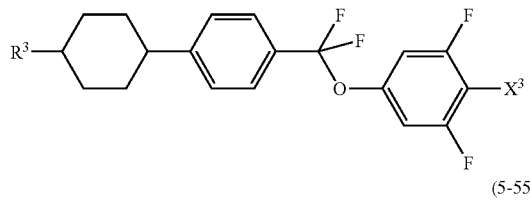
(5-54)

(5-55)

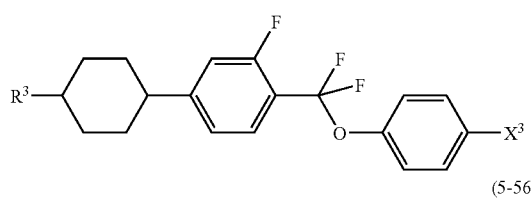
(5-56)

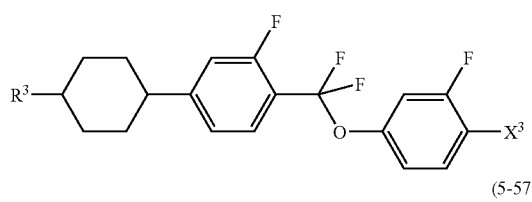
(5-57)

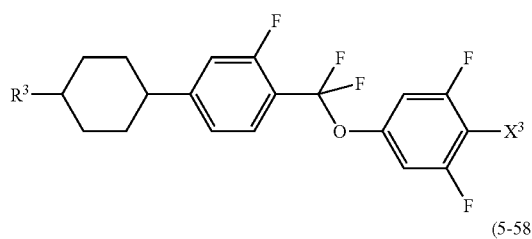
(5-58)

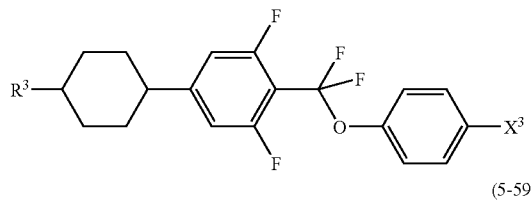
(5-59)

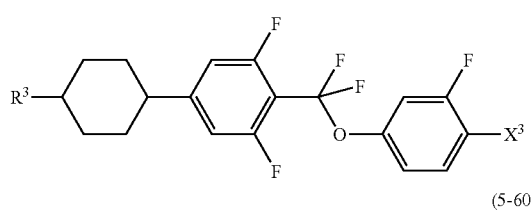
(5-60)

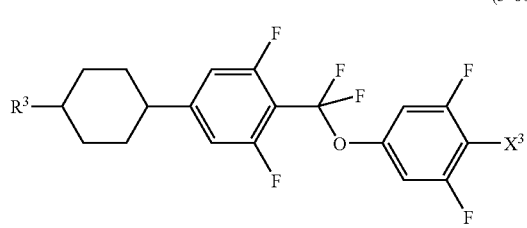

-continued

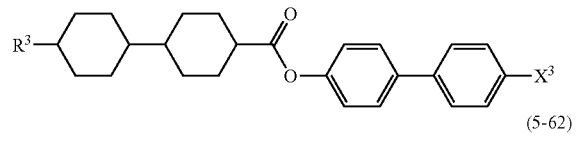
(5-61)

(5-62)

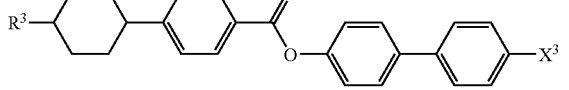

In these formulae, $R^3$ and $X^3$ are defined as above.

The compounds of formula (5) (component C) has large and positive dielectric anisotropy. When the liquid crystal composition contains the component C, the driving voltage thereof can be lowered, the viscosity and optical anisotropy can be adjusted, and the temperature range of the liquid crystal phase can be broadened.

Relative to the total weight of the composition, the content of the component C is preferably 0.1-99.9 wt %, more preferably 10-97 wt % and even more preferably 40-95 wt %. Furthermore, the threshold voltage, temperature range of the liquid crystal phase, optical anisotropy, dielectric anisotropy and viscosity etc. can be adjusted by mixing the components below.

In preparing the liquid crystal composition of this invention having a negative dielectric anisotropy, the component D containing at least one compound selected from the group consisting of formulae (6)-(10) is preferred as a component thereof.

Suitable examples of the compounds of formulae (6)-(10) (component D) are formulae (6-1)-(6-5), (7-1)-(7-9), (8-1)-(8-3) and (10-1)-(10-11).

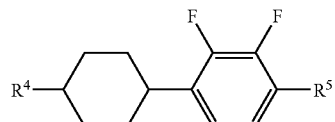
(6-1)

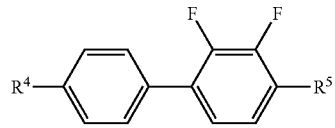
(6-2)

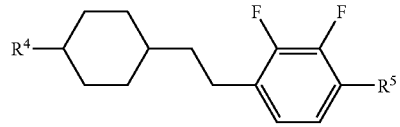
(6-3)

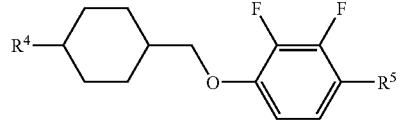
(6-4)

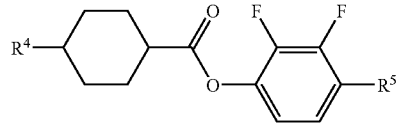
(6-5)

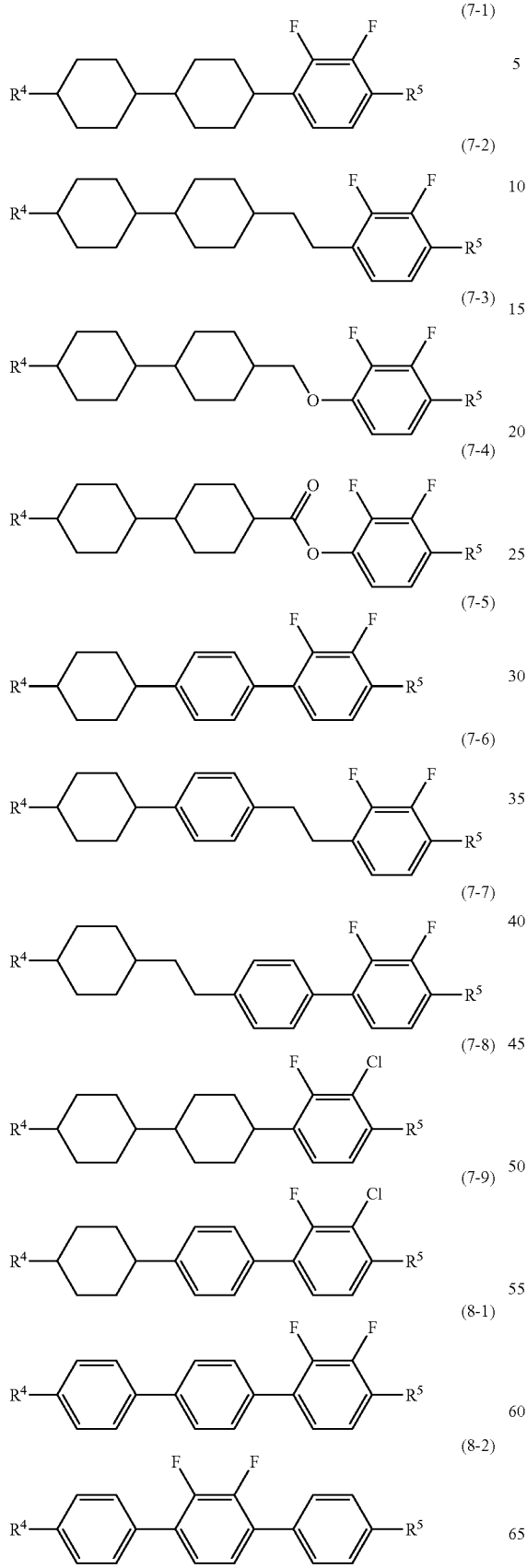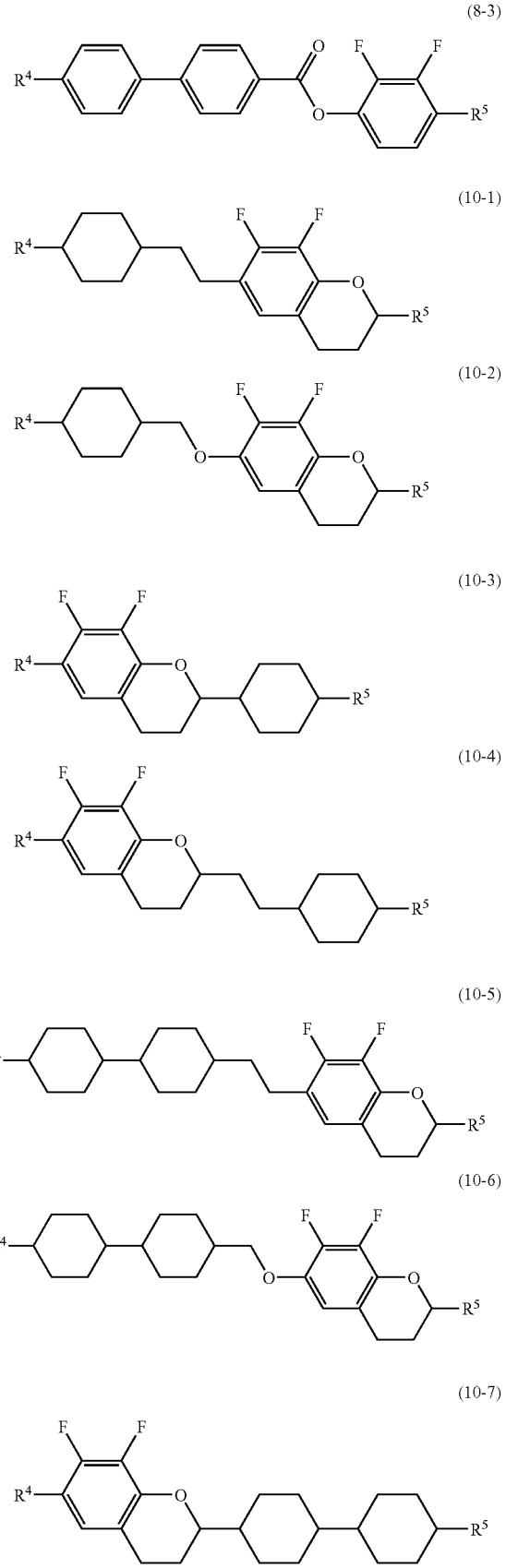

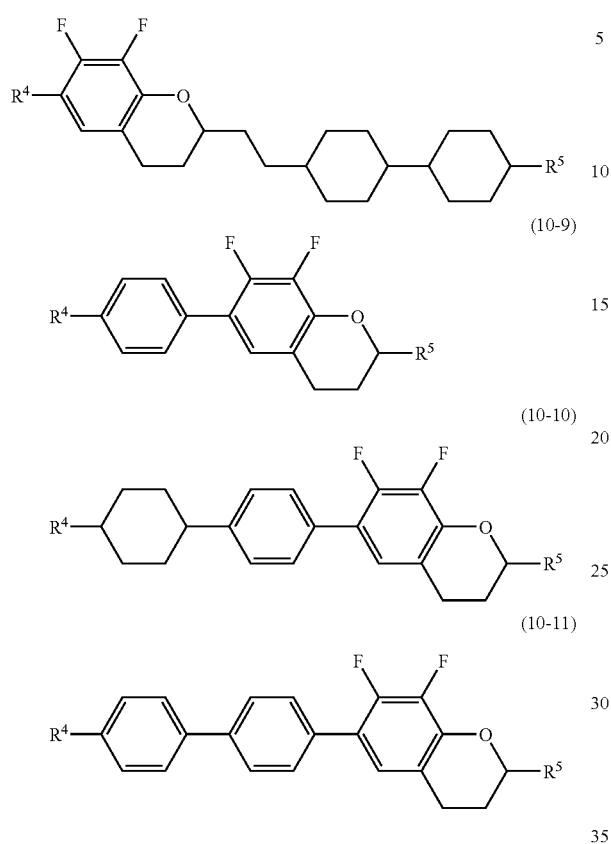

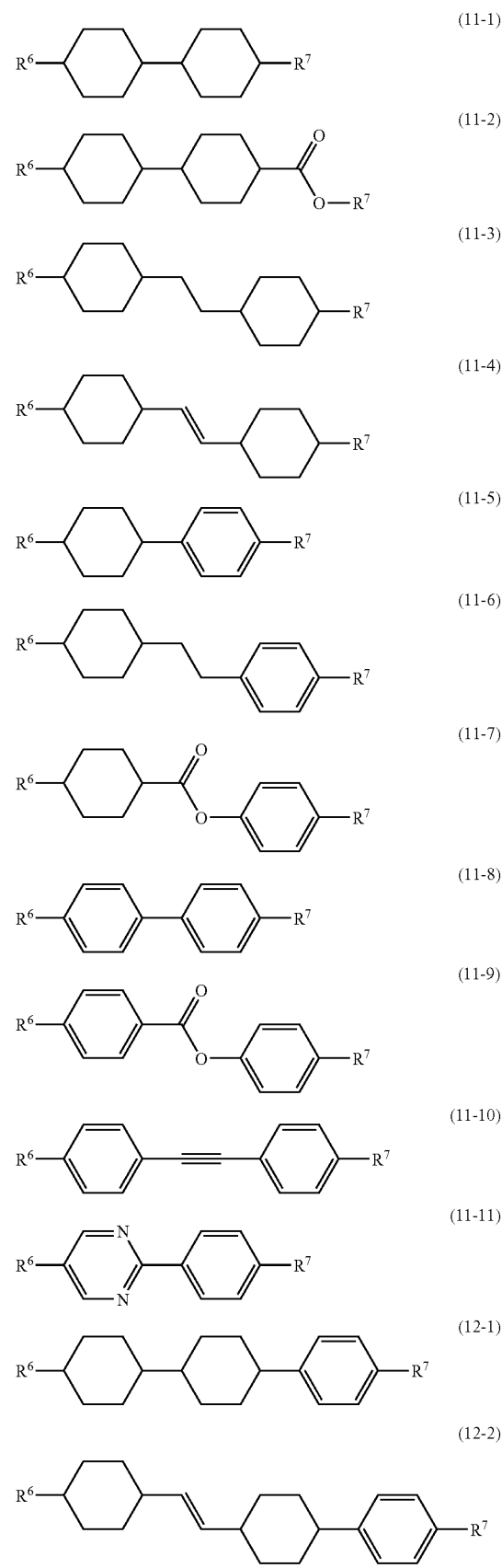

In the formulae, $R^4$ and $R^5$ are defined as above.

These compounds of component D are mainly used in the liquid crystal composition requiring a negative dielectric anisotropy. In the scope of component D, the compounds of formula (6) are bicyclic compounds, and thus mainly have an effect of adjusting the threshold voltage, viscosity or optical anisotropy. Furthermore, as tricyclic compounds, the compounds of formulae (7) and (8) can make the effects of raising the clearing point, broadening the temperature range of the optically isotropic liquid crystal phase, increasing the optical anisotropy, and so on. The compounds of formulae (9) and (10) have dielectric anisotropy which is negative and large in absolute value, and thus mainly have an effect of adjusting the driving voltage.

In preparing a composition having a negative dielectric anisotropy, relative to the total weight of the composition, the content of the component D is preferably 40 wt % or more, and more preferably 50-95 wt %. Moreover, the elastic constants and the voltage-transmittance curve of the composition can be controlled by mixing the component D. When the component D is mixed into a composition having a positive dielectric anisotropy, relative to the total weight of the composition, the content of the component D is preferably 30 wt % or less.

Suitable examples of the compounds of formulae (11), (12) and (13) (component E) are formulae (11-1)-(11-11), (12-1)-(12-18) and (13-1)-(13-6).

-continued (12-3)
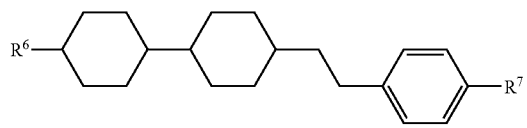

(12-4)
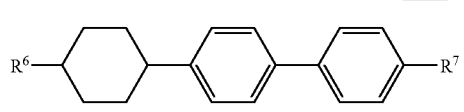

(12-5)
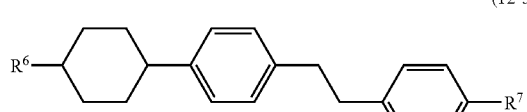

(12-6)
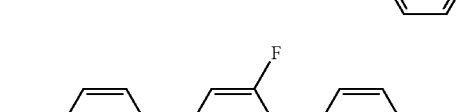

(12-7)
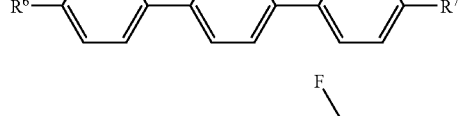

(12-8)
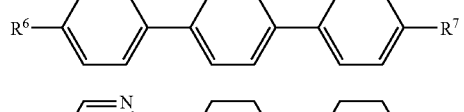

(12-9)
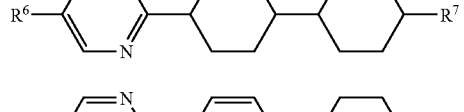

(12-10)
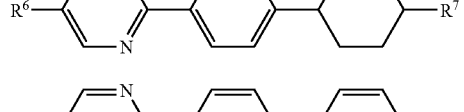

(12-11)
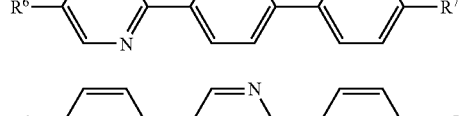

(12-12)
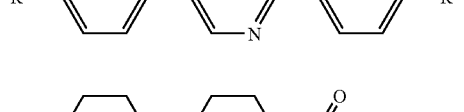

(12-13)
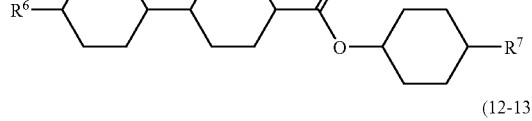

(12-14)
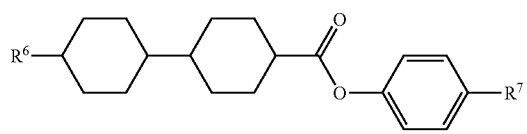

-continued (12-15)
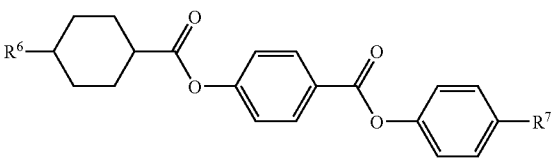

(12-16)
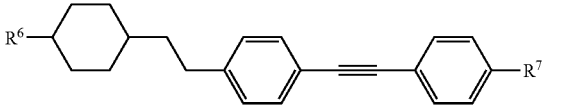

(12-17)
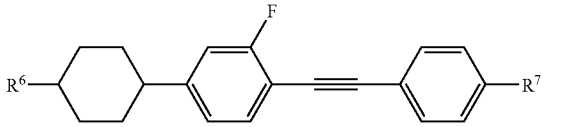

(12-18)
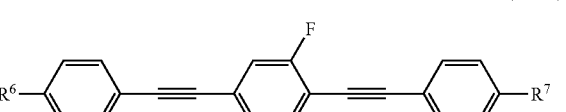

(13-1)
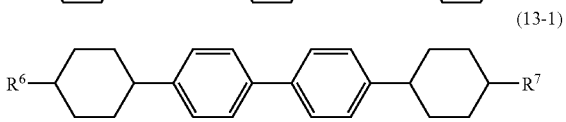

(13-2)
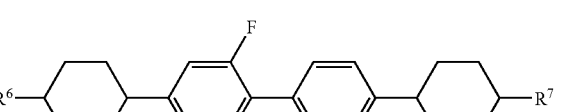

(13-3)
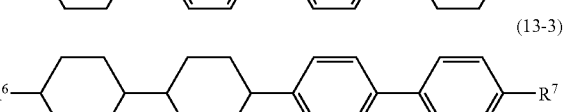

(13-4)
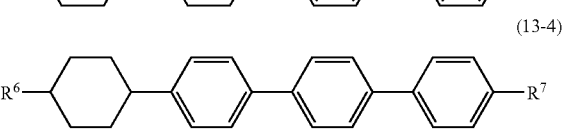

(13-5)
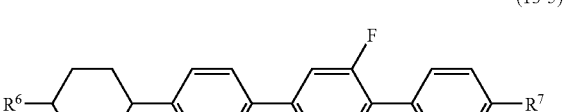

(13-6)
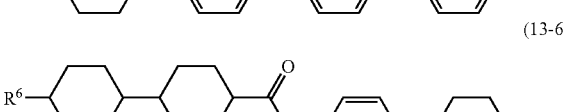

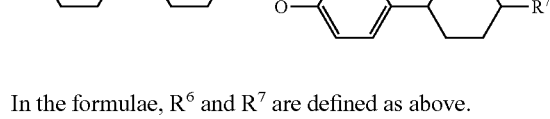

In the formulae, $R^6$ and $R^7$ are defined as above.

The compounds of formulae (11)-(13) (component E) have a small absolute value of dielectric anisotropy, and are nearly neutral. A compound of formula (11) mainly has an effect of adjusting the viscosity or optical anisotropy, and the compounds of formulae (12) and (13) have an effect of broadening the temperature range of the optically isotropic liquid crystal phase, such as raising the clearing point, or have an effect of adjusting the optical anisotropy.

If the content of the compounds of component E is increased, the driving voltage of the liquid crystal composition is raised, and the viscosity is lowered. Therefore, it is expected to have a high content as long as a desired driving voltage of the liquid crystal composition can be made. In preparing a liquid crystal composition for a TFT device, the content of the component E is preferably 60 wt % or less, and more preferably 40 wt % or less, relative to the total weight of the composition.

The liquid crystal composition of this invention preferably contains 0.1-99 wt % of at least one compound of formula (1) of this invention to exhibit good properties.

The liquid crystal composition of this invention generally can be prepared through a well-know process, for example, a process in which a necessary component is dissolved at a high temperature.

3. Compounds (15)-(19)

A third aspect of this invention is a liquid crystal composition obtained by adding a component selected from the components F and G below to the component A.

A preferred component added to the component A is a mixture obtained by mixing the component F or G, wherein the component F includes at least one compound selected from the group consisting of the compounds of formulae (15), (16), (17) and (18) above, and the component G includes at least one compound selected from the group consisting of the compounds of formula (19) above.

Moreover, for each component of the liquid crystal composition used in this invention, even an analogue containing isotopes of the element has little difference in physical properties.

In the scope of the component F, suitable examples of the compounds of formula (15) are formulae (15-1)-(15-8), suitable examples of the compounds of formula (16) are formulae (16-1)-(16-26), and suitable examples of the compounds of formula (17) are formulae (17-1)-(17-52).

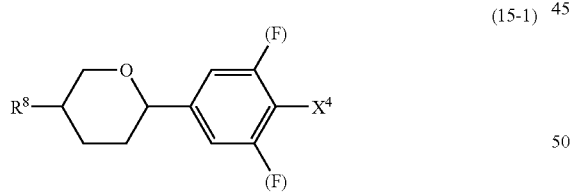
(15-1)

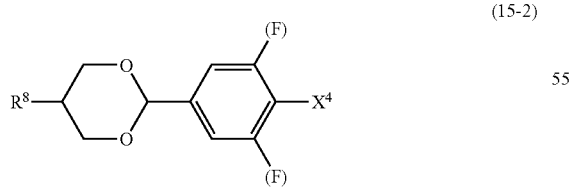
(15-2)

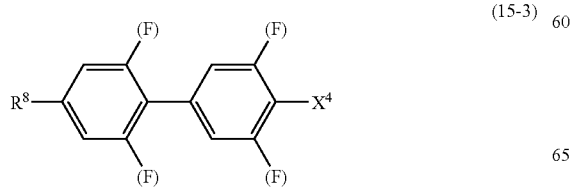
(15-3)

-continued

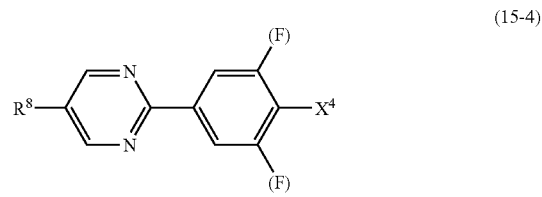
(15-4)

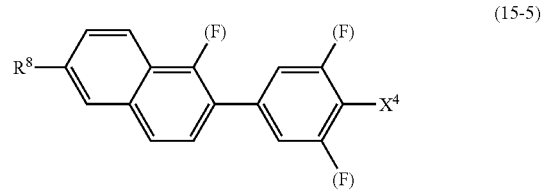
(15-5)

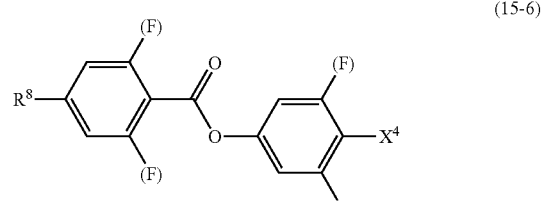
(15-6)

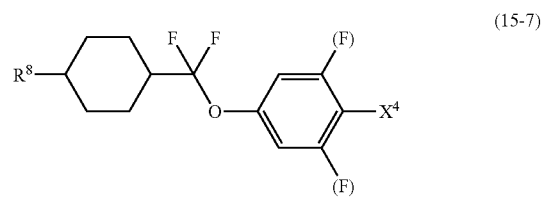
(15-7)

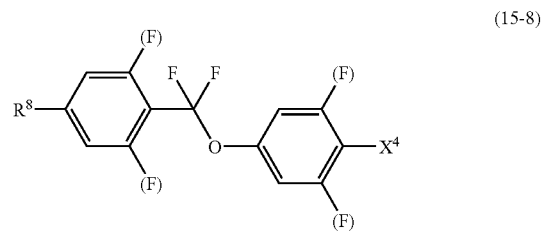
(15-8)

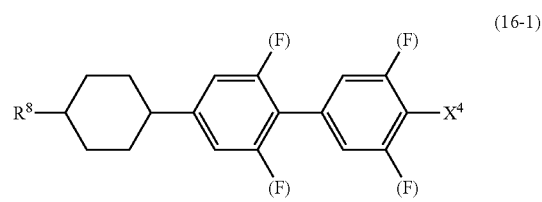
(16-1)

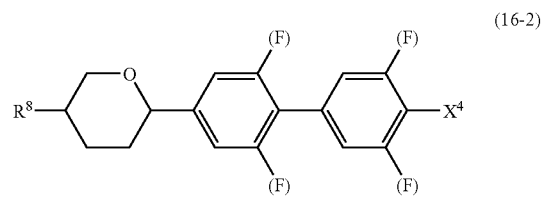
(16-2)

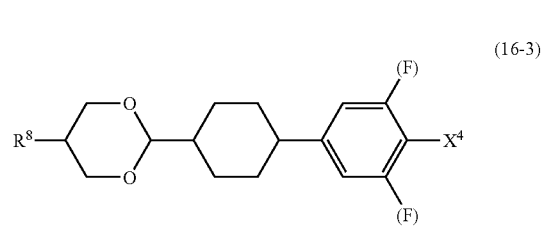
(16-3)

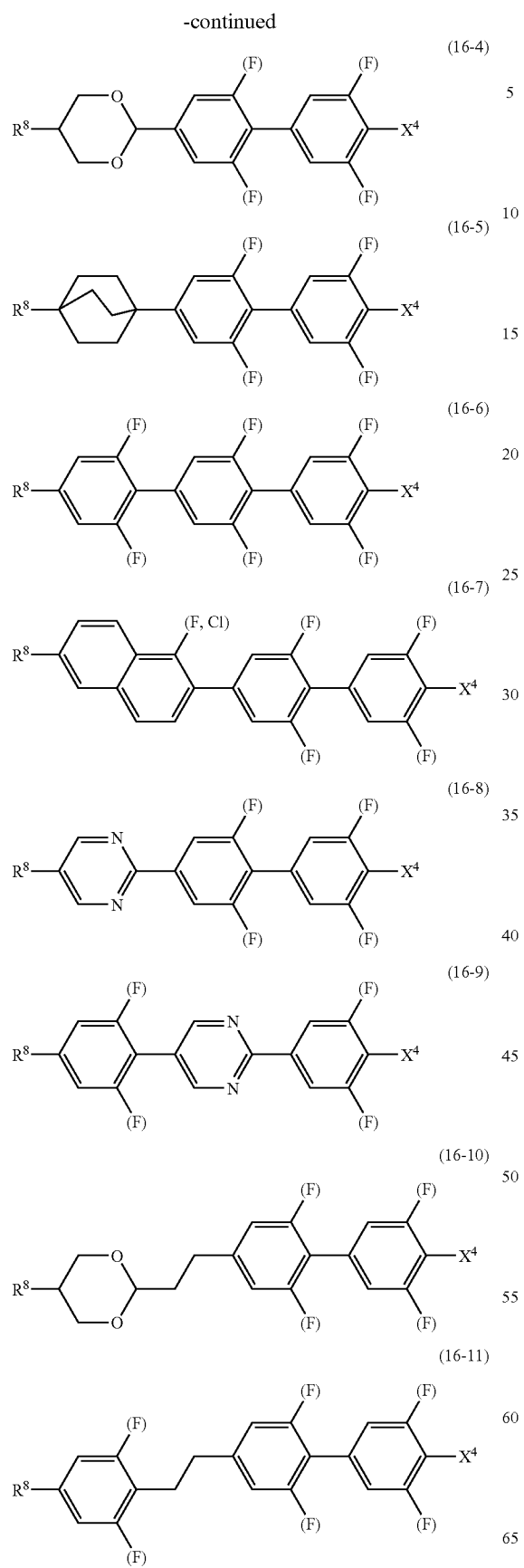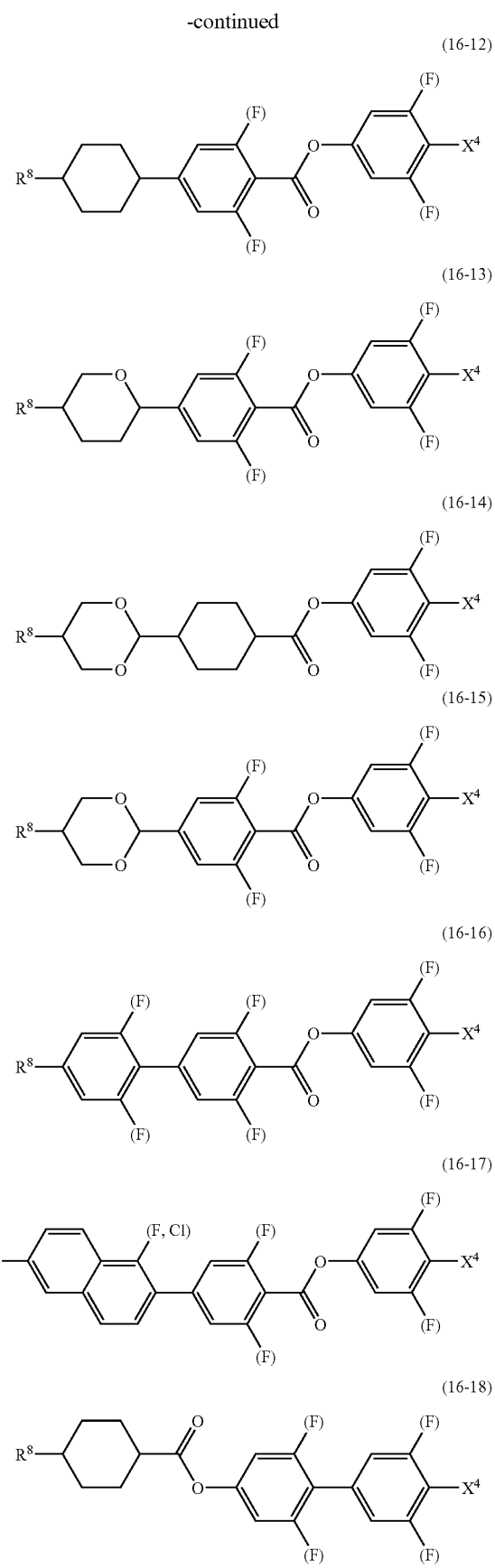

-continued
(16-19)
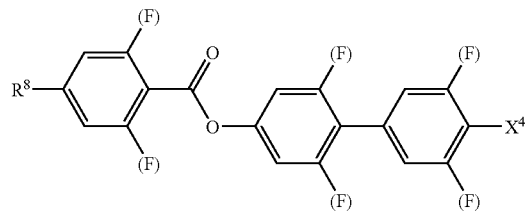
(16-20)
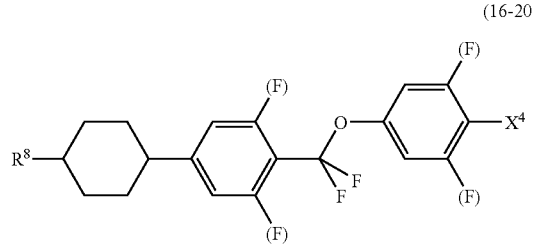
(16-21)
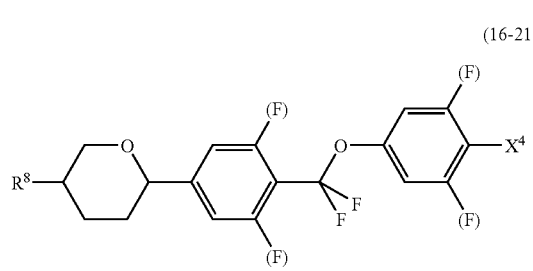
(16-22)
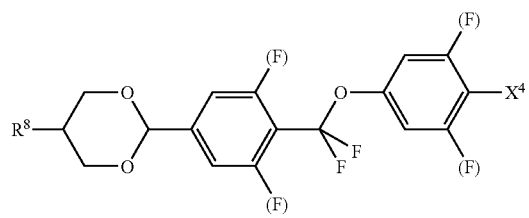
(16-23)
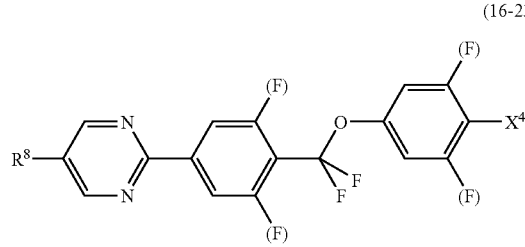
(16-24)
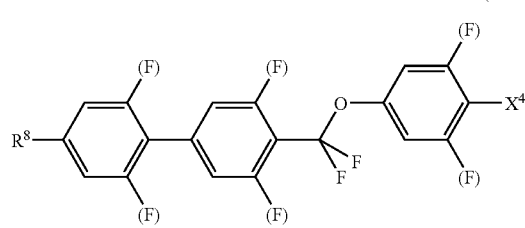
-continued
(16-25)
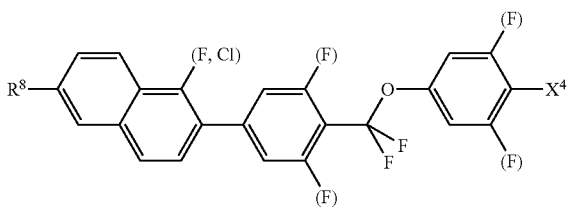
(16-26)
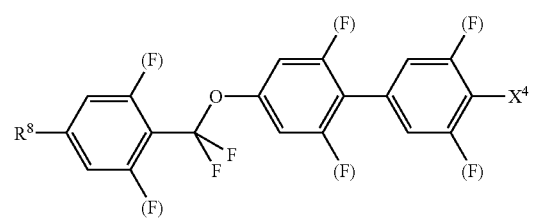
(17-1)
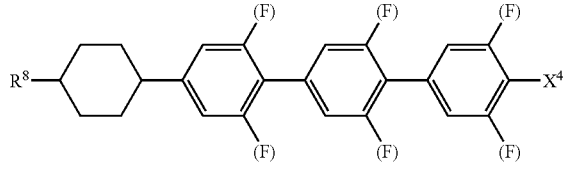
(17-2)
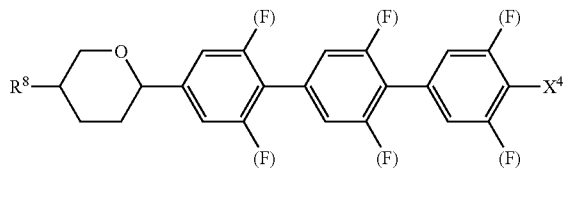
(17-3)
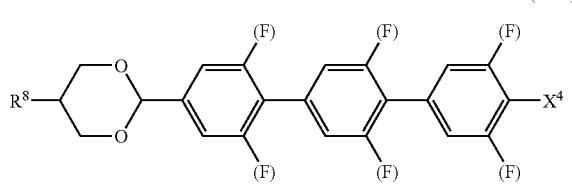
(17-4)
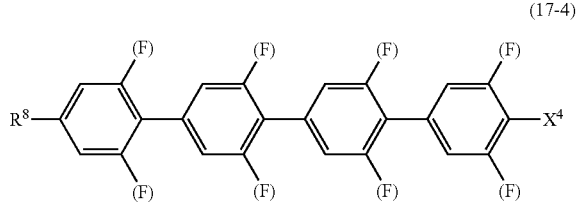
(17-5)
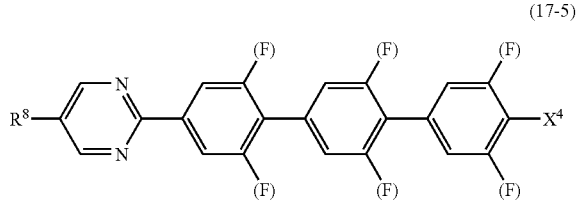

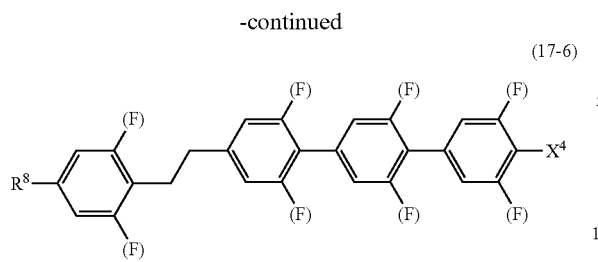
(17-6)
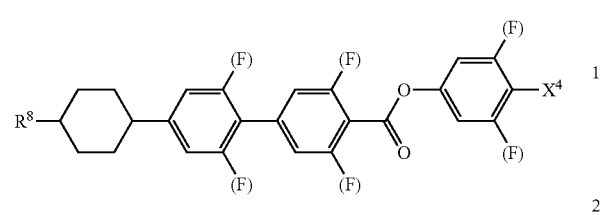
(17-7)
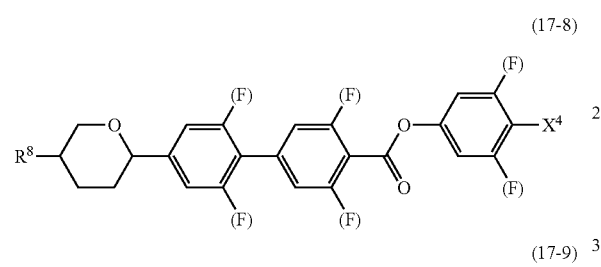
(17-8)
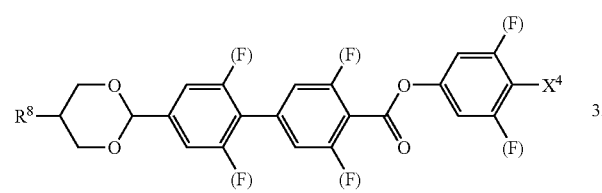
(17-9)
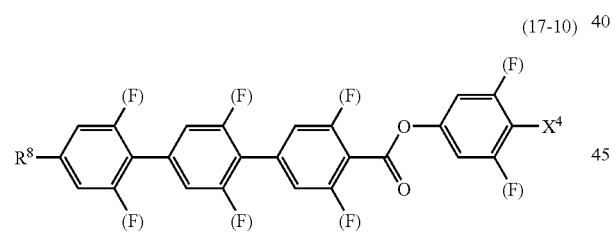
(17-10)
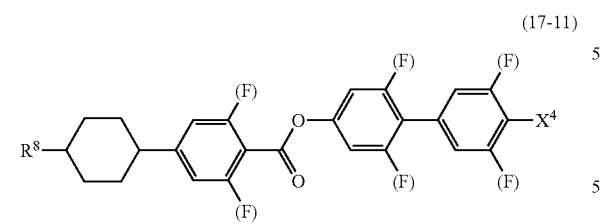
(17-11)
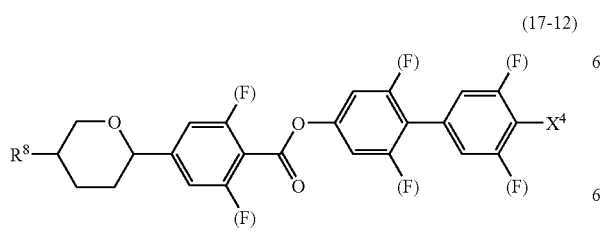
(17-12)
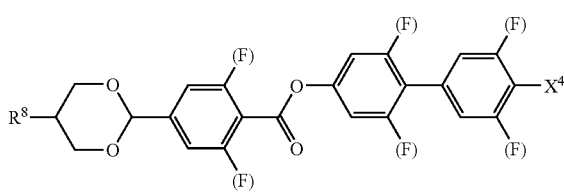
(17-13)
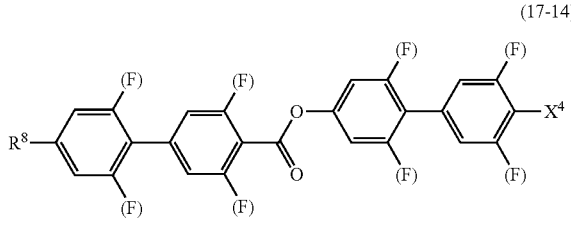
(17-14)
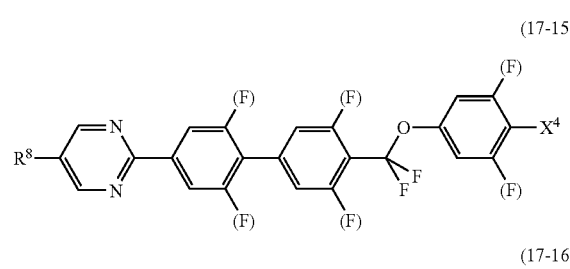
(17-15)
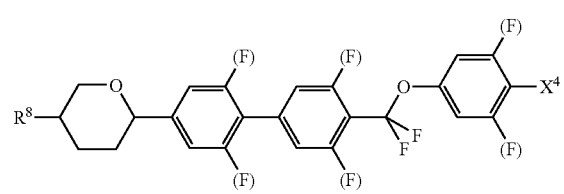
(17-16)
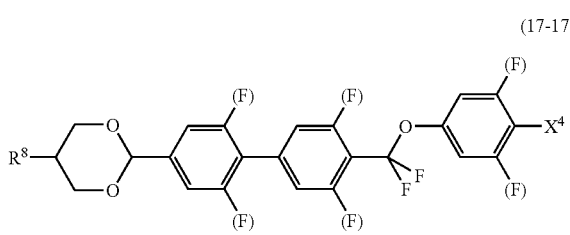
(17-17)
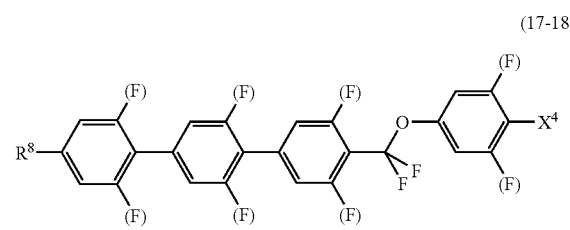
(17-18)
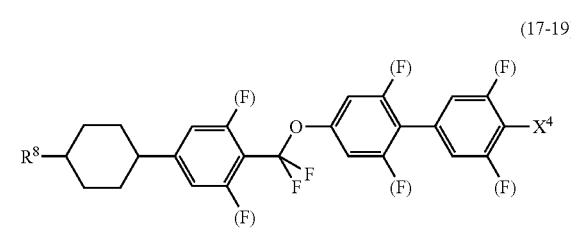
(17-19)

-continued

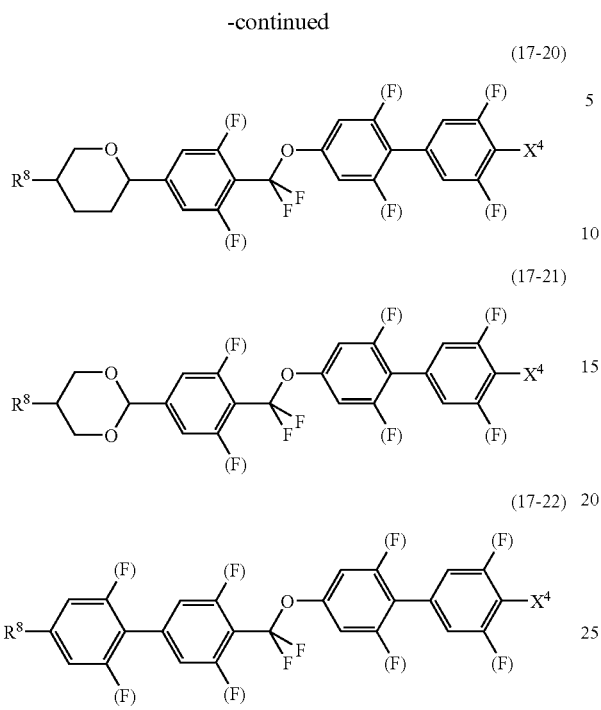

In the formulae, $R^8$ and $X^4$ are defined as above, (F) represents a hydrogen atom or a fluorine atom, and (F, Cl) represents a hydrogen atom, a fluorine atom or chlorine atom.

The compounds of formulae (15)-(18) (component F) have a large positive dielectric anisotropy and very high thermal and chemical stability, and are thus suitable for preparing a liquid crystal composition used in active driving mode like TFT driving. In the liquid crystal composition of this invention, the content of the component F is suitably in a range of 1-99 wt %, preferably 10-97 wt % and more preferably 40-95 wt %, relative to the total weight of the liquid crystal composition. Furthermore, if the liquid crystal composition further contains the compounds of formulae (11)-(13) (component E), the viscosity can be adjusted.

Suitable examples of the compounds of formula (19) above (component G) are formulae (19-1)-(19-37).

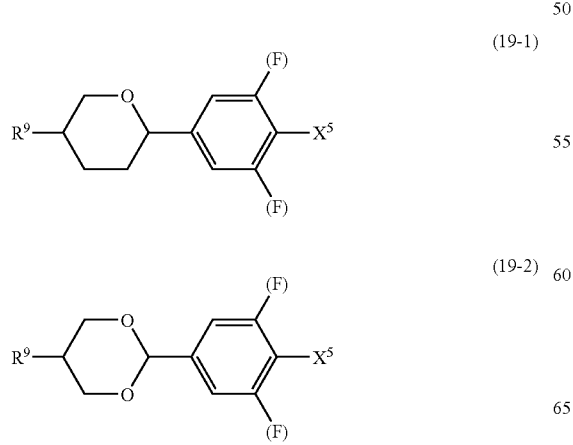

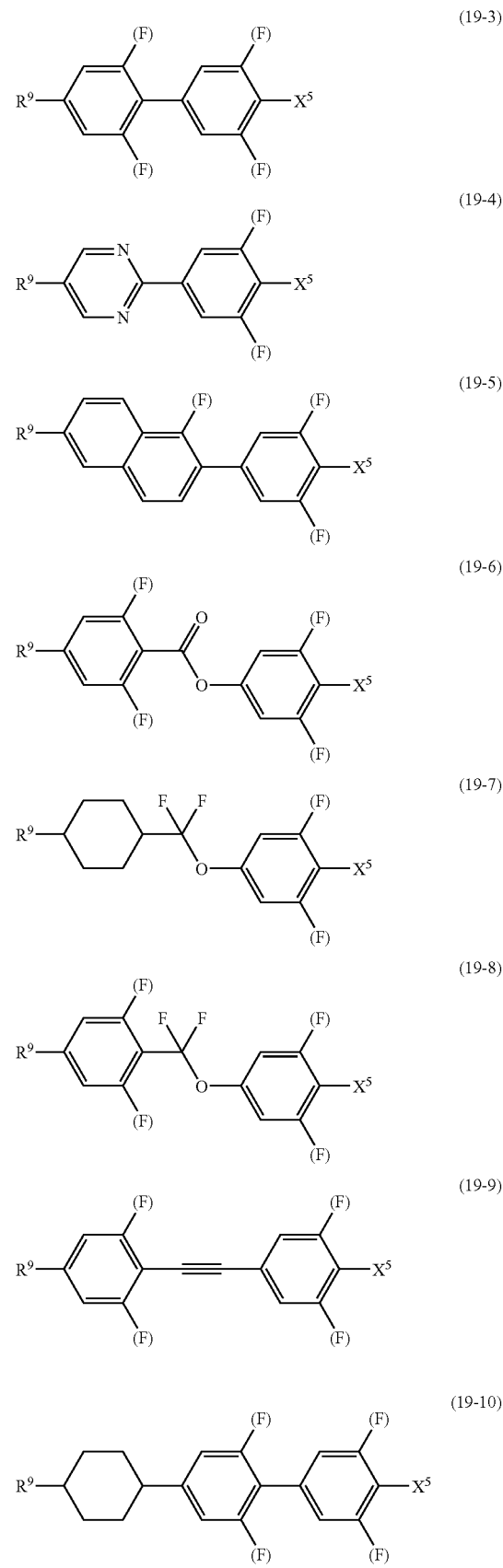

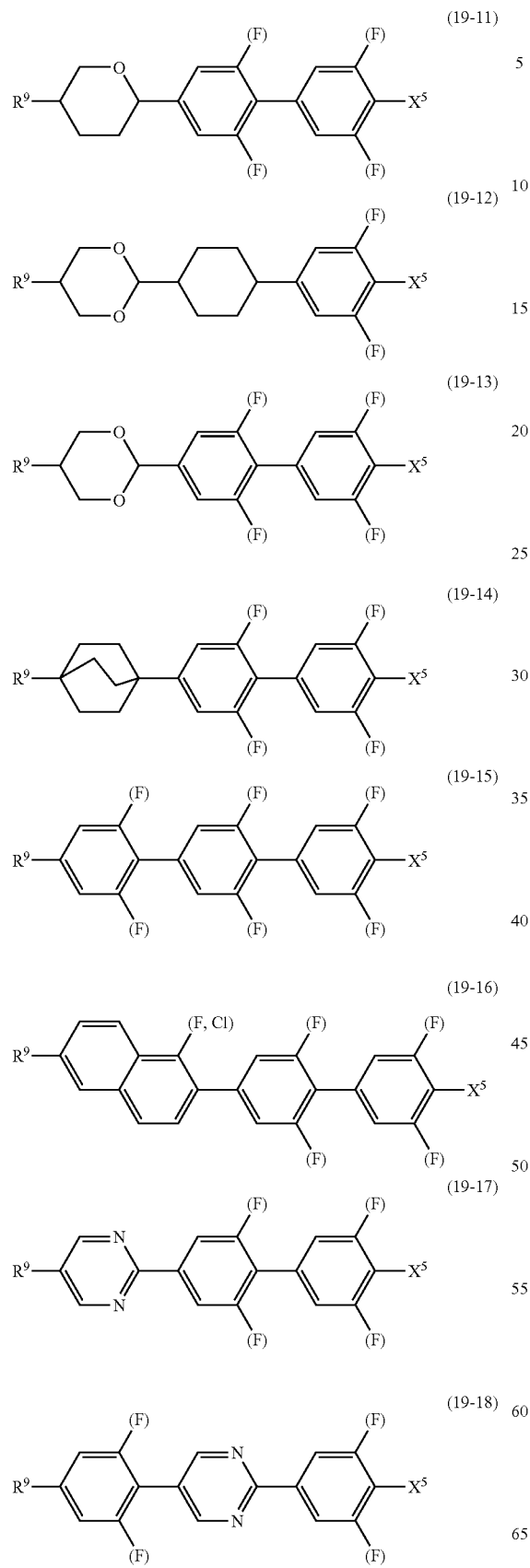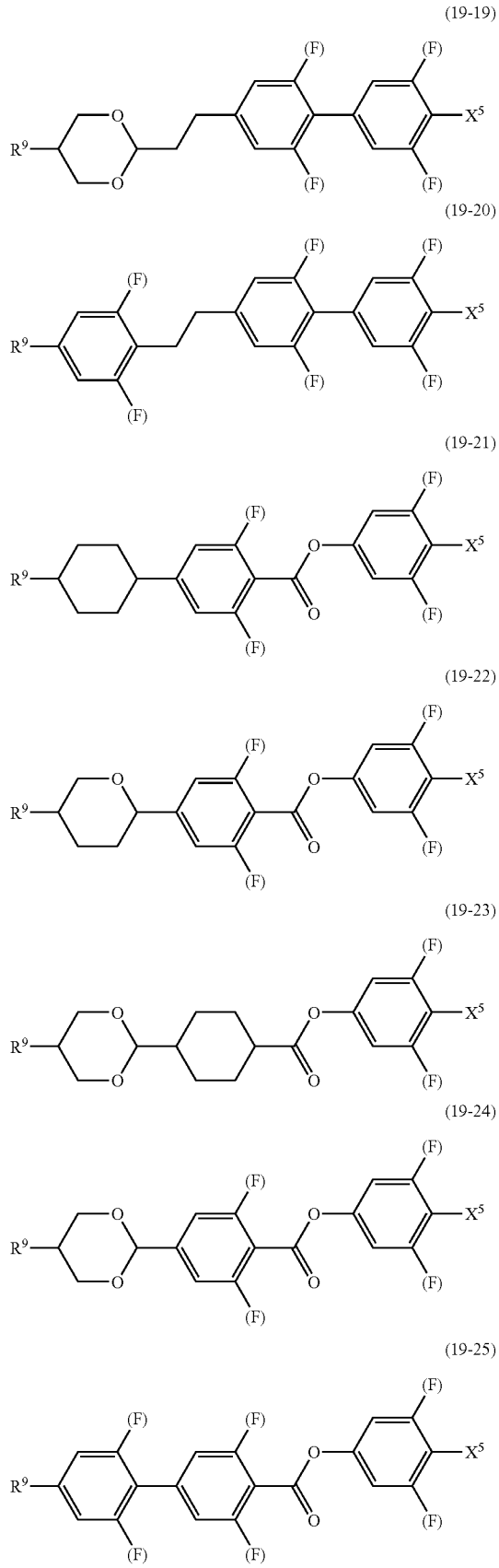

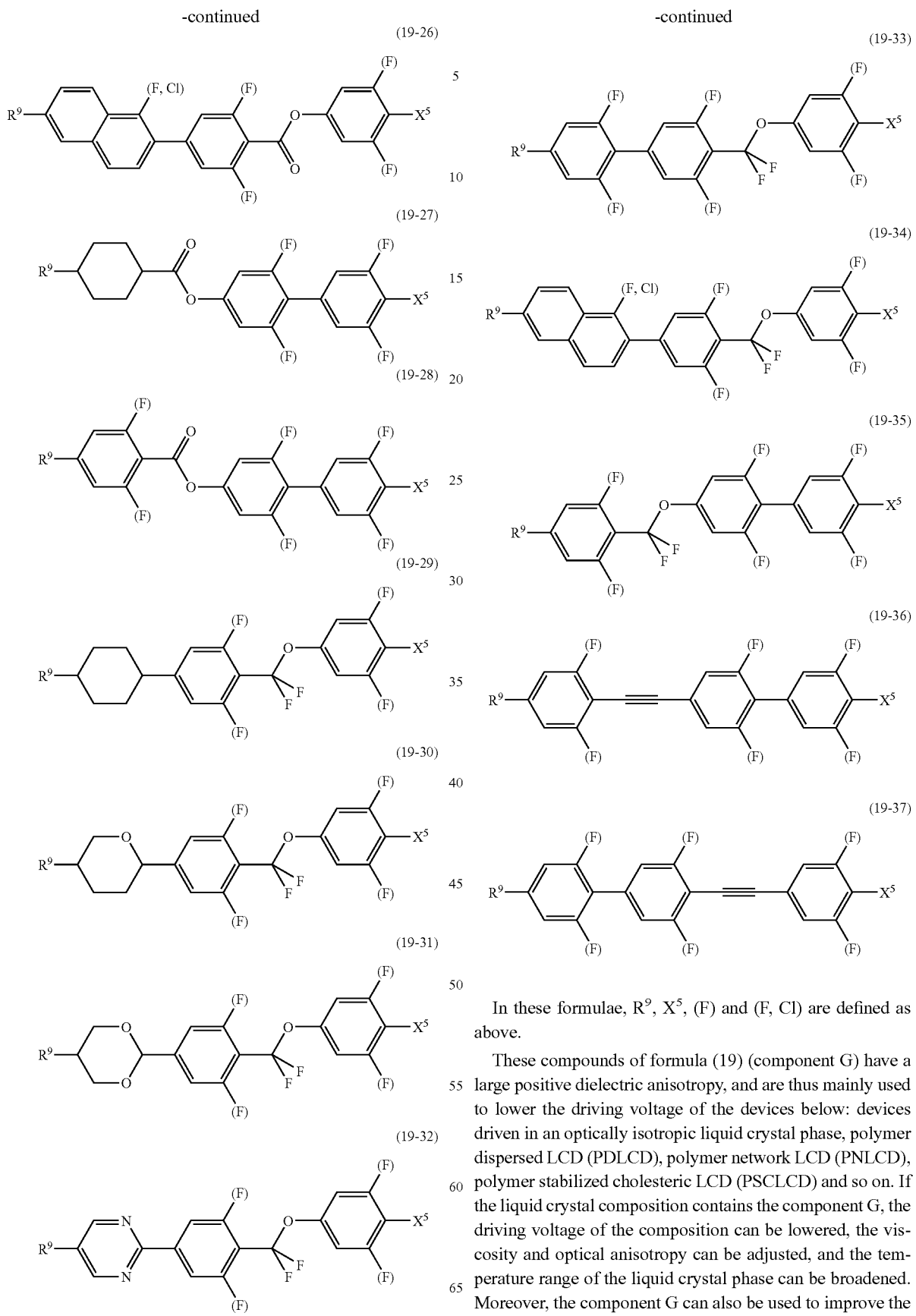

In these formulae, $R^9$, $X^5$, (F) and (F, Cl) are defined as above.

These compounds of formula (19) (component G) have a large positive dielectric anisotropy, and are thus mainly used to lower the driving voltage of the devices below: devices driven in an optically isotropic liquid crystal phase, polymer dispersed LCD (PDLCD), polymer network LCD (PNLCD), polymer stabilized cholesteric LCD (PSCLCD) and so on. If the liquid crystal composition contains the component G, the driving voltage of the composition can be lowered, the viscosity and optical anisotropy can be adjusted, and the temperature range of the liquid crystal phase can be broadened. Moreover, the component G can also be used to improve the steepness of the voltage-transmittance curve.

The content of the component G is preferably 0.1-99.9 wt %, more preferably 10-97 wt % and even more preferably 40-95 wt %, relative to the total weight of the composition.

4. Composition Having Optically Isotropic Liquid Crystal Phase

4-1. Components of Composition Having Optically Isotropic Liquid Crystal Phase A fourth aspect of this invention is a liquid crystal composition containing a compound of formula (1) and a chiral dopant, which can exhibit an optically isotropic liquid crystal phase and is thus useful in an optical device driven in an optically isotropic liquid crystal phase.

A compound of formula (1) has a low clearing point, a large dielectric anisotropy and a large optical anisotropy, so its content can be 5-100 wt %, preferably 5-80 wt % and more preferably 10-70 wt %, relative to the total weight of the achiral liquid crystal composition without a chiral dopant.

The content of the chiral dopant is preferably 1-40 wt %, more preferably 3-25 wt % and even more preferably 5-15 wt %, relative to the total weight of the composition. A liquid crystal composition in which the content of the chiral dopant is in the above range is preferred, due to ease of exhibiting an optically isotropic liquid crystal phase.

The chiral dopant contained in the liquid crystal composition may be a single species, or a mixture of two or more species.

4-2. Chiral Dopant

The chiral dopant contained in the optically isotropic liquid crystal composition is preferably a compound with a high helical twisting power. When a compound with a high helical twisting power is used, the addition amount required for obtaining a desired pitch is reduced preventing the driving voltage from being raised, which is a merit in practice. Specifically, the compounds of formulae (K1)-(K5) are preferred.

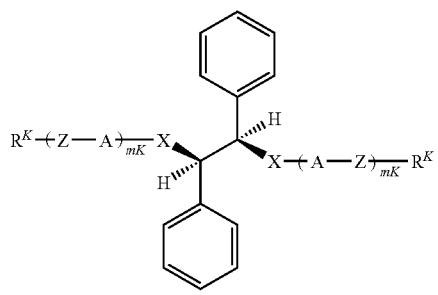
(K1)

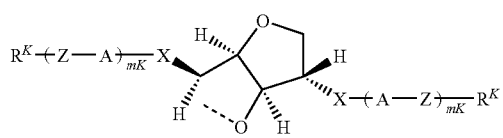
(K2)

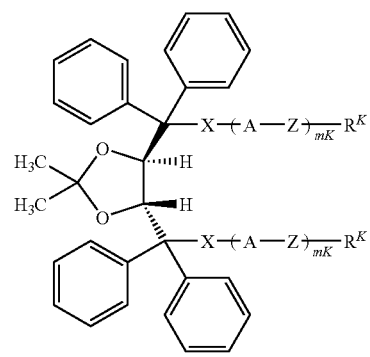
(K3)

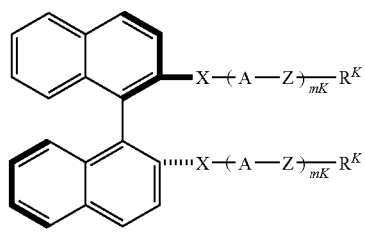
(K4)

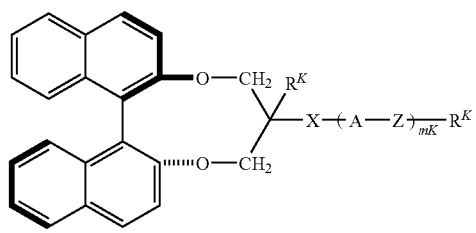
(K5)

In formulae (K1)-(K5), each $R^K$ is independently a hydrogen atom, a halogen atom, —C≡N, —N=C=O, —N=C=S, or $C_{1-20}$ alkyl in which arbitrary —$CH_2$— may be replaced by —O—, —S—, —COO—, —OCO—, —CH=CH—, —CF=CF— or —C≡C— and arbitrary hydrogen atom may be replaced by a halogen atom. Each A is independently an aromatic or non-aromatic three- to eight-membered ring, or a fused ring of 9 or more carbons, and in these rings arbitrary hydrogen atom may be replaced by a halogen atom, $C_{1-3}$ alkyl or $C_{1-3}$ haloalkyl, —$CH_2$— may be replaced by —O—, —S— or —NH—, and —CH= may be replaced by —N=. Each Z is independently a single bond, or $C_{1-8}$ alkylene in which arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom. X is a single bond, —COO—, —OCO—, —$CH_2$O—, —O$CH_2$—, —$CF_2$O—, —OC$F_2$— or —$CH_2CH_2$—, and mK is 1-4.

Among the compounds as chiral dopants added in the liquid crystal composition, the compounds of formulae (K2-1)-(K2-8) within the scope of formula (K2) and formulae (K5-1)-(K5-3) within the scope of formula (K5) are preferred.

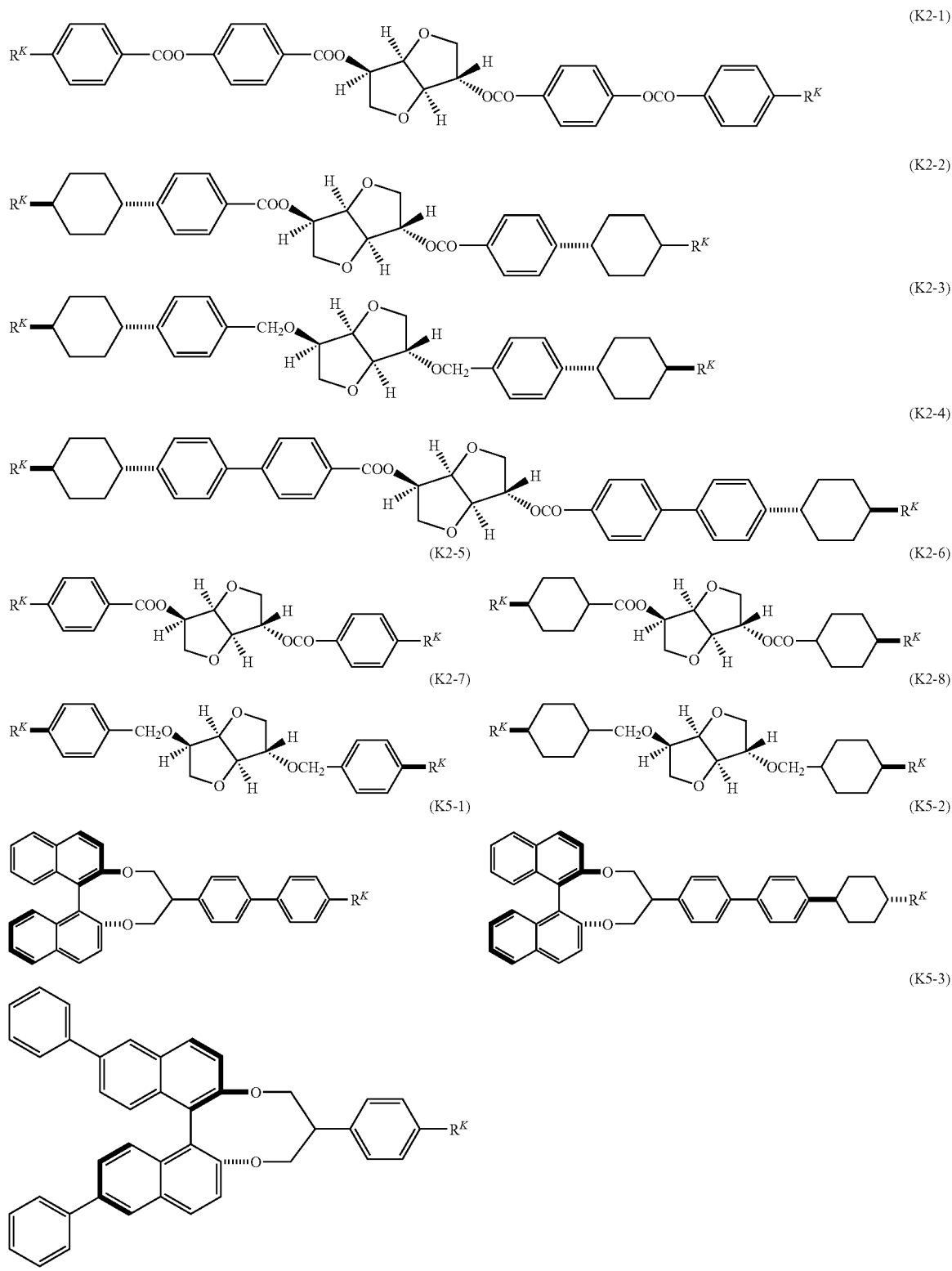

In the formulae, each $R^K$ is independently $C_{3-10}$ alkyl wherein the —$CH_2$-adjacent to a ring may be replaced by —O— and arbitrary —$CH_2$— may be replaced by —CH=CH—.

4-3. Optically Isotropic Liquid Crystal Phase

That a liquid crystal composition has optical isotropy means that the composition exhibits optical isotropy because of macroscopically isotropic arrangement of the liquid crystal molecules but has microscopic liquid crystal order. The pitch corresponding to the microscopic liquid crystal order of the liquid crystal composition (sometimes referred to as "pitch", hereinafter)" is preferably 700 nm or less, more preferably 500 nm or less, and even more preferably 350 nm or less.

Herein, the so-called "non-liquid crystal isotropic phase" refers to a commonly defined isotropic phase, i.e., a disorder phase, or a phase that still exhibits isotropy due to fluctuation even when a region with a non-zero local order parameter is generated. For example, an isotropic phase formed at the high temperature side of a nematic phase is equivalent to the non-liquid crystal isotropic phase in this specification. The chiral liquid crystal in this specification also has a similar definition. Moreover, "optically isotropic liquid crystal phase" in this specification means a liquid crystal phase that exhibits optical isotropy without fluctuation, an example of which is a phase exhibiting a platelet structure, i.e., a blue phase in narrow sense.

The optically isotropic liquid crystal composition of this invention has an optically isotropic liquid crystal phase. However, the typical platelet structure in a blue phase is not observed under a polarizing microscope. Therefore, in this specification, a phase exhibiting the platelet structure is designated as a blue phase, and an optically isotropic liquid crystal phase including a blue phase is designated as an optically isotropic liquid crystal phase. That is, the blue phase is included in the optically isotropic liquid crystal phase.

Generally, the blue phases can be divided into three types, blue phase I, blue phase II and blue phase III, which are all optically active and isotropic. In a blue phase I or II, two or more colors of diffracted light produced by Bragg reflection from different lattice planes are observed. The blue phase is generally observed between the isotropic phase and the chiral nematic phase.

That the optically isotropic liquid crystal phase does not exhibit two or more colors of diffracted light means that a platelet structure observed in a blue phase I or II is not observed and the phase substantially exhibits a single color in the entire plane. For an optically isotropic liquid crystal phase not exhibiting two or more colors of diffracted light, brightness/darkness of the color is not necessarily even in plane.

An optically isotropic liquid crystal phase not exhibiting two or more colors of diffracted light has an advantage of inhibiting the intensity of the reflected light caused by Bragg reflection, or shifting toward the short wavelength side.

Furthermore, when a liquid crystal material reflecting visible light is used in a display device, sometimes a color variation problem may occur. However, for a liquid crystal not exhibiting two or more colors of diffracted light, the reflection of visible light may be eliminated in the pitch larger than that in a blue phase in narrow sense (a phase exhibiting the platelet structure), as a result of reflection wavelength shift toward the short wavelength side.

The optically isotropic liquid crystal composition of this invention may be obtained by adding a chiral dopant to a composition having a nematic phase, wherein the chiral dopant is preferably added in a concentration such that the pitch is 700 nm or less. Furthermore, the composition having a nematic phase contains a compound of formula (1) and other necessary components. Moreover, the optically isotropic liquid crystal composition of this invention may alternatively be obtained by adding a chiral dopant to a composition having a chiral nematic phase but no optically isotropic liquid crystal phase. The composition having a chiral nematic phase but no optically isotropic liquid phase contains a compound of formula (1), an optically active compound and other necessary components, wherein the optically active compound is preferably added in a concentration such that the pitch is 700 nm or more to exhibit an optically isotropic liquid crystal phase. The optically active compounds to be added may be the above compounds with a large helical twisting power, that is, the compounds of formulae (K1)-(K5), (K2-1)-(K2-8) and (K5-1)-(K5-3). Moreover, the optically active compound added may not have a large helical twisting power. Such an optically active compound is, for example, one added in a liquid crystal composition for a device driven in a nematic phase (TN mode or STN mode, etc.).

Examples of the compound without a large helical twisting power are the following optically active compound (Op-1)-(Op-13).

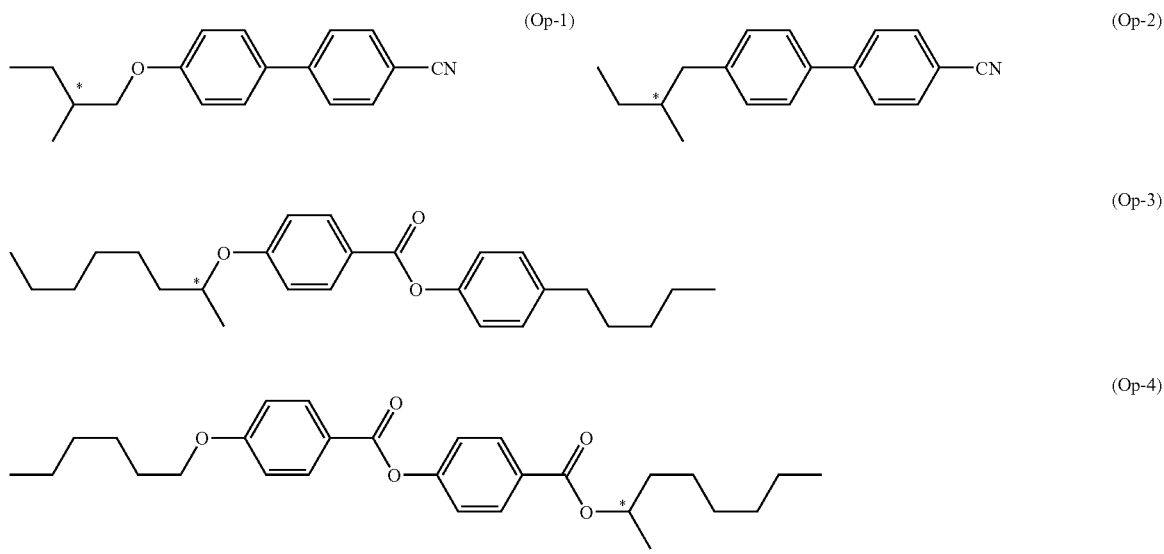

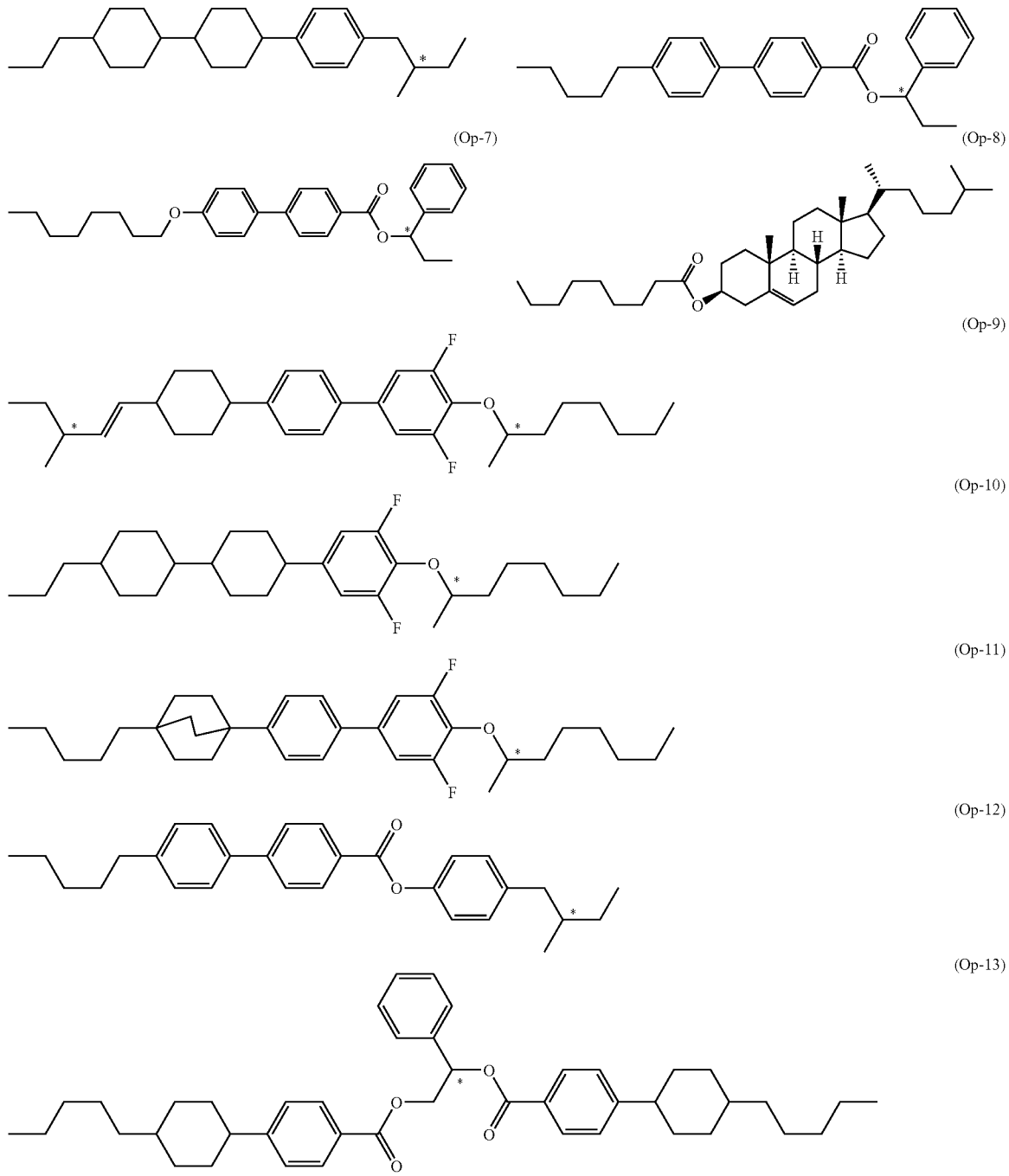

Moreover, the temperature range of the optically isotropic liquid crystal composition of this invention can be broadened by adding a chiral dopant to a liquid crystal composition having a wide temperature range for co-existence of a nematic phase or a chiral nematic phase and an isotropic phase for exhibiting an optically isotropic liquid crystal phase. For example, a composition exhibiting an optically isotropic liquid crystal phase in a wide temperature range can be prepared as follows. A liquid crystal compound having a high clearing point is mixed with a liquid crystal compound having a low clearing point to prepare a liquid crystal composition with a wide temperature range for co-existence of a nematic phase and an isotropic phase. Then, a chiral dopant is added to the liquid crystal composition.

For a liquid crystal composition with a wide co-existence temperature range of a nematic or chiral nematic phase and an isotropic phase, the difference between the upper-limit temperature and the lower-limit temperature of the co-existence is preferably 3-150° C., and more preferably 5-150° C. Moreover, the liquid crystal composition preferably has a difference of 3-150° C. between the upper-limit temperature and the lower-limit temperature of the co-existence of the nematic phase and the isotropic phase.

When an electric field is applied to the liquid crystal medium of this invention in an optically isotropic liquid crystal phase, an electric-birefringence occurs but the Kerr effect does not necessarily occur.

Because the electric-birefringence of an optically isotropic liquid crystal phase increases with the pitch, the electric-birefringence can be increased by adjusting the species and content of the chiral dopant to increase the pitch, as long as other optical properties, such as transmittance and diffraction wavelength etc., could be satisfied.

4-4. Other Components

Other compounds, such as polymer material, may be further added into the optically isotropic liquid crystal composition of this invention, so long as they do not affect the properties of the composition. In addition to the polymer material, the liquid crystal composition of this invention may also contain, for example, a dichroic dye or a photochromic compound. Examples of the dichroic dye include merocyanine dyes, styryl dyes, azo dyes, azomethine dyes, azoxy dyes, quinophthalone dyes, anthraquinone dyes, tetrazine dyes and so on.

5. Optically Isotropic Polymer/Liquid Crystal Composite Material

A fifth aspect of this invention is a composite material of a polymer and a liquid crystal composition containing a compound of formula (1) and a chiral dopant, which exhibits optical isotropy. The polymer/liquid crystal composite material can be used in an optical device driven in an optically isotropic liquid crystal phase, which may induce the liquid crystal composition (CLC) according to any of Items [1]-[30] and a polymer.

"Polymer/liquid crystal composite material" of this invention has no particular limitation, as long as it is a composite containing both a liquid crystal material and a polymeric compound, wherein the polymer may be partially or entirely not dissolved in the liquid crystal material so that the polymer is separated from the liquid crystal material. Further, in this specification, a nematic phase refers to one in narrow sense but does not include a chiral nematic phase, unless specifically indicated.

The optically isotropic polymer/liquid crystal composite material according to a preferred aspect of this invention can exhibit an optically isotropic liquid crystal phase in a wide temperature range. Moreover, the polymer/liquid crystal composite material according to a preferred aspect of this invention has very high response speed. Based on such effects, the polymer/liquid crystal composite material according to a preferred aspect of this invention is useful in an optical device such as a display device.

5-2 Polymer

Though the composite material of this invention can be produced by mixing an optically isotropic liquid crystal composition with a pre-polymerized polymer, it is preferably produced by mixing a low molecular weight monomer, macromonomer or oligomer etc. (generally referred to as "monomer", hereinafter) as a raw material of the polymer with the liquid crystal composition CLC and then polymerizing the mixture. In this specification, the mixture containing the monomers and the liquid crystal composition is referred to as "polymerizable monomer/liquid crystal mixture", which may optionally contain a polymerization initiator, a curing agent, a catalyst, a stabilizer, a dichroic dye or a photochromic compound etc., without compromising the effects of this invention. For example, the polymerizable monomer/liquid crystal mixture of this invention may optionally contain 0.1-20 weight parts of a polymerization initiator, relative to 100 weight parts of the polymerizable monomer.

The polymerization temperature is preferably such that the polymer/liquid crystal composite material exhibits high transparency and isotropy, and more preferably such that the mixture of the monomer and the liquid crystal material exhibits an isotropic phase or a blue phase, while the polymerization is carried out in the isotropic phase or optically isotropic liquid crystal phase. That is, the polymerization temperature is preferably set such that after the polymerization, the polymer/liquid crystal composite material substantially does not scatter light of wavelength greater than that of visible light and exhibit optical isotropy.

For example, a low molecular weight monomer, macromonomer or oligomer can be used as a raw material of the polymer constituting the composite material of this invention. In this specification, raw material of the polymer covers low molecular weight monomers, macromonomers and oligomers, etc. Furthermore, the obtained polymer preferably has a three-dimensional cross-linked structure, and thus the raw material monomer of the polymer is preferably a multi-functional monomer having two or more polymerizable functional groups. The polymerizable functional groups have no particular limitation; examples thereof include acryloyl, methacryloyl, glycidyl, epoxy, oxetanyl, vinyl and so on. In view of the polymerization rate, acryloyl and methacryloyl are preferred. It is preferred that the raw material monomers of the polymer contain 10 wt % or more of a monomer having two or more polymerizable functional groups, since the obtained composite material of this invention can easily exhibit high transparency and isotropy.

Moreover, to obtain a suitable composite material, the polymer preferably has mesogen moieties, and a part or all of the raw material monomers of the polymer used can have a mesogen moiety.

5-2-1. Mono- and Difunctional Monomers Having A Mesogen Moiety

The mono- and di-functional monomers having a mesogen moiety has no particular limitation in structure, and can be, for example, the compounds of formula (M1) or (M2) below.

(M1)

(M2)

(M3-1)

(M3-2)

(M3-3)

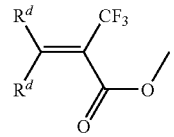

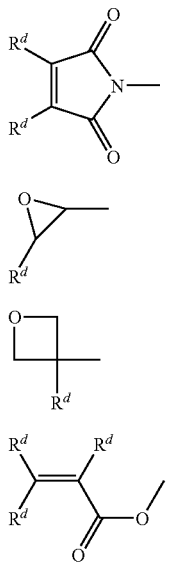

(M3-4)

(M3-5)

(M3-6)

(M3-7)

In formula (M1), each $R^a$ is independently a hydrogen atom, a halogen atom, —C≡N, —N=C=O, —N=C=S, or $C_{1-20}$ alkyl in which arbitrary —CH$_2$— may be replaced by —O—, —S—, —CO—, —COO—, —OCO—, —CH=CH—, —CF=CF— or —C≡C— and arbitrary hydrogen atom may be replaced by a halogen atom or —C≡N. Each $R^b$ is independently a polymerizable functional group of one of formulae (M3-1)-(M3-7).

Preferably, $R^a$ is a hydrogen atom, a halogen atom, —C≡N, —CF$_3$, —CF$_2$H, —CFH$_2$, —OCF$_3$, —OCF$_2$H, $C_{1-20}$ alkyl, $C_{1-19}$ alkoxy, $C_{2-21}$ alkenyl or $C_{2-21}$ alkynyl. Especially preferred $R^a$ is —C≡N, $C_{1-20}$ alkyl or $C_{1-19}$ alkoxy.

In formula (M2), each $R^b$ is independently a polymerizable functional group of one of formulae (M3-1)-(M3-7).

In formulae (M3-1)-(M3-7), each $R^d$ is independently a hydrogen atom, a halogen atom, or $C_{1-5}$ alkyl in which arbitrary hydrogen atom may be replaced by a halogen atom. Preferred $R^d$ is a hydrogen atom, a halogen atom or methyl. Especially preferred $R^d$ is a hydrogen atom, a fluorine atom or methyl.

Furthermore, formulae (M3-2), (M3-3), (M3-4) and (M3-7) are preferably polymerized with free radicals. Formulae (M3-1), (M3-5) and (M3-6) are preferably polymerized with cations. The above polymerizations are all active polymerization, and are initiated as a small amount of free radical or cationic active species is generated in the reaction system. To accelerate generation of the active species, a polymerization initiator can be used. The active species can be generated by light or heat.

In formulae (M1) and (M2), each $A^M$ is independently an aromatic or non-aromatic five-membered ring, six-membered ring or fused ring of 9 or more carbons, in which —CH$_2$— may be replaced by —O—, —S—, —NH— or —NCH$_3$—, —CH= may be replaced by —N=, and hydrogen atom may be replaced by a halogen atom, $C_1$-5 alkyl or $C_{1-5}$ haloalkyl. Preferred specific examples of $A^M$ are 1,4-cyclohexylene, 1,4-cyclohexenylene, 1,4-phenylene, naphthalene-2,6-diyl, tetrahydronaphthalin-2,6-diyl, fluorene-2, 7-diyl and bicyclo[2.2.2]octan-1,4-diyl, in which arbitrary —CH$_2$— may be replaced by —O—, arbitrary —CH= may be replaced by —N=, and arbitrary hydrogen atom may be replaced by a halogen atom, $C_{1-5}$ alkyl or $C_{1-5}$ haloalkyl.

In consideration of the stability of the compound, —CH$_2$—O—CH$_2$—O— with two oxygen atoms not adjacent to one another is preferred to —CH$_2$—O—O—CH$_2$— with two oxygen atoms adjacent to one another. This also applies to the case of sulfur.

Among these rings, 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1, 4-phenylene, naphthalene-2,6-diyl, tetrahydronaphthalene-2,6-diyl, fluorene-2,7-diyl, 9-methylfluorene-2,7-diyl, 1,3-dioxan-2,5-diyl, pyridine-2,5-diyl and pyrimidin-2,5-diyl are particularly preferred for $A^M$. Furthermore, the stereo configuration of 1,4-cyclohexylene and 1,3-dioxan-2,5-diyl above is in the trans-form superior to in the cis-form.

Because 2-fluoro-1,4-phenylene and 3-fluoro-1,4-phenylene are identical in the structure, the latter is not exemplified. This also applies to the case of the relationship between 2,5-difluoro-1,4-phenylene and 3,6-difluoro-1,4-phenylene, etc.

In formulae (M1) and (M2), each Y is independently a single bond, or $C_{1-20}$ alkylene in which arbitrary —CH$_2$— may be replaced by —O—, —S—, —CH=CH—, —C≡C—, —COO— or —OCO—. Preferred Y is a single bond, —(CH$_2$)$_{m2}$—, —O(CH$_2$)$_m$— or —(CH$_2$)$_{m2}$O—, wherein m2 is an integer of 1-20. Especially preferred Y is a single bond, —(CH$_2$)$_{m2}$—, —O(CH$_2$)$_{m2}$— or —(CH$_2$)$_{a2}$—, wherein m2 is an integer of 1-10. For the stability of the compound, —Y—$R^a$ and —Y—$R^b$ preferably include no —O—O—, —O—S—, —S—O— or —S—S—.

In formulae (M1) and (M2), each $Z^M$ is independently a single bond, —(CH$_2$)$_{m3}$—, —O(CH$_2$)$_{m3}$—, —(CH$_2$)$_{m3}$O—, —O(CH$_2$)$_{m3}$O—, —CH=CH—, —C≡C—, —COO—, —OCO—, —(CF$_2$)$_2$—, —(CH$_2$)$_2$—COO—, —OCO—(CH$_2$)$_2$—, —CH=CH—COO—, —OCO—CH=CH—, —C≡C—COO—, —OCO—C≡C—, —CH=CH—(CH$_2$)$_2$—, —(CH$_2$)$_2$—CH=CH—, —CF=CF—, —C≡C—CH=CH—, —CH=CH—C≡C—, —OCF$_2$—(CH$_2$)$_2$—, —(CH$_2$)$_2$—CF$_2$O—, —OCF$_2$— or —CF$_2$O—, wherein m3 is an integer of 1-20.

Preferred $Z^M$ is a single bond, —(CH$_2$)$_{m3}$—, —O(CH$_2$)$_{m3}$—, —(CH$_2$)$_{m3}$O—, —CH=CH—, —C≡C—, —COO—, —OCO—, —(CH$_2$)$_2$—COO—, —OCO—(CH$_2$)$_2$—, —CH=CH—COO—, —OCO—CH=CH—, —OCF$_2$— or —CF$_2$O—.

In formulae (M1) and (M2), $m^1$ is an integer of 1-6, preferably an integer of 1-3. When $m^1$ is 1, they are bicyclic compounds having two six-membered rings. When m1 is 2 or 3, they are tricyclic or tetracyclic compounds. For example, when m1 is 1, the two $A^M$'s can be identical or different. Moreover, when m1 is 2, the three $A^M$'s (or two $Z^M$'s) can be identical or different. When $m^1$ is 3-6, it is also the case. This also applies to respective cases of $R^a$, $R^b$, $R^d$, $Z^M$, $A^M$ and Y.

Even the compound (M1) of formula (M1) and the compound (M2) of formula (M2) contains an isotope in an amount higher than its natural abundance, such as 2H (deuterium) and $^{13}$C, are useful, due to the identical properties.

More preferred examples of the compounds (M1) and (M2) are compounds (M1-1)-(M1-41) and (M2-1)-(M2-27) of formulae ($M^1$-1)-($M^1$-41) and (M2-1)-(M2-27). In these compounds, $R^a$, $R^b$, $R^d$, $Z^M$, $A^M$, Y and p are defined as in the cases of formulae (M1) and (M2) in the above aspects of this invention.

Each partial structure of the compounds (M1-1)-(M1-41) and (M2-1)-(M2-27) is described below. The partial structure (a1) represents 1,4-phenylene in which arbitrary hydrogen atom is replaced by a fluorine atom. The partial structure (a2) represents 1,4-phenylene in which arbitrary hydrogen atom may be replaced by a fluorine atom. The partial structure (a3) represents 1,4-phenylene in which arbitrary hydrogen atom may be replaced by a fluorine atom or methyl. The partial structure (a4) represents fluorenylene in which the hydrogen atom at position 9 may be replaced by methyl.

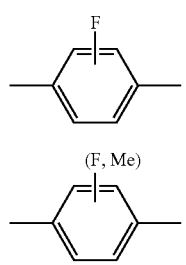

(a1)

(a2)

(a3)

(a4)

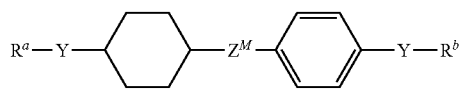  (M1-1)

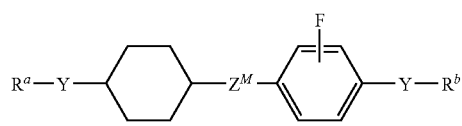  (M1-2)

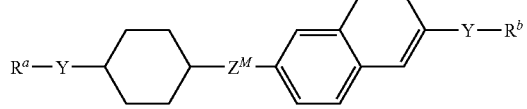  (M1-3)

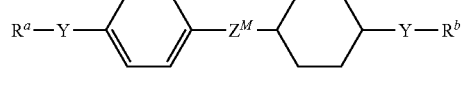  (M1-4)

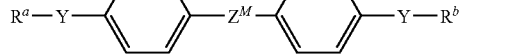  (M1-5)

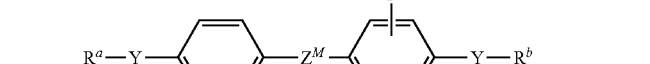  (M1-6)

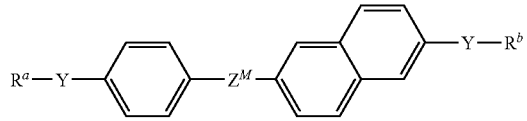  (M1-7)

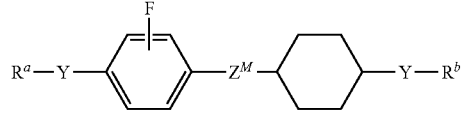  (M1-8)

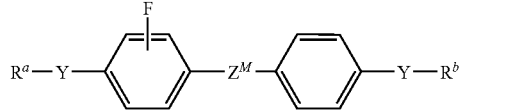  (M1-9)

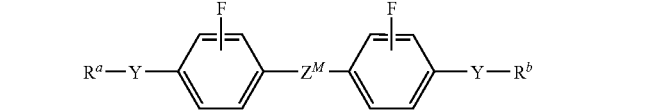  (M1-10)

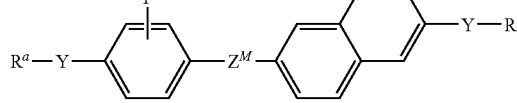  (M1-11)

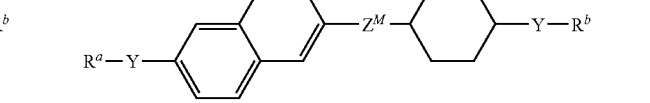  (M1-12)

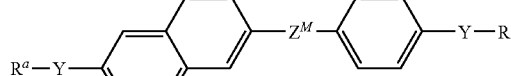  (M1-13)

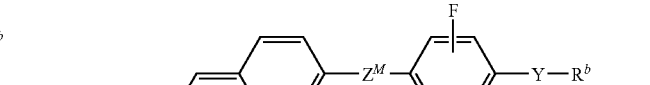  (M1-14)

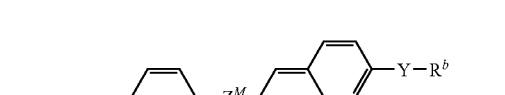  (M1-15)

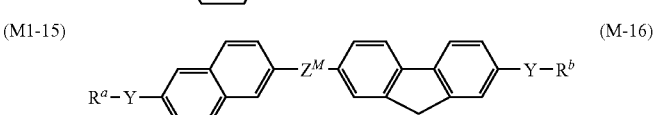  (M-16)

-continued
(M1-17)
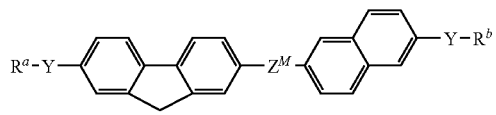
(M1-18)
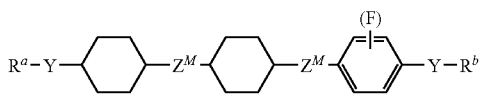
(M1-19)
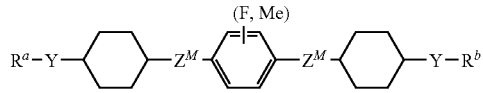
(M1-20)
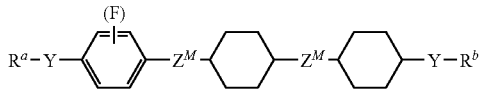
(M1-21)
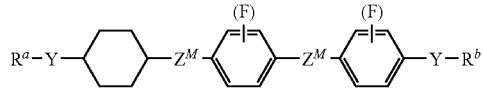
(M1-22)
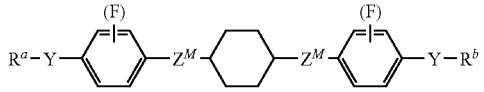
(M1-23)
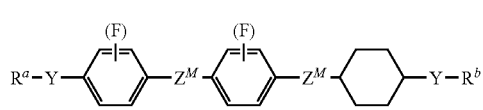
(M1-24)
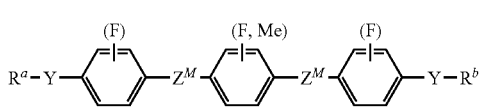
(M1-25)
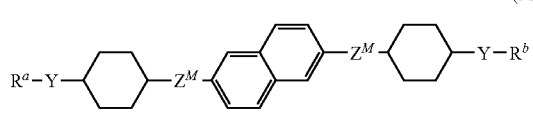
(M1-26)
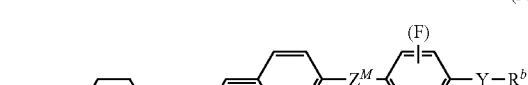
(M1-27)
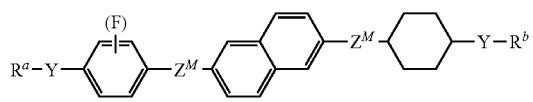
(M1-28)
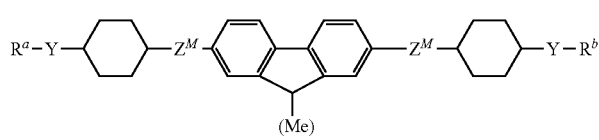
(M1-29)
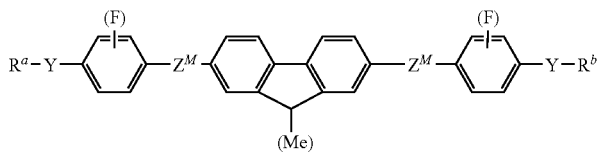
(M1-30)
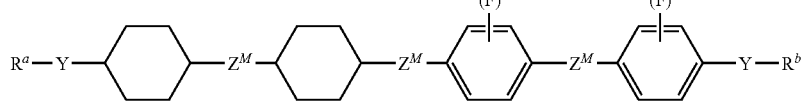
(M1-31)
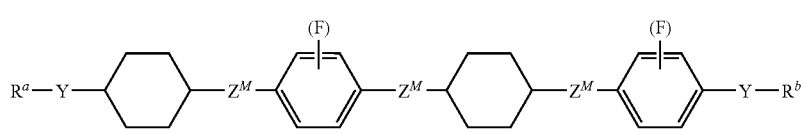
(M1-32)
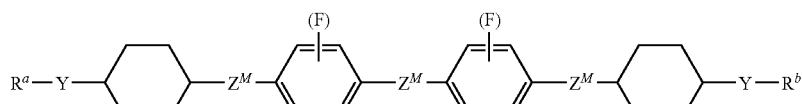
(M1-33)
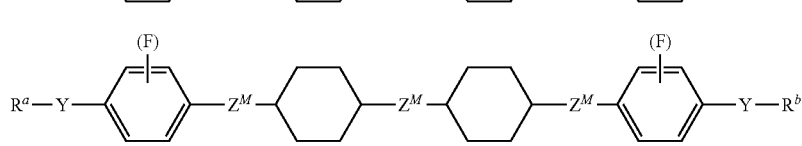
(M1-34)

-continued
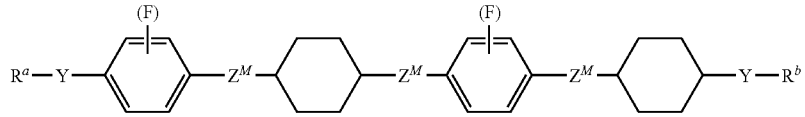 (M1-35)
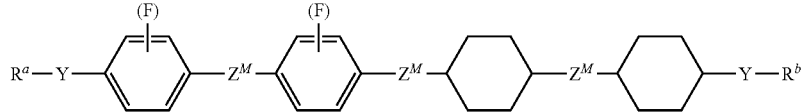 (M1-36)
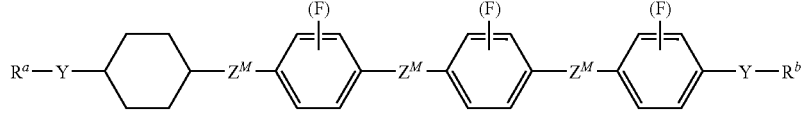 (M1-37)
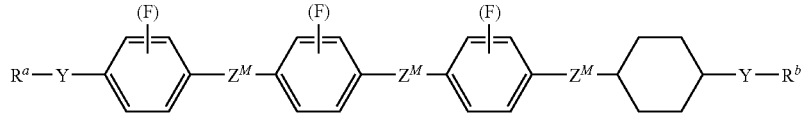 (M1-38)
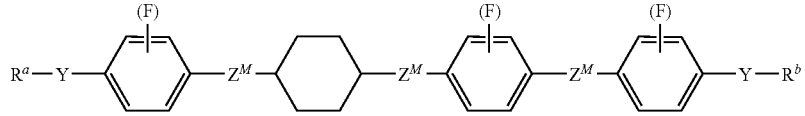 (M1-39)
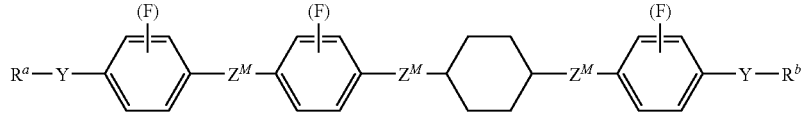 (M1-40)
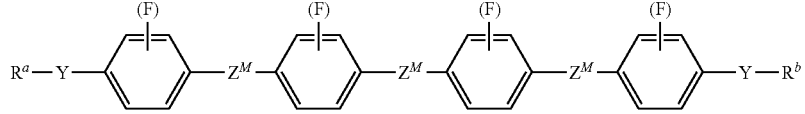 (M1-41)
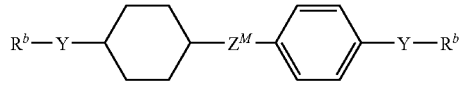 (M2-1)
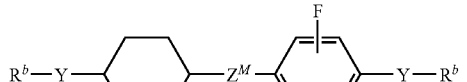 (M2-2)
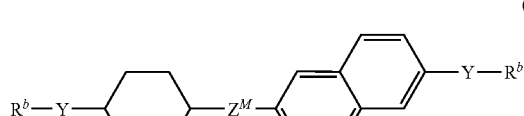 (M2-3)
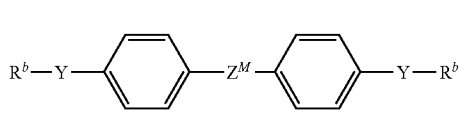 (M2-4)
 (M2-5)
 (M2-6)
 (M2-7)
 (M2-8)
 (M2-9)
 (M2-10)

-continued
(M2-11)
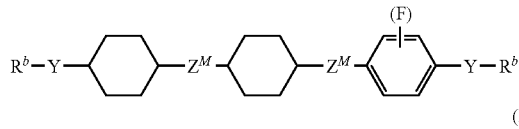
(M2-12)
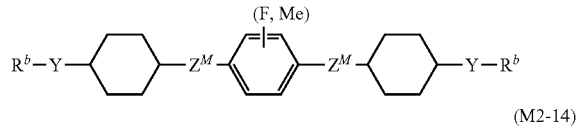
(M2-13)
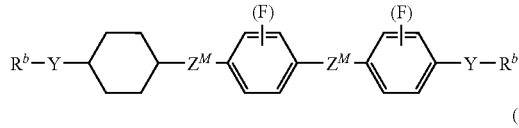
(M2-14)
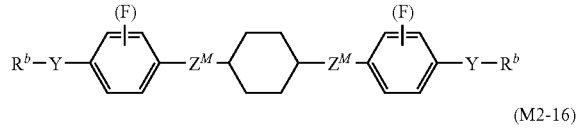
(M2-15)
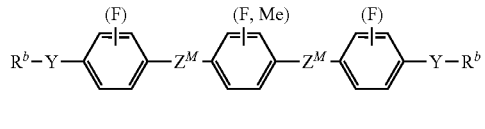
(M-18)
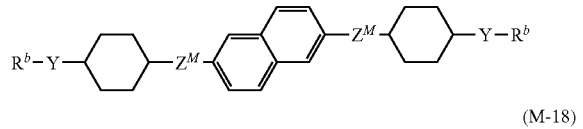
(M2-17)
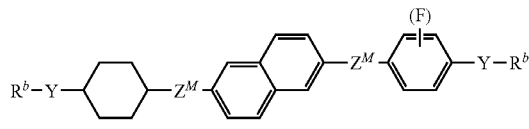
(M2-19)
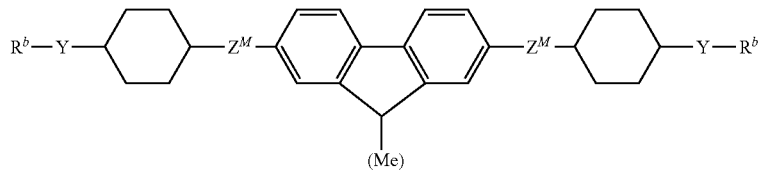
(M2-20)
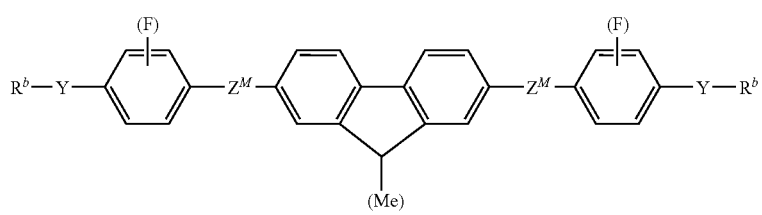
(M2-21)
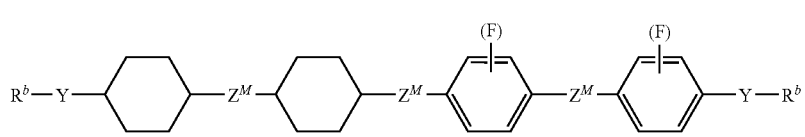
(M2-22)
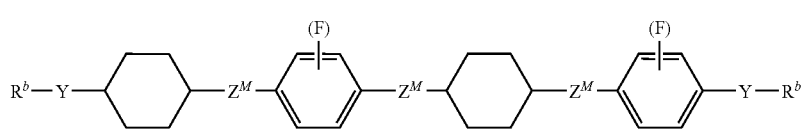
(M2-23)
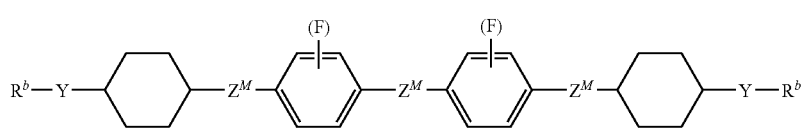
(M2-24)
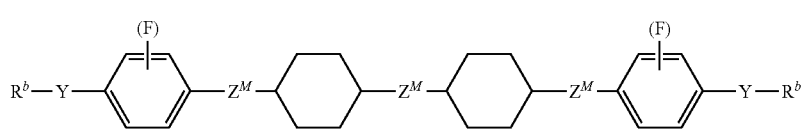
(M2-25)

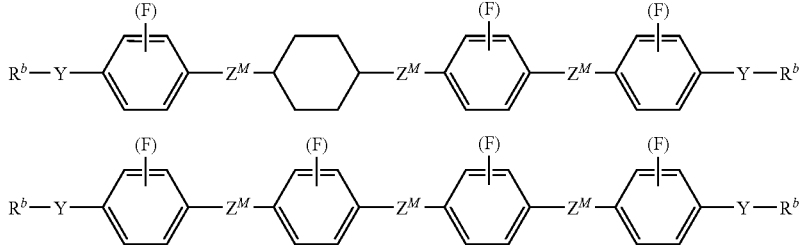

(M2-26)

(M2-27)

A monomer having no mesogen moiety and a polymerizable compound having a mesogen moiety other than the monomers (M1) and (M2) can be used, if required.

In order to optimize the optical isotropy of the polymer/liquid crystal composite material of this invention, a monomer having a mesogen moiety and three or more polymerizable functional groups can be used. Such a monomer may be a well-known compound, for example, one of (M4-1)-(M4-3), and more specifically a compound described in Japanese Patent Publication Nos. 2000-327632, 2004-182949 and 2004-59772. In (M4-1)-(M4-3), $R^b$, Za, Y and (F) are defined as above.

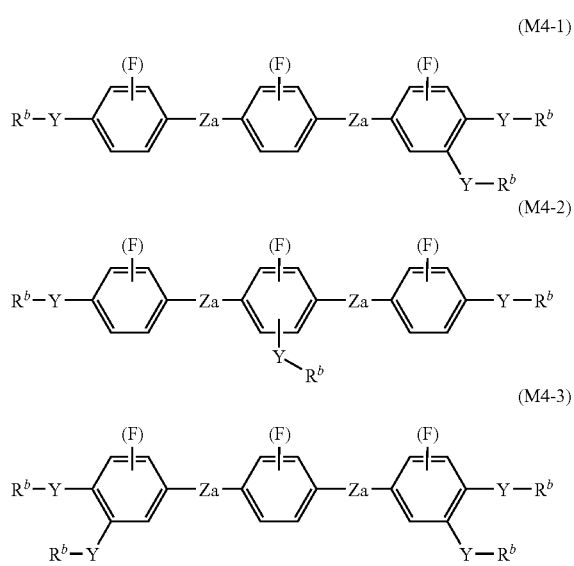

5-2-2. Monomer Having No Mesogen Moiety and Having Polymerizable Functional Groups Examples of the monomer having no mesogen moiety and having polymerizable groups are linear or branched acrylates of 1-30 carbon atoms, linear or branched diacrylates of 1-30 carbon atoms, and monomers having three or more polymerizable groups. Examples of the monomers having three or more polymerizable groups are, but not limited to, glycerol/propoxide (1PO/OH) triacrylate, pentaerythritol/propoxide/triacrylate, pentaerythritol/triacrylate, trihydroxylmethylpropane/ethoxide/triacrylate, trihydroxylmethylpropane/propoxide/triacrylate, trihydroxylmethylpropane/triacrylate, di(trihydroxylmethylpropane)tetraacrylate, pentaerythritol/tetraacrylate, di(pentaerythritol)pentaacrylate, di(pentaerythritol)hexaacrylate and trihydroxylmethylpropane/triacrylate.

5-2-3. Polymerization Initiator

The polymerization reaction utilized to produce the polymer constituting the composite material of this invention has no particular limitation, and may be, for example, photo-radical polymerization, thermo-radical polymerization or photo-cationic polymerization, etc.

The polymerization initiators useful for photo-radical polymerization are, for example, DAROCUR™ 1173 and 4265 (both are trade names, from Ciba Specialty Chemicals) and IRGACURE™ 184, 369, 500, 651, 784, 819, 907, 1300, 1700, 1800, 1850 and 2959 (all are trade names, from Ciba Specialty Chemicals).

Preferred examples of the initiators causing radical polymerization with heating and being useful in thermo-radical polymerization are: benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl 2,2'-azobisisobutyrate (MAIB), di-t-butyl peroxide (DTBPO), azobisisobutyronitrile (AIBN) and azobiscyclohexanecarbonitrile (ACN), etc.

Examples of polymerization initiators useful in photo-cationic polymerization are diaryliodonium salt (referred to as "DAS", hereinafter) and triarylsulfonium salt (referred to as "TAS", hereinafter), etc.

Examples of DAS are diphenyliodonium tetrafluoroborate, diphenyliodonium hexafluorophosphonate, diphenyliodonium hexafluoroarsenate, diphenyliodonium trifluoromesylate, diphenyliodonium trifluoroacetate, diphenyliodonium p-toluenesulfonate, diphenyliodonium tetrakis(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromesylate, 4-methoxyphenylphenyliodonium trifluoroacetate, and 4-methoxyphenylphenyliodonium p-toluenesulfonate.

DAS can be sensitized by adding a photosensitizer, such as thioxanthone, phenothiazine, chlorothioxanthone, xanthone, anthracene, diphenyl anthracene or rubrene, etc.

Examples of TAS are triphenylsulfonium tetrafluoroborate, triphenylsulfonium hexafluorophosphonate, triphenylsulfonium hexafluoroarsenate, triphenylsulfonium trifluoromesylate, triphenylsulfonium trifluoroacetate, triphenylsulfonium p-toluene-sulfonate, triphenylsulfonium tetrakis(pentafluorophenyl)borate, 4-methoxyphenyl-diphenylsulfonium tetrafluoroborate, 4-methoxy phenyldiphenylsulfonium hexafluoro-phosphonate, 4-methoxyphenyldiphenylsulfonium hexafluoroarsenate, 4-methoxyphenyl-diphenylsulfonium trifluoromesylate, 4-methoxyphenyldiphenylsulfonium trifluoro-acetate, and 4-methoxyphenyldiphenylsulfonium p-toluenesulfonate, etc.

Specific examples of the photo-cationic polymerization initiator are Cyracure™ UVI-6990, UVI-6974 and UVI-6992 (all are trade names, from UCC Corporation), ADEKA OPTOMER™ SP-150, SP-152, SP-170 and SP-172 (all are trade names, from ADEKA Corporation), Rhodorsil Photo-initiator 2074 (trade name, from Rhodia Japan Corporation), IRGACURE™ 250 (trade name, from Ciba Specialty Chemicals) and UV-9380C (trade name, from GE/Toshiba Silicone Co. Ltd.), etc.

5-2-4. Curing Agents and Others

In preparing the polymer constituting the composite material of this invention, in addition to the monomers and polymerization initiator mentioned above, other suitable component(s), for example, curing agent, catalyst and/or stabilizer may also be added.

The well-known latent curing agents commonly used for epoxy resins can be used. Examples of the latent curing agents for epoxy resins are amine curing agents, Novolac curing agents, imidazole curing agents and anhydride curing agents, etc. Examples of amine curing agents are aliphatic polyamines such as diethylenetriamine, triethylenetetraamine, tetraethylenepentaamine, m-xylenediamine, trimethyl hexanediamine, 2-methyl-pentanediamine and diethylaminopropylamine; alicyclic polyamines such as isophorone diamine, 1,3-diaminomethylcyclohexane, bis(4-aminocyclohexyl)methane, norbornanediamine, 1,2-diaminocyclohexane and Laromin; and aromatic polyamines such as diaminodiphenylmethane, diaminodiphenylethane and m-phenylenediamine, etc.

Examples of the Novolac curing agents are phenol/Novolac resin, bisphenol/Novolac resin, etc. Examples of the imidazole curing agents are 2-methylimidazole, 2-ethylhexylimidazole, 2-phenylimidazole and 1-cyanoethyl-2-phenylimidazolium trimellitate, etc.

Examples of the anhydride curing agents are tetrahydrophthalic anhydride, hexahydrophthalic anhydride, methyltetrahydrophthalic anhydride, methylhexahydro-phthalic anhydride, methylcyclohexene tetracarboxylic dianhydride, phthalic anhydride, trimellitic anhydride, pyromellitic anhydride and benzophenonetetracarboxylic dianhydride, etc.

Furthermore, a curing promoter may also be used to facilitate the curing reaction of a polymerizable compound with glycidyl, epoxy or oxetanyl and the curing agent. Examples of the curing promoter are tertiary amines such as benzyldimethylamine, tris(dimethylaminomethyl)phenol and dimethylcyclohexylamine; imidazoles such as 1-cyanoethyl-2-ethyl-4-methylimidazole and 2-ethyl-4-methylimidazole; organophosphorus compounds such as triphenylphosphine; quaternary phosphosium salts such as tetraphenylphosphosium bromide; diazobicyclo alkenes such as 1,8-diazobicyclo-[5.4.0]undecene-7 or an organic acid salt thereof; quaternary ammonium salts such as tetraethylammonium bromide, and tetrabutylammonium bromide; boron compounds such as boron trifluoride and triphenyl borate, etc. These curing promoters can be used alone, or in a combination of two or more.

Moreover, a stabilizer is preferably added to prevent unwanted polymerization, for example, during storage. The stabilizer can be any compound well known to those of skill in the art; representative examples thereof are 4-ethoxyphenol, hydroquinone and butylated hydroxytoluene (BHT), etc.

5-3. Content of Liquid Crystal Composition

The content of the liquid crystal composition in the polymer/liquid crystal composite material of this invention is preferably as high as possible, so long as it is within a range in which the composite material can exhibit an optically isotropic liquid crystal phase. This is because the electric-birefringence of the composite material of this invention is greater when the content of the liquid crystal composition is higher.

In the polymer/liquid crystal composite material of this invention, the content of the liquid crystal composition is preferably 60-99 wt %, more preferably 60-95 wt % and particularly preferably 65-95 wt %, relative to the composite material. The content of the polymer is preferably 1-40 wt %, more preferably 5-40 wt % and particularly preferably 5-35 wt %, relative to the composite material.

5-4. Other Components

The polymer/liquid crystal composite material of this invention may also contain, for example, a dichroic dye and a photochromic compound, without compromising the effects of this invention.

This invention is further described with reference to the examples, but is not limited thereto. Furthermore, "%" denotes "wt %", unless specifically indicated.

6. Optical Device

A sixth aspect of this invention is an optical device, which contains the liquid crystal composition or the polymer/liquid crystal composite material (both referred to as liquid crystal medium) and is driven in an optically isotropic liquid crystal phase.

The liquid crystal medium is optically isotropic in absence of an electric field but exhibits an optical anisotropy in presence of an electric field, so that optical modulation can be achieved with an electric field.

The structure of the liquid crystal display device is, for example, shown in FIG. 1, in which the electrodes on the comb-like electrode substrate are arranged such that parts of the electrode 1 extending from the left side and parts of the electrode 2 extending from the right side are alternatively arranged. When there is a potential difference between the electrodes 1 and 2, the comb-like electrode substrate is provided with an electric field in two directions (upward and downward), as shown in FIG. 1.

EXAMPLES

An obtained compound is characterized with proton nuclear magnetic resonance ($^1$H-NMR) spectrum and gas chromatogram obtained from gas chromatography (GC) analysis. The analysis methods are firstly described below.

$^1$H-NMR analysis: $^1$H-NMR analysis was carried out using DRX-500 (made by Bruker BioSpin). In the measurement, a sample prepared in an example was dissolved in a deuterated solvent, such as $CDCl_3$, capable of dissolving the sample, and was then measured with an NMR apparatus of 500 MHz at room temperature in 24 times of accumulation. In the resulting NMR spectrum, "s" denotes singlet, "d" denotes doublet, "t" denotes triplet, "q" denotes quartet and "m" denotes multiplet. Tetramethylsilane (TMS) was used as the standard of zero chemical shift (b).

GC analysis: GC analysis was carried out using a GC apparatus Model GC-14B (made by Shimazu). The column was the capillary column CBP1-M25-025 (length=25 m, inner diameter=0.22 mm, film thickness=0.25 μm) made by Shimazu, and the stationary liquid phase was dimethylpolysiloxane (without polarity). The carrier gas was helium, in a flow rate adjusted to 1 ml/min. The sample evaporation chamber was set at 300° C., and the detector (flame ionization detector, FID) was set at 300° C.

A sample was dissolved in toluene to give a solution of 1 wt %, and then 1 μl of the solution was injected into the sample evaporation chamber.

The recorder used was Chromatopac Model C-R6A made by Shimazu, or an equivalent thereof. The resulting gas chromatogram exhibited peak retention times and peak areas corresponding to the component compounds.

The solvent for diluting the sample was, for example, chloroform or hexane, etc. The column used was, for example, capillary column DB-1 (length=30m, inner diameter=0.32 mm, film thickness=0.25 μm) made by Agilent Technologies Inc., HP-1 (length=30 m, inner diameter=0.32 mm, film thickness=0.25 μm) made by Agilent Technologies Inc., Rtx-1 (length=30 m, inner diameter=0.32 mm, film thickness=0.25 μm) made by Restek Corporation, or BP-1 (length=30 m, inner diameter=0.32 mm, film thickness=0.25 μm) made by SGE International Pty. Ltd.

The area ratios of the peaks in the gas chromatogram correspond to the ratios of the component compounds. Generally, the weight percentages of the component compounds in the analyzed sample are not completely identical to the area percentages of the peaks. In this invention, however, when the columns above are used, the correction coefficient is substantially equal to one, and therefore the weight percentages of the component compounds in the analyzed sample are substantially equivalent to the area percentages of the peaks. This is because there is no significant difference among the correction coefficients of the component compounds. In order to more accurately calculate the ratios of the liquid crystal compounds in the liquid crystal composition with GC, the internal standard method for GC can be used, wherein GC measurements were simultaneously performed on an accurately weighed specified amount of a liquid crystal compound component (detected component) and a liquid crystal compound as standard (standard), and a relative intensity was previously calculated as a peak area ratio of the detected component to the standard. If a correction was done using the relative intensity expressed as peak area ratio of each component to the standard, the ratios of the liquid crystal compounds in the liquid crystal composition can be more accurately calculated with GC analysis.

Samples for Determining Characteristic Values of Liquid Crystal Compounds

Upon measuring the characteristic values, there are two methods, i.e., taking a pure compound as a sample, and mixing a compound in a mother liquid crystal to form a sample.

When a sample prepared by mixing a compound with a mother liquid crystal is measured, the following method is used for the measurement. Firstly, 15 wt % of the obtained liquid crystal compound was mixed with 85 wt % of the mother liquid crystal to prepare a sample, and then the characteristic value of the compound is calculated from the measured value with the extrapolation method according to the equation below.

[Extrapolated Value]=(100×[measured value of the sample]−[wt % of the mother liquid crystal]× [measured value of the mother liquid crystal])/ [wt % of the liquid crystal compound]

While a smectic phase or crystal may be separated at the above ratio of the liquid crystal compound to the mother liquid crystal at 25° C., the ratio of the liquid crystal compound and the mother liquid crystal is changed to 10 wt %:90 wt %, 5 wt %:95 wt % and 1 wt %:99 wt % in order. The composition without separation of a smectic phase or crystal at 25° C. was measured for a characteristic value, and the characteristic value of the liquid crystal compound is calculated by extrapolation based on the above equation.

There are numerous mother liquid crystals that can be used for the measurement. For example, the composition of the mother liquid crystal A is as follows (wt %).

Mother Liquid Crystal A:

$C_3H_7$—⬡—⬡—CN  24%

$C_5H_{11}$—⬡—⬡—CN  36%

$C_7H_{15}$—⬡—⬡—CN  25%

$C_5H_{11}$—⬡—⬡—⬡—CN  15%

Method for Measuring Characteristic Values of Liquid Crystal Compounds

The measurement of the characteristic values was carried out with the methods below. These methods are mainly those described in EIAJ•ED-2521A of the Standard of Electric Industries Association of Japan, or modifications of the same. Moreover, the TN device used in the measurement was not equipped with TFT.

With respect to the determined values, in case that the liquid crystal compound itself is used as a sample, the obtained values are recorded as experiment data; in case that a mixture of the liquid crystal compound and a mother liquid crystal is a sample, the extrapolated values obtained with extrapolation are recorded as experiment data.

The phase structure and the phase transition temperature (° C.) were measured using the methods (1) and (2) below.

(1) A compound was placed on a hot plate (Hot Stage FP-52 by Mettler, Corp.) in a melting point measuring apparatus equipped with a polarizing microscope, and the phase behaviour and its change were observed by the polarizing microscope while the sample is heated at a rate of 3° C./min, to determine the type of the liquid crystal phase.

(2) A scanning calorimetry DSC-7 system or Diamond DSC system (made by Perkin Elmer Corp.) is used, in a heating or cooling rate of 3° C./min, and the on-set temperature of the endothermic peak or the exothermic peak accompanying with the phase change of the sample was calculated with extrapolation to determine the phase transition temperature.

Hereinafter, a crystal is represented by "K". In a case where two crystals are distinguished from each other, they are represented by "$K_1$" and "$K_2$". A smectic phase is represented by "Sm", a nematic phase is represented by "N", and a liquid (isotropic phase) is represented by "I". In case that a smectic B phase and a smectic A phase are distinguished from each other in the smectic phase, they are expressed as "SmB" and "5 mA". "BP" represents a blue phase or an optically isotropic liquid crystal phase. A biphase co-existence is sometimes represented by (N*+I) or (N*+BP). Specifically, (N*+I) represents a phase in which an isotropic phase and a chiral nematic phase coexist, and (N*+BP) represents a phase in which a BP phase or an optically isotropic liquid crystal phase and a chiral nematic phase coexist. "Un" represents a non-optically isotropic unidentified phase. For the expression of the phase transition temperature, for example, "K 50.0 N 100.0 I" means that the phase transition temperature ($T_{KN}$) from the crystal to the nematic phase is 50.0° C. and that ($T_{NI}$) from the nematic phase to the liquid is 100.0° C. This also applies to the cases of other expressions.

The upper-limit temperature of a nematic phase ($T_{NI}$, ° C.): a sample as a mixture of a liquid crystal compound and a mother liquid crystal was placed on a hot plate (Hot Stage FP-52 by Mettler Corp.) in a melting point measuring apparatus equipped with a polarizing microscope, and was observed by the polarizing microscope while heated at a rate of 1° C./min. The temperature at which a part of the sample began to change from a nematic phase to an isotropic liquid was recorded as the upper-limit temperature of the nematic phase, which is sometimes abbreviated to "upper-limit temperature" hereafter.

Low-temperature compatibility: samples were prepared by mixing a mother liquid crystal with a liquid crystal compound such that the content of the latter was 20 wt %, 15 wt %, 10 wt %, 5 wt %, 3 wt % or 1 wt %, and then placed into glass bottles. The glass bottles were kept in a freezer at −10° C. or −20° C. for a certain period, and the presence or absence of crystal or a smectic phase was observed.

Viscosity (η, determined at 20° C., mPa·s): the viscosity of a mixture of a liquid crystal compound and a mother liquid crystal is measured with an E-type viscometer.

Optical anisotropy (Δn): the measurement was done at 25° C. utilizing light of 589 nm, with an Abbe refractometer having a polarizing plate mounted on the ocular lens. After the surface of the main prism is rubbed in a direction, a sample as a mixture of a liquid crystal compound and a mother liquid crystal was dropped onto the main prism. The refractive index $n_{//}$ was determined when the polarizing direction was parallel to the rubbing direction, and the refractive index $n_{\perp}$ was determined when the polarizing direction was perpendicular to the rubbing direction. The optical anisotropy (Δn) was calculated according to the equation of "$\Delta n = n_{//} - n_{\perp}$".

Dielectric anisotropy (Δ∈: determined at 25° C.): a sample as a mixture of a liquid crystal compound and a mother liquid crystal was fed into a liquid crystal cell with a distance (cell gap) of 9 μm between two glass substrates and a twist angle of 80°. The liquid crystal cell was applied with a voltage of 20 V, and the dielectric constant ($\in_{//}$) in the major-axis direction of the liquid crystal molecule was determined. Then, a voltage of 0.5 V was applied, and the dielectric constant ($\in_{\perp}$) in the minor axis direction of the liquid crystal molecule was determined. The dielectric anisotropy (Δ∈) was calculated according to the equation of "$\Delta \in = \in_{//} - \in_{\perp}$".

Pitch (p, determined at 25° C., m)

The pitch length was measured with selective reflection (Handbook of Liquid Crystal, p. 196, 2000, from Maruzen). For the selective reflection wavelength λ, the relationship <n>p/λ=1 exists, wherein <n> denotes the average refractive index and can be calculated from the equation of "$<n> = \{(n_{//}^2 + n_{\perp}^2)/2\}^{1/2}$". The selective reflection wavelength can be determined by a microspectrophotometer MSV-350 made by Japan Electronics Co., Ltd. The pitch was calculated by dividing the obtained reflection wavelength with the average refractive index <n>. When the concentration of the optically active compound is low, the pitch of a cholesteric liquid crystal having a reflection wavelength at the long wavelength side of visible light is proportional to the reciprocal of the concentration. Therefore, multiple points were measured in the pitch length of the liquid crystal having a selective reflection wavelength in the visible light region, and then the pitch was calculated using linear extrapolation method. Herein, the "optically active compound" is equivalent to the chiral dopant in this invention.

Synthesis Example 1

Synthesis of Formula (S1-9)

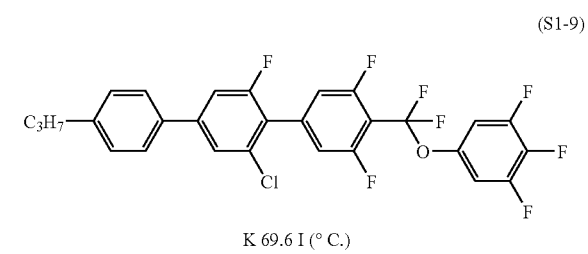

K 69.6 I (° C.)

The synthesis scheme is as shown below.

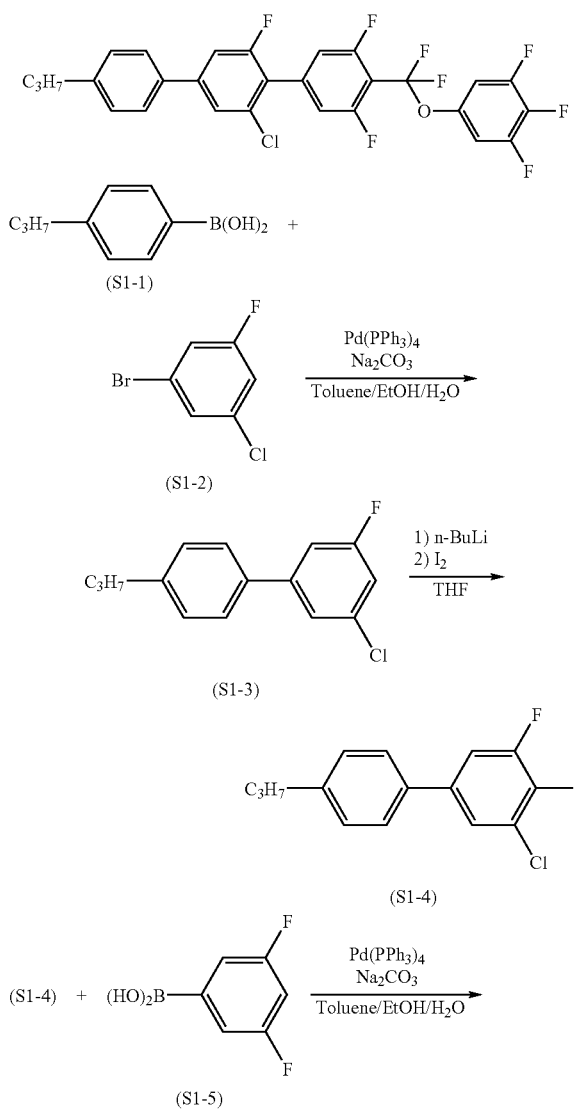

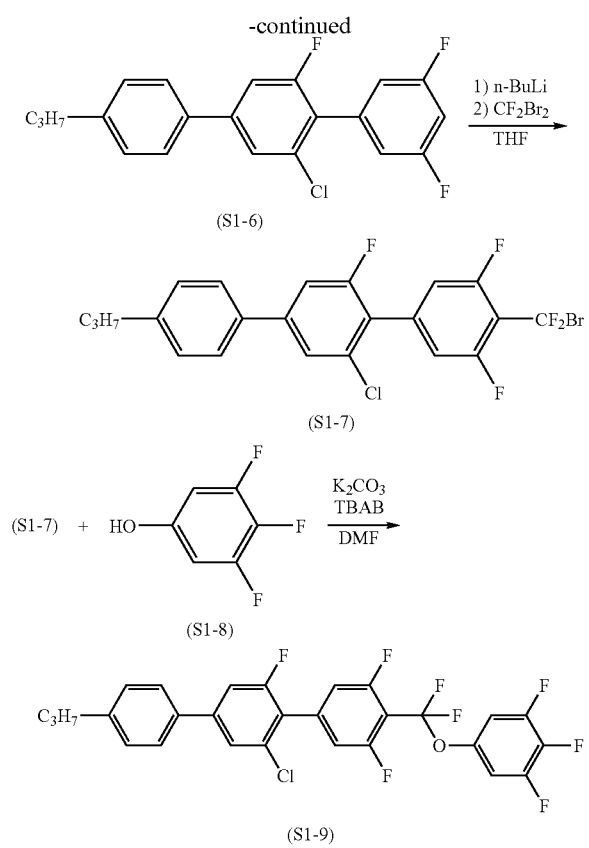

(S1-6)

(S1-7)

(S1-8)

(S1-9)

Synthesis of Compound (S1-3)

Firstly, 25.8 g of 4-propylphenylboric acid (S1-1), 30.0 g of 1-bromo-3-chloro-5-fluorobenzene (S1-2), 2.5 g of tetrakis(triphenylphosphine)palladium, 50.1 g of sodium carbonate and 700 ml of a mixed solvent of toluene/ethanol/water=3/3/1 (volume ratio) were added into a reactor under nitrogen atmosphere, and then refluxed for 5 hours. Next, the reaction solution was cooled to room temperature, added with toluene, and then washed with 1N HCl$_{(aq)}$ and water. The resulting solution was dried with magnesium sulfate, and then distilled under reduced pressure to remove the solvent. Next, the residue was purified by silica-gel column chromatography with heptane as an eluent, and then dried under reduced pressure to obtain 34.8 g of 4-propyl-1-(3-chloro-5-fluorophenyl)benzene (S1-3). The yield of compound (S1-3) from (S1-1) was 97.7%.

Synthesis of Compound (S1-4)

Firstly, 15.0 g of (S1-3) and 150 ml of tetrahydrofuran (THF) were added to a reactor under nitrogen atmosphere and cooled to −70° C., 46.1 ml of 1.6 M n-butyl lithium solution in n-hexane was added dropwise, and then the mixture was stirred for 1 hour at the temperature. Next, 100 ml of a solution of 8.4 g iodine in THF was added dropwise at −70° C., and the mixture was stirred for 5 hours at the temperature. Then, the reaction solution was warmed to room temperature, and poured in an aqueous sodium thiosulfate solution. The product was then extracted with ethyl acetate, and the organic layer was washed with aqueous sodium thiosulfate solution and water. Next, the organic layer was dried with magnesium sulfate and distilled under reduced pressure to remove the solvent. Afterwards, the product was purified by silica-gel column chromatography with a mixed solvent of heptane/toluene=3/1 as an eluent, and then dried under reduced pressure to obtain 22.4 g of 4-propyl-1-(3-chloro-5-fluoro-4-iodo-phenyl)benzene (S1-4). The yield of the compound (S1-4) from (S1-3) was 99.3%.

Synthesis of Compound (S1-6)

Firstly, 22.3 g of (S1-4); 10.3 g of 3,5-difluorophenylboric acid (S1-5), 1.0 g of tetrakis(triphenylphosphine)palladium, 20.8 g of sodium carbonate and 490 ml of a mixed solvent of toluene/ethanol/water=3/3/1 (volume ratio) were added into a reactor under N$_2$-atmosphere, and the mixture was refluxed for 10 hours. Then, additional 1.0 g of tetrakis(triphenylphosphine)palladium was added, and the mixture was refluxed for 10 hours. Next, the reaction solution was cooled to room temperature, added with toluene, and washed with 1N HCl$_{(aq)}$ and water. Then, the solution was dried with magnesium sulfate and distilled under reduced pressure to remove the solvent. The product was purified by silica-gel column chromatography with heptane as an eluent, and then dried under reduced pressure to obtain 24.9 g of 4-propyl-1-(3-chloro-5-fluoro-phenyl)benzene (S1-6). The yield of the compound (S1-6) from (S1-4) was 91.1%.

Synthesis of Compound (S1-7)

Firstly, 15.0 of the compound (S1-6) and 150 ml of THF were added into a reactor under N$_2$ atmosphere, and cooled to −74° C. Next, 31.8 ml of 1.60 M n-butyl lithium solution in n-hexane was added dropwise at a temperature of −74° C. to −60° C., and the mixture was stirred for 60 min. Afterwards, 20.0 ml of a solution of 12.2 g of dibromodifluoromethane in THF was added dropwise at −75° C. to −70° C., and the mixture was warmed to 25° C. and stirred for 60 min. Then, the reaction mixture was poured in 150 ml of ice water and mixed. Subsequently, the mixture was extracted by adding 100 ml of toluene to separate the organic layer from the aqueous layer, and the organic layer was washed with saline and dried with anhydrous magnesium sulfate. The resulting solution was concentrated under reduced pressure, and then the residue was separated by silica-gel column chromatography with a mixed solvent of heptane/toluene=4/1 as an eluent. Next, the solution was distilled to remove the solvent, and then dried to obtain 19.4 g of (S1-7).

Synthesis of Compound (S1-9)

Firstly, 6.0 g of the compound (S1-7), 1.5 g of 3,4,5-trifluorophenol (S1-8), 2.8 g of potassium carbonate and 100 ml of N,N-dimethylformamide (DMF) were added in a reactor under N$_2$ atmosphere, and the mixture was stirred at 90° C. for 120 min. After being cooled to 25° C., the mixture was poured in 50 ml of ice water and mixed. Next, the mixture was extracted by adding 100 ml of toluene to separate the organic layer from the aqueous layer. The resulting organic layer was sequentially washed with saturated aqueous sodium bicarbonate solution, 0.5 N aqueous NaOH solution and saline, and then dried with anhydrous MgSO$_4$. The resulting solution was concentrated under reduced pressure, and the residue was separated by silica-gel column chromatography with heptane as an eluent. Next, the product was further purified by recrystallization in a mixed solvent of heptane/Solmix A-11, and dried to obtain 2.2 g of (S1-9). The yield of (S1-9) from (S1-6) was 30.6%.

The phase transition temperature of the obtained compound (S1-9) is as follows.

Phase transition temperature (° C.): K 69.6 I.

While CDCl$_3$ was used as a solvent in $^1$H-NMR analysis, the obtained compound was characterized as (S1-9) from the following chemical shift data (δ, ppm): 7.55 (m, 1H), 7.51 (d, 2H), 7.33 (dd, 1H), 7.30 (d, 2H), 7.10 (d, 2H), 7.03-7.00 (m, 2H), 2.66 (t, 2H), 1.73-1.64 (m, 2H) and 0.98 (t, 3H).

Physical Properties of Liquid Crystal Compound (S1-9)

The four compounds designated as mother liquid crystal A above were mixed to prepare a mother liquid crystal A having a nematic phase and the physical properties:

Upper-limit temperature $(T_{NI})$=71.7° C., dielectric anisotropy $(\Delta\epsilon)$=11.0, and optical anisotropy $(\Delta n)$=0.137.

A liquid crystal composition B containing 85 wt % of the mother liquid crystal A and 15 wt % of (S1-9) obtained in Synthesis Example 1 was prepared and determined for its characteristic values. The extrapolated characteristic values of the liquid crystal compound (S1-9) calculated based on the measurements by extrapolation are as follows.

Upper-limit temperature $(T_{NI})$=29.0° C., dielectric anisotropy $(\Delta\epsilon)$=44.4, and optical anisotropy $(\Delta n)$=0.150.

Accordingly, the liquid crystal compound (S1-9) is well compatible with other liquid crystal compounds, and has a large dielectric anisotropy $(\Delta\epsilon)$ and a large optical anisotropy $(\Delta n)$.

Synthesis Example 2

Synthesis of (S2-2)

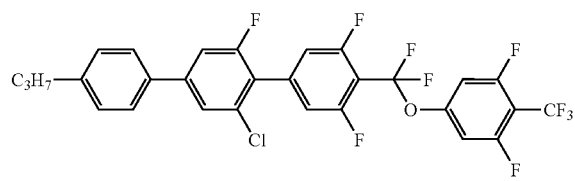

(S2-2)

K 98.9 I (° C.)

Synthesis of Compound (S2-2)

This example synthesized (S2-2) from (S1-6) according to the process for synthesizing (S1-9) from (S1-6) in Synthesis Example 1, while 3,5-difluoro-4-trifluoro-methylphenol (S2-1) was used instead of (S1-8). The yield of (S2-2) from (S1-6) was 27.2%. The phase transition temperature of the compound (S2-2) is as follows.

Phase transition temperature (° C.): K 98.9 I.

While CDCl$_3$ was used as solvent in $^1$H-NMR analysis, the obtained compound was characterized as (S2-2) from the chemical shift data (δ, ppm): 7.55 (m, 1H), 7.50 (d, 2H), 7.33 (dd, 1H), 7.30 (d, 2H), 7.10 (d, 2H), 7.01 (d, 2H), 2.66 (t, 2H), 1.72-1.67 (m, 2H) and 0.98 (t, 3H).

Physical Properties of Liquid Crystal Compound (S2-2)

The four compounds designated as mother liquid crystal A above were mixed to prepare a mother liquid crystal A having a nematic phase and the physical properties:

Upper-limit temperature $(T_{NI})$=71.7° C., dielectric anisotropy $(\Delta\epsilon)$=11.0, and optical anisotropy $(\Delta n)$=0.137.

A liquid crystal composition C containing 95 wt % of the mother liquid crystal A and 5 wt % of (S2-2) obtained in Synthesis Example 2 was prepared and determined for its characteristic values. The extrapolated characteristic values of the liquid crystal compound (S2-2) calculated based on the measurements by extrapolation are as follows.

Upper-limit temperature $(T_{NI})$=33.7° C., dielectric anisotropy (AC)=57.7, and optical anisotropy $(\Delta n)$=0.157.

Accordingly, the liquid crystal compound (S2-2) has a very large dielectric anisotropy $(\Delta\epsilon)$.

Synthesis Example 3

Synthesis of (S3-4)

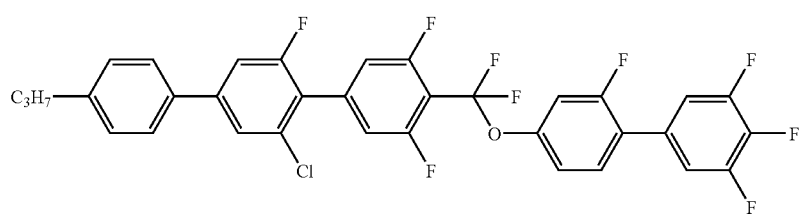

(S3-4)

K 128.3 N 161.1 I (° C.)

The synthesis scheme is shown below.

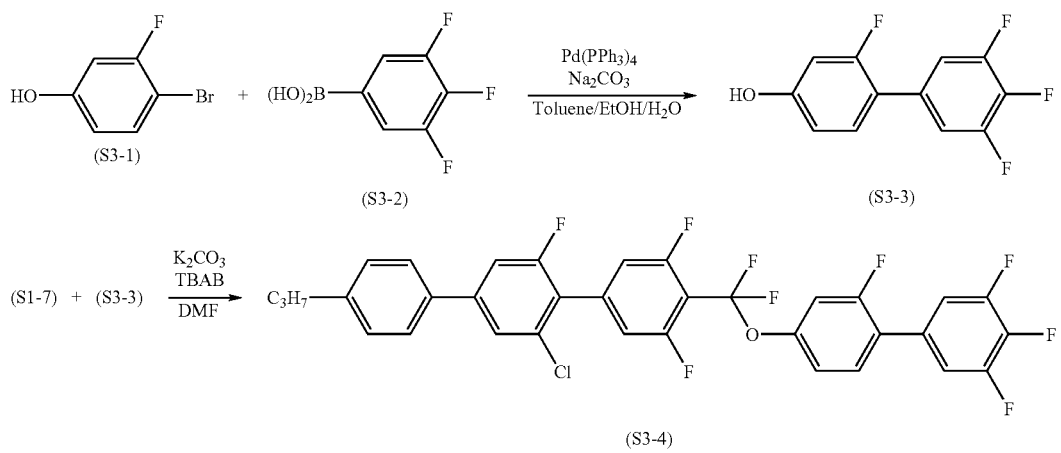

Synthesis of Compound (S3-3)

Firstly, 75.0 g of 4-bromo-3-fluorophenol (S3-1), 82.9 g of 3,4,5-trifluoro-phenylboric acid (S3-2), 13.6 g of tetrakis(triphenylphosphine)palladium, 108.5 g of sodium carbonate and 1100 ml of a mixed solvent of dimethoxyethane/water=2/1 (volume ratio) were added into a reactor under nitrogen atmosphere, heated to 80° C., and stirred for 4 hours. Next, the reaction solution was cooled to room temperature, added with toluene, and then washed with 1N $HCl_{(aq)}$ and water. Afterwards, the solution was dried with magnesium sulphate, and distilled under reduced pressure to remove the solvent. Subsequently, the product was purified by silica-gel column chromatography with heptane/ethyl acetate (4/1) as an eluent, and then dried under reduced pressure. The obtained residue was recrystallized in heptane, to obtain 77.5 g of 3-fluoro-4-(3,4,5-trifluorophenyl)phenol (S3-3). The yield of compound (S3-3) from (S3-1) was 81.5%.

Synthesis of Compound (S3-4)

This example synthesized (S3-4) from (S1-6) according to the process for synthesizing (S1-9) from (S1-6) in Synthesis Example 1, while 3-fluoro-4-(3,4,5-trifluorophenyl)phenol (S3-3) was used instead of (S1-8). The yield of (S3-4) from (S1-6) was 31.4%, and the phase transition temperature of the same is as follows.

Phase transition temperature (° C.): K 128.3 N 161.1 I.

While $CDCl_3$ was used as solvent in $^1$H-NMR analysis, the obtained compound was characterized as (S3-4) from the chemical shift data (δ, ppm): 7.55 (m, 1H), 7.51 (d, 2H), 7.39 (t, 1H), 7.33 (dd, 1H), 7.30 (d, 2H), 7.22-7.16 (m, 4H), 7.10 (d, 2H), 2.65 (t, 2H), 1.71-1.67 (m, 2H) and 0.98 (t, 3H).

Physical Properties of Liquid Crystal Compound (S3-4)

A liquid crystal composition D containing 95 wt % of the mother liquid crystal A and 5 wt % of (S3-4) obtained in Synthesis Example 3 was prepared and determined for its characteristic values. The extrapolated characteristic values of the liquid crystal compound (S3-4) calculated based on the measurements by extrapolation are as follows.

Upper-limit temperature $(T_{NI})$=83.7° C., dielectric anisotropy (ΔC)=47.7, and optical anisotropy (Δn)=0.197.

Accordingly, the liquid crystal compound (S3-4) has a high upper-limit temperature $(T_{NI})$, a large dielectric anisotropy (Δ∈) and a large optical anisotropy (Δn).

Synthesis Example 4

Synthesis of (S4-4)

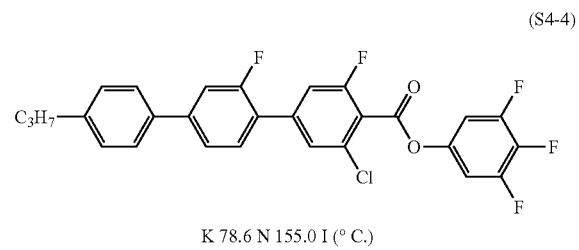

K 78.6 N 155.0 I (° C.)

The synthesis scheme is shown below.

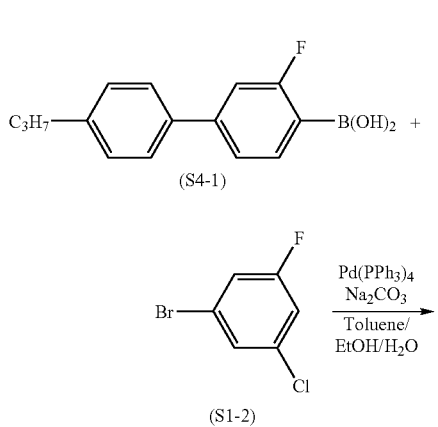

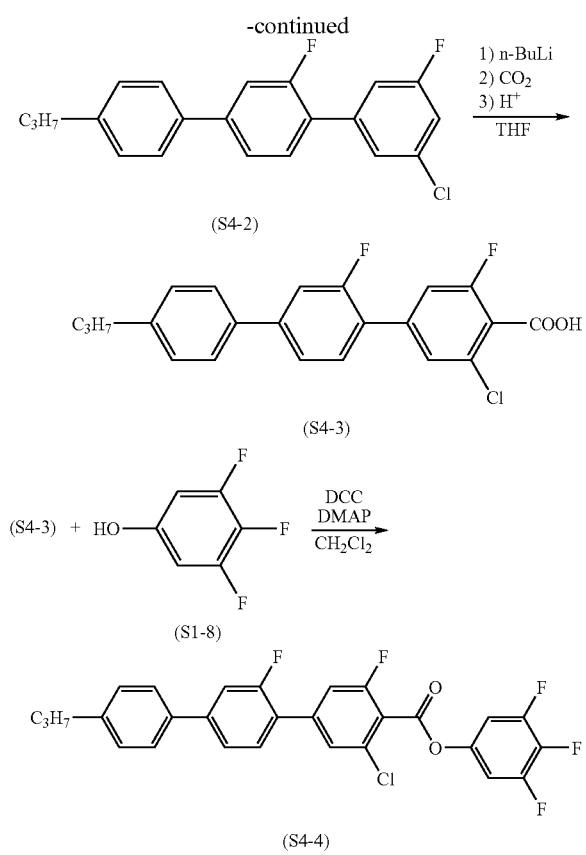

Synthesis of Compound (S4-2)

Firstly, 55.0 g of 4-(4-propylphenyl)-2-fluorophenylboric acid (S4-1), 40.6 g of 1-bromo-3-chloro-5-fluorobenzene (S1-2), 3.4 g of tetrakis(triphenylphosphine) palladium, 67.8 g of sodium carbonate and 900 ml of a mixed solvent of toluene/ethanol/water=3/3/1 (volume ratio) were added into a reactor under $N_2$ atmosphere, and the mixture was refluxed for 6 hours. Next, the reaction solution was cooled to room temperature, added with toluene, and washed with 1N $HCl_{(aq)}$ and water. Then, the solution was dried with magnesium sulfate, and distilled under reduced pressure to remove the solvent. The product was purified by silica-gel column chromatography with heptane as an eluent, and then dried under reduced pressure. The obtained residue was recrystallized in a mixed solvent of ethanol/ethyl acetate=10/1 to obtain 47.7 g of (S4-2). The yield of the compound (S4-2) from (S4-1) was 71.9%.

Synthesis of Compound (S4-3)

Firstly, 10.0 g of (S4-2) and 100 ml of THF were added in a reactor under $N_2$ atmosphere and cooled to −74° C. Next, 22.3 ml of 1.60 M n-butyl lithium solution in n-hexane was added dropwise at a temperature of −74° C. to −60° C., and the mixture was stirred for 60 min. Then, 6.4 g of crushed dry ice was slowly added. The reaction solution was then slowly warmed to 0° C., added with 50 ml of 6N $HCl_{(aq)}$ dropwise, and stirred for 1 hour. Next, the reaction solution was extracted by adding ethyl acetate to separate the organic layer from the aqueous layer, and the organic layer was washed with saline and then dried with anhydrous magnesium sulfate. The resulting solution was concentrated under reduced pressure, and then the residue was recrystallized in ethanol to obtain 6.8 g of (S4-3). The yield of (S4-3) from (S4-2) was 59.8%.

Synthesis of Compound (S4-4)

Firstly, 2.2 g of (S4-3), 0.88 g of 3,4,5-trifluorophenol (S1-8), 0.07 g of dimethylaminopyridine (DMAP) and 100 ml dichloromethane were added into a reactor under nitrogen atmosphere and cooled to 0° C. Next, 30 ml of dicyclohexylcarbodiimide (DCC) solution in dichloromethane was added dropwise, and the mixture was stirred for 4 hours at the temperature, warmed to room temperature, and stirred for 15 hours. Afterwards, the reaction solution was filtered under suction, and the filtrate was sequentially washed with 1N $HCl_{(aq)}$, saturated aqueous sodium bicarbonate solution and water and then dried with magnesium sulfate. The solution was concentrated under reduced pressure, and the residue was purified by silica-gel column chromatography with a mixed solvent of heptane/ethyl acetate=4/1 as an eluent, and then recrystallized in a mixed solvent of heptane/ethyl acetate=10/1 to obtain 2.2 g of (S4-4). The yield of (S4-4) from (S4-3) was 75.2%.

The phase transition temperature of the obtained compound (S4-4) is as follows.

Phase transition temperature (° C.): K 78.6 N 155.0 I.

While $CDCl_3$ was used as solvent in $^1$H-NMR analysis, the obtained compound was characterized as (S4-4) from the chemical shift data (δ, ppm): 7.56-7.53 (m, 3H), 7.51-7.49 (m, 2H), 7.43 (d, 1H), 7.40 (d, 1H), 7.30 (d, 2H), 7.06-7.01 (m, 2H), 2.65 (t, 2H), 1.74-1.66 (m, 2H) and 0.99 (t, 3H).

Physical Properties of Liquid Crystal Compound (S4-4)

A liquid crystal composition E containing 85 wt % of the mother liquid crystal A and 15 wt % of (S4-4) obtained in Synthesis Example 4 was prepared and determined for its characteristic values. The extrapolated characteristic values of the liquid crystal compound (S4-4) calculated based on the measurements by extrapolation are as follows.

Upper-limit temperature $(T_{NI})$=93.7° C., dielectric anisotropy (Δ∈)=37.0, optical anisotropy (Δn)=0.204.

Accordingly, the liquid crystal compound (S4-4) has a high upper-limit temperature $(T_{NI})$, is well compatible with other liquid crystal compounds, and has a large dielectric anisotropy (Δ∈) and a large optical anisotropy (Δn).

Synthesis Example 5

Synthesis of (S5-2)

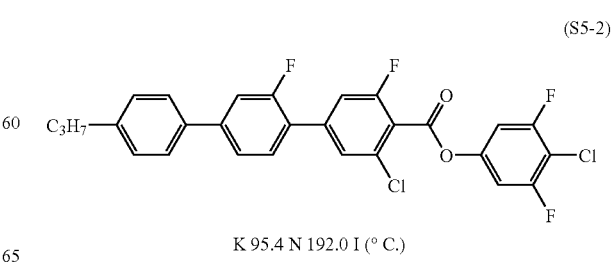

K 95.4 N 192.0 I (° C.)

The synthesis scheme is shown below.

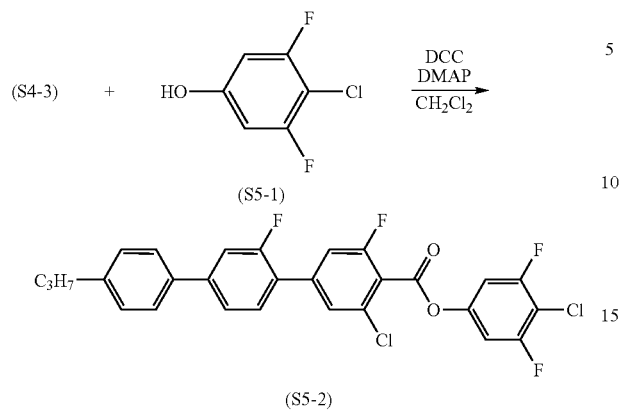

Synthesis of Compound (S5-2)

This example synthesized (S5-2) from (S4-3) according to the process for synthesizing (S4-4) from (S4-3) in Synthesis Example 4, while 4-chloro-3,5-difluoro-phenol (S5-1) was used instead of (S1-8). The yield of (S5-2) from (S4-3) was 90.3%, and the phase transition temperature of (S5-2) is as follows.

Phase transition temperature (° C.): K 95.4 N 192.0 I.

While $CDCl_3$ was used as solvent in $^1$H-NMR analysis, the obtained compound was characterized as (S5-2) from the chemical shift data (δ, ppm): 7.56-7.54 (m, 3H), 7.50-7.49 (m, 2H), 7.44 (d, 1H), 7.40 (d, 1H), 7.30 (d, 2H), 7.06-7.03 (m, 2H), 2.66 (t, 2H), 1.73-1.66 (m, 2H) and 0.99 (t, 3H).

Physical Properties of Liquid Crystal Compound (S5-2)

A liquid crystal composition F containing 85 wt % of the mother liquid crystal A and 15 wt % of (S5-2) obtained in Synthesis Example 5 was prepared and determined for its characteristic values. The extrapolated characteristic values of the liquid crystal compound (S5-2) calculated based on the measurements by extrapolation are as follows.

Upper-limit temperature ($T_{NI}$)=110.4° C., dielectric anisotropy (ΔC)=33.7, and optical anisotropy (Δn)=0.224.

Accordingly, the liquid crystal compound (S5-2) has a high upper-limit temperature ($T_{NI}$), is well compatible with other liquid crystal compounds, and has a large dielectric anisotropy (Δ∈) and a large optical anisotropy (Δn).

Synthesis Example 6

Synthesis of (S6-2)

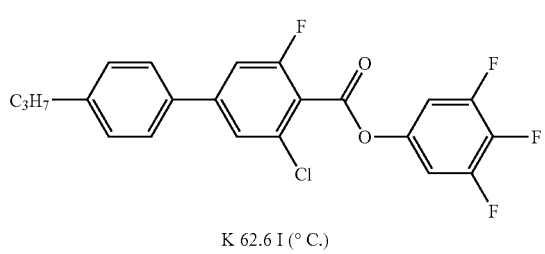

K 62.6 I (° C.)

The synthesis scheme is shown below.

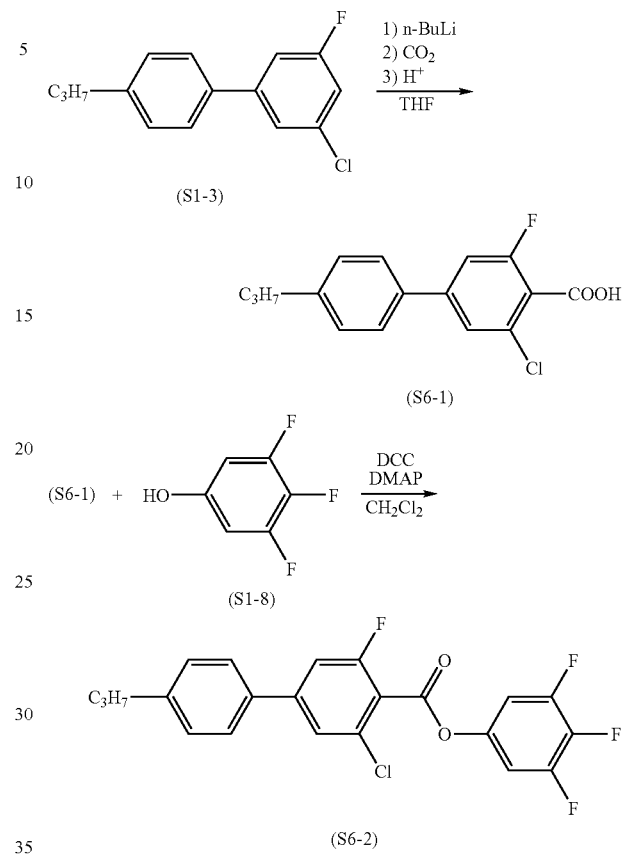

Synthesis of Compound (S6-1)

This example synthesized (S6-1) from (S1-3) according to the process for synthesizing (S4-3) from (S4-2) in Synthesis Example 4, while (S1-3) was used instead of (S4-2). The yield of (S6-1) from (S1-3) was 95.0%.

Synthesis of Compound (S6-2)

This example synthesized (S6-2) from (S6-1) according to the process for synthesizing (S4-4) from (S4-3) in Synthesis Example 4, while (S6-1) was used instead of (S4-3). The yield of (S6-2) from (S6-1) was 77.5%, and the phase transition temperature of (S6-2) is as follows.

Phase transition temperature (° C.): K 62.6 I.

While $CDCl_3$ was used as solvent in $^1$H-NMR analysis, the obtained compound was characterized as (S6-2) from the chemical shift data (δ, ppm): 7.51-7.48 (m, 3H), 7.32 (dd, 1H), 7.29 (d, 2H), 7.02-6.99 (m, 2H), 2.65 (t, 2H), 1.71-1.66 (m, 2H) and 0.97 (t, 3H).

Physical Properties of Liquid Crystal Compound (S6-2)

A liquid crystal composition G containing 85 wt % of the mother liquid crystal A and 15 wt % of (S6-2) obtained in Synthesis Example 6 was prepared and determined for its characteristic values. The extrapolated characteristic values of the liquid crystal compound (S6-2) calculated based on the measurements by extrapolation are as follows.

Upper-limit temperature ($T_{NI}$)=−9.6° C., dielectric anisotropy (Δ∈)=28.3, and optical anisotropy (Δn)=0.104.

Accordingly, the liquid crystal compound (S6-2) is well compatible with other liquid crystal compounds and has a large dielectric anisotropy (As).

Synthesis Example 7

Synthesis of (S7-2)

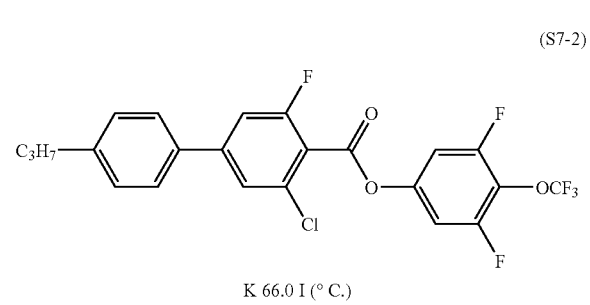

K 66.0 I (° C.)

The synthesis scheme is shown below.

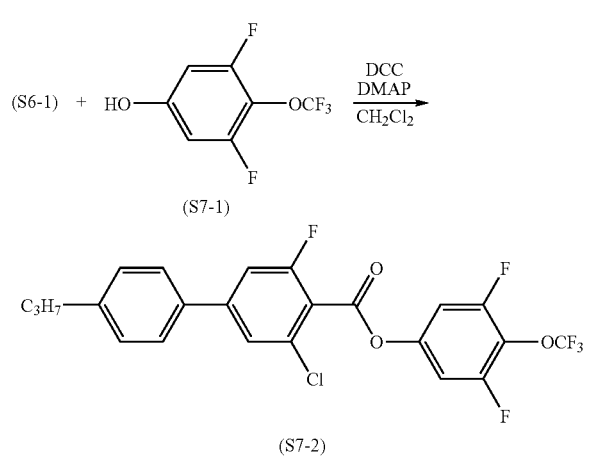

Synthesis of Compound (S7-2)

This example synthesized (S7-2) from (S6-1) according to the process for synthesizing (S6-2) from (S6-1) in Synthesis Example 6, while 3,5-difluoro-4-trifluoro-methoxyphenol (S7-1) was used instead of (S1-8). The yield of (S7-2) from (S6-1) was 74.4%, and the phase transition temperature of (S7-2) is as follows.

Phase transition temperature (° C.): K 66.0 I.

While $CDCl_3$ was used as solvent in $^1$H-NMR analysis, the obtained compound was characterized as (S7-2) from the chemical shift data ($\delta$, ppm): 7.53-7.49 (m, 3H), 7.33 (dd, 1H), 7.30 (d, 2H), 7.07-7.05 (m, 2H), 2.65 (t, 2H), 1.71-1.66 (m, 2H) and 0.98 (t, 3H).

Physical Properties of Liquid Crystal Compound (S7-2)

A liquid crystal composition H containing 85 wt % of the mother liquid crystal A and 15 wt % of (S7-2) obtained in Synthesis Example 7 was prepared and determined for its characteristic values. The extrapolated characteristic values of the liquid crystal compound (S7-2) calculated based on the measurements by extrapolation are as follows.

Upper-limit temperature ($T_{NI}$)=4.4° C., dielectric anisotropy ($\Delta\epsilon$)=31.7, and optical anisotropy ($\Delta n$)=0.110.

Accordingly, the liquid crystal compound (S7-2) is well compatible with other liquid crystal compounds and has a large dielectric anisotropy (As).

Synthesis Example 8

Synthesis of (S8-1)

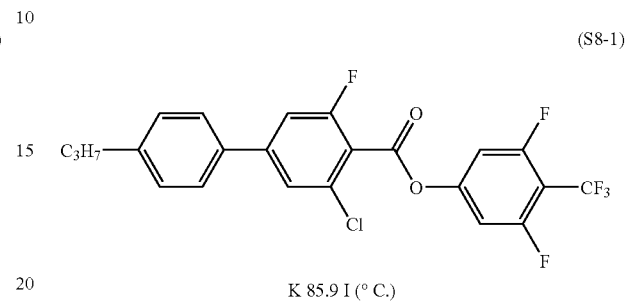

K 85.9 I (° C.)

The synthesis scheme is shown below.

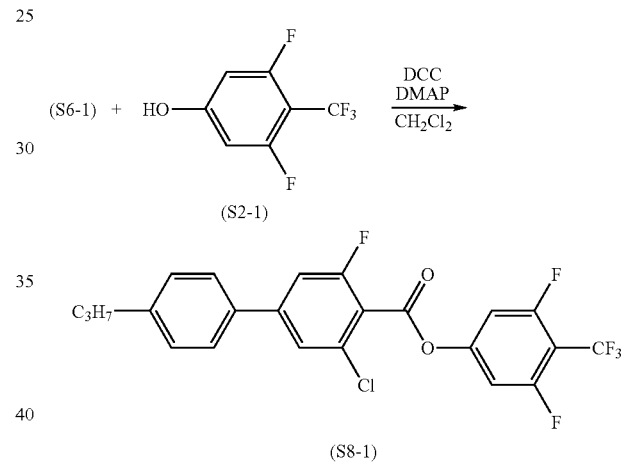

Synthesis of Compound (S8-1)

This example synthesized (S8-1) from (S6-1) according to the process for synthesizing (S6-2) from (S6-1) in Synthesis Example 6, while 3,5-difluoro-4-trifluoro-methylphenol (S2-1) was used instead of (S1-8). The yield of (S8-1) from (S6-1) was 82.9%, and the phase transition temperature of (S8-1) is as follows.

Phase transition temperature (° C.): K 85.9 I.

While $CDCl_3$ was used as solvent in $^1$H-NMR analysis, the obtained compound was characterized as (S8-1) from the chemical shift data ($\delta$, ppm): 7.53-7.48 (m, 3H), 7.33 (dd, 1H), 7.30 (d, 2H), 7.06-7.04 (m, 2H), 2.65 (t, 2H), 1.71-1.66 (m, 2H) and 0.97 (t, 3H).

Physical Properties of Liquid Crystal Compound (S8-1)

A liquid crystal composition I containing 90 wt % of the mother liquid crystal A and 10 wt % of (S8-1) obtained in Synthesis Example 8 was prepared and determined for its characteristic values. The extrapolated characteristic values of the liquid crystal compound (S8-1) calculated based on the measurements by extrapolation are as follows.

Upper-limit temperature ($T_{NI}$)=−6.3° C., dielectric anisotropy ($\Delta\epsilon$)=40.7, and optical anisotropy ($\Delta n$)=0.117.

Accordingly, the liquid crystal compound (S8-1) has a very large dielectric anisotropy (Δ∈).

Synthesis Example 9

Synthesis of (S9-1)

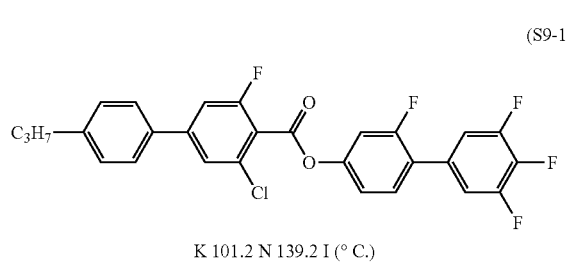

K 101.2 N 139.2 I (° C.)

The synthesis scheme is shown below.

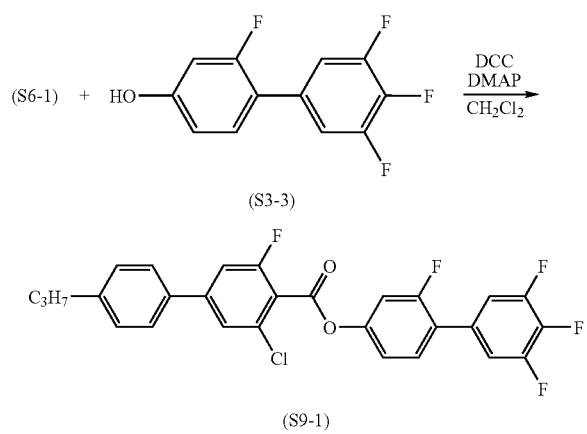

Synthesis of Compound (S9-1)

This example synthesized (S9-1) from (S6-1) according to the process for synthesizing (S6-2) from (S6-1) in Synthesis Example 6, while (S3-3) was used instead of (S1-8). The yield of (S9-1) from (S6-1) was 63.3%, and the phase transition temperature of (S9-1) is as follows.

Phase transition temperature (° C.): K 101.2 N 139.2 I.

While CDCl$_3$ was used as solvent in $^1$H-NMR analysis, the obtained compound was characterized as (S9-1) from the chemical shift data (δ, ppm): 7.53-7.49 (m, 3H), 7.45 (t, 1H), 7.33 (dd, 1H), 7.30 (d, 2H), 7.22-7.17 (m, 4H), 2.66 (t, 2H), 1.71-1.67 (m, 2H) and 0.98 (t, 3H).

Physical Properties of Liquid Crystal Compound (S9-1)

A liquid crystal composition J containing 95 wt % of the mother liquid crystal A and 5 wt % of (S9-1) obtained in Synthesis Example 9 was prepared and then determined for its characteristic values. The extrapolated characteristic values of the liquid crystal compound (S9-1) calculated based on the measurements by extrapolation are as follows.

Upper-limit temperature ($T_{NI}$)=69.7° C., dielectric anisotropy (Δ∈)=33.7, and optical anisotropy (Δn)=0.177.

Accordingly, the liquid crystal compound (S9-1) has a large dielectric anisotropy (Δ∈) and a large optical anisotropy (Δn).

Synthesis Example 10

Synthesis of (S10-1)

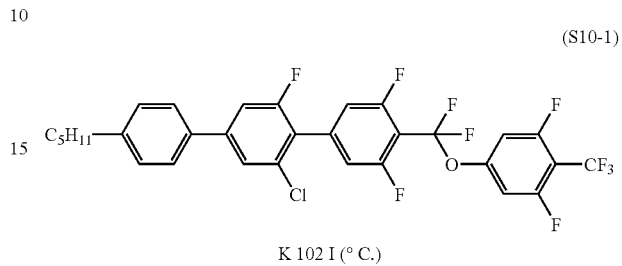

K 102 I (° C.)

Synthesis of Compound (S10-1)

The synthesis of (S 10-1) was according to the process for synthesizing (S1-9) from (S1-1) in Synthesis Example 1, while 4-pentylphenylboric acid was used instead of (S1-1) and 3,5-difluoro-4-trifluoromethylphenol (S2-1) used instead of (S1-8). The phase transition temperature of the obtained compound (S10-1) is as follows.

Phase transition temperature (° C.): K 102 I.

Physical Properties of Liquid Crystal Compound (S10-1)

A liquid crystal composition K containing 95 wt % of the mother liquid crystal A and 5 wt % of (S10-1) obtained in Synthesis Example 10 was prepared and determined for its characteristic values. The extrapolated characteristic values of the compound (S10-1) calculated based on the measurements by extrapolation are as follows.

Upper-limit temperature ($T_{NI}$)=33.7° C., dielectric anisotropy (Δ∈)=56.2, and optical anisotropy (Δn)=0.157.

Accordingly, the liquid crystal compound (S10-1) has a large dielectric anisotropy (Δ∈) and a large optical anisotropy (Δn).

(Composition of this Invention)

In this invention, the characteristic values of a liquid crystal composition were measured by the methods below, which are mainly the methods described in EIAJ•ED-2521A of the Standard of Electric Industries Association of Japan, or modifications of the same. The TN device used in the measurement was not equipped with TFT.

Upper-limit temperature of a nematic phase (NI, ° C.): a sample was placed on a hot plate in a melting point measuring apparatus equipped with a polarizing microscope and heated at a rate of 1° C./min. The temperature at which a part of the sample began to change from a nematic phase to an isotropic liquid was recorded as the upper-limit temperature of the nematic phase, which is sometimes abbreviated to "upper-limit temperature" below.

Lower-limit temperature of a nematic phase ($T_C$, ° C.): a sample having a nematic phase was kept in a freezer at 0° C., −10° C., −20° C., −30° C. or −40° C. for 10 days, and observed for the liquid crystal phase. For example, in a case where the sample exhibits a nematic phase at −20° C. but changes to crystal or a smectic phase at −30° C., the $T_C$ is recorded as "≦−20° C.". Hereinafter, the lower-limit temperature of a nematic phase is often abbreviated to "lower-limit temperature".

Transition temperature of an optically isotropic liquid crystal phase: a sample was placed on a hot plate in a melting point measuring apparatus equipped with a polarizing microscope with crossed Nicols, which was initially heated to a temperature allowing formation of an isotropic phase, and then cooled in a rate of 1° C./min until a chiral nematic phase or an optically isotropic liquid crystal phase was completely formed. The phase transition temperature during this cooling process was measured. Then, the temperature was raised in a rate of 1° C./min, and the phase transition temperature during this heating process was measured. In this invention, unless specifically indicated, the phase transition temperature in the heating process was recorded as the phase transition temperature. When it was difficult to determine the phase transition temperature of the optically isotropic liquid crystal phase in the dark field under crossed Nicols, the phase transition temperature could be determined after the polarizing plate is deviated from the crossed Nicol state by 1-10°.

Viscosity ($\eta$, determined at 20° C., mPa·s): The viscosity was measured with an E-type viscometer.

Rotation viscosity ($\gamma1$, determined at 25° C., mPa·s):

1) For a sample with a positive dielectric anisotropy: the measurement was done following the method described in M. Imai et al., *Molecular Crystals and Liquid Crystals*, Vol. 259, 37 (1995). The sample was placed into a TN device with a twist angle of 0° and a distance (cell gap) of 5 µm between two glass substrates. The TN device was applied with a voltage in a range of 16 to 19.5 V, stepwise by 0.5 V. After a period of 0.2 second with no application of voltage, a voltage application was repeated with a rectangular wave (rectangular pulse of 0.2 second) followed by a period of 2 seconds of no voltage. The peak current and the peak time of the transient current resulting from the application of the voltage were measured. Then, the value of rotation viscosity was calculated based on the measurements and Equation (8) described in page 40 of the paper of M. Imai et al. The dielectric anisotropy required for this calculation was obtained by using the device used in the measurement of the rotation viscosity, following the later-described method for determining dielectric anisotropy.

2) For a sample with a negative dielectric anisotropy: the measurement was done following the method described in M. Imai et al., *Molecular Crystals and Liquid Crystals*, Vol. 259, 37 (1995). The sample was placed into a vertical alignment device with a distance (cell gap) of 20 µm between two glass substrates. The device was applied with a voltage in a range of 30 to 50 V, stepwise by 1 V. After a period of 0.2 second without voltage application, a voltage application was repeated with a rectangular wave (rectangular pulse of 0.2 second) followed by a period of 2 seconds of no voltage. The peak current and the peak time of the transient current resulting from the voltage application were measured. Then, the value of rotation viscosity was calculated based on the measurements and Equation (8) described in page 40 of the paper of M. Imai et al. The dielectric anisotropy value required for this calculation was obtained by using the method described below.

Optical anisotropy ($\Delta n$, determined at 25° C.): the measurement was done using light of 589 nm, with an Abbe refractometer having a polarizing plate mounted on the ocular lens. After the surface of the main prism was rubbed in a direction, the sample was dropped onto the main prism. The refractive index $n_{//}$ was determined when the polarizing direction was parallel to the rubbing direction, and the refractive index $n_\perp$ was determined when the polarizing direction was perpendicular to the rubbing direction. The optical anisotropy was calculated according the equation "$\Delta n = n_{//} - n_\perp$". When the sample was a composition, the above process could be used to determine the optical anisotropy. When the sample was a compound, it is possible to mix the compound in a suitable composition and determine the optical anisotropy of the mixture. In such a case, the optical anisotropy of the compound was an extrapolated value.

Dielectric anisotropy ($\Delta\epsilon$, determined at 25° C.): when the sample was a compound, the compound could be mixed in a suitable composition and determined for the dielectric anisotropy. In this case, the dielectric anisotropy of the compound was an extrapolated value.

1) For a composition with a positive dielectric anisotropy: a sample was placed into a liquid crystal cell with a distance (cell gap) of 9 µm between two glass substrates and a twist angle of 80°. The liquid crystal cell was applied with a voltage of 20 V to determine the dielectric constant ($\epsilon_{//}$) in the major-axis direction of the liquid crystal molecule. Then, a voltage of 0.5 V was applied to determine the dielectric constant ($\epsilon_\perp$) in the minor axis direction of the liquid crystal molecule. The dielectric anisotropy was calculated according to the equation of "$\Delta\epsilon = \epsilon_{//} - \epsilon_\perp$".

2) For a composition with a negative dielectric anisotropy: a sample was placed into a liquid crystal cell processed into homeotropic alignment, and applied with a voltage of 0.5 V to determine the dielectric constant $\epsilon_{//}$. Then, the sample was placed into a liquid crystal cell processed into homogeneous alignment, and applied with a voltage of 0.5 V to determine dielectric constant $\epsilon_\perp$. The dielectric anisotropy was calculated according to the equation of "$\Delta\epsilon = \epsilon_{//} - \epsilon_\perp$".

Threshold voltage (Vth, determined at 25° C., V): when the sample was a compound, the compound could be mixed into a suitable composition and then measured for the threshold voltage. In such a case, the threshold voltage of the compound was an extrapolated value.

1) For a composition with a positive dielectric anisotropy: a sample was placed into a liquid crystal display device of a normally white mode with a distance of ($0.5/\Delta n$) µm between two glass substrates and a twist angle of 80°, in which $\Delta n$ was the optical anisotropy determined using the above method. A rectangular wave with a frequency of 32 Hz was applied to the device. Then, the magnitude of rectangular wave was increased, and the voltage value at which the transmittance of light through the device reached 90% was determined.

2) For a composition with a negative dielectric anisotropy: a sample was placed into a liquid crystal display device of a normally black mode, which has a distance (cell gap) of 9 µm between two glass substrates and was processed into homeotropic alignment. A rectangular wave with a frequency of 32 Hz was applied to the device. Then, the magnitude of the rectangular wave was increased, and the voltage value at which the transmittance of light through the device reached 10% was determined.

Voltage holding ratio (VHR, determined at 25° C., %): the TN device used for the determination had a polyimide alignment film, and had a distance (cell gap) of 6 µm between two glass substrates. The sample was placed into the device, which was then sealed with a UV-polymerizable adhesive. Then, the TN device was charged by applying a pulse voltage (5V, 60 ms). The voltage decay was determined using a high-speed voltmeter at an interval of 16.7 ms, and the area A between the voltage curve and the horizontal axis per unit cycle was calculated. The voltage holding ratio was the percentage of the area A relative to the non-decayed area B.

Helical pitch (determined at 20° C., μm): The helical pitch was measured by a conoscope. A sample was injected into a conoscope, and then the distance (a, μm) between the disclination lines observed from the wedge-type liquid crystal cell was measured. The helical pitch (p) could be calculated according to the formula p=2·a·tan θ, wherein 0 is the angle between the two glass plates in the wedge-type cell, Alternatively, the pitch length can be determined with selective reflection (Handbook of Liquid Crystal, p. 196, 2000, by Maruzen). For the selective reflection wavelength λ, the relationship <n>p/λ=1 exists, wherein <n> denotes the average refractive index and can be calculated following the equation "$<n>=\{(n_{//}^2+n_\perp^2)/2\}^{1/2}$". The selective reflection wavelength was determined by a microspectrophotometer MSV-350 manufactured by Japan Electronics Co., Ltd. The pitch was obtained by dividing the measured reflection wavelength with the average refractive index.

When the concentration of the chiral reagent is low, the pitch of a cholesteric liquid crystal having a reflection wavelength at the long wavelength side of visible light is proportional to the reciprocal of the concentration. Therefore, multiple points were measured in the pitch length of the liquid crystal having selective reflection wavelength in the visible light region, and the pitch was calculated with linear extrapolation.

Hereinafter, the proportion (percentage) of a component or a liquid crystal compound is weight percentage (wt %) relative to the total weight of the liquid crystal compounds. The composition can be prepared by mixing the components including liquid crystal compounds after they are weighted. Thus, the wt % of each component can be easily calculated.

Example 1

A liquid crystal composition NLC-1 was prepared by mixing the liquid crystal compounds below in the following weight percentages.

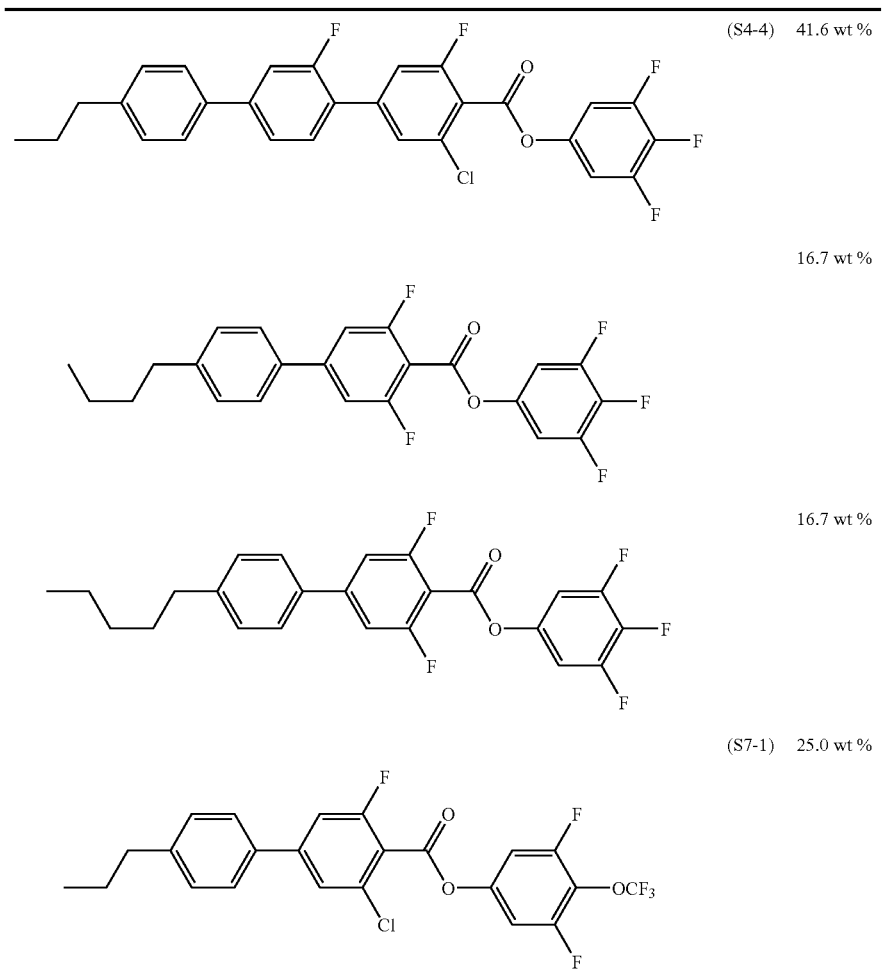

The phase transition temperature of NLC-1 is K≦room temperature N 70.1 I.

Next, a liquid crystal composition CLC-1 containing the liquid crystal composition NLC-1 (95 wt %) and the chiral dopant ISO-6OBA2 (5 wt %) of the formula below was prepared.

ISO-6OBA2 was obtained by reacting isosorbide with 4-hexyloxybenzoic acid to form an ester in the presence of dicyclohexylcarbodiimide (DCC) and 4-dimethylamino-pyridine.

The phase transition temperature of CLC-1 is N* 49.0 BP 49.7 I.

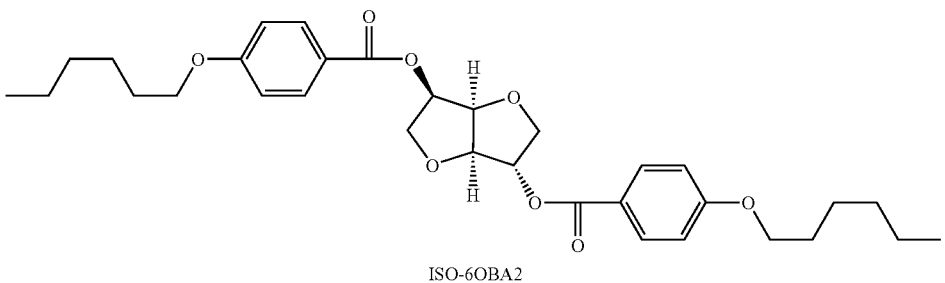

ISO-6OBA2

Example 2

Preparation of Mixture of Monomer with Liquid Crystal Composition

In this example, 79.4 wt % of the liquid crystal composition CLC-1, 10.0 wt % of n-dodecyl acrylate, 10.0 wt % of 1,4-di (4-(6-(acryloxy)hexyloxy)benzoyloxy)-2-methyl-benzene (LCA-6) as a liquid crystal composition and a mixture of a monomer, and 0.6 wt % of 2,2'-dimethoxyphenylacetophenone as a photo-polymerization initiator were mixed, so as to prepare a liquid crystal composition CLC-1M.

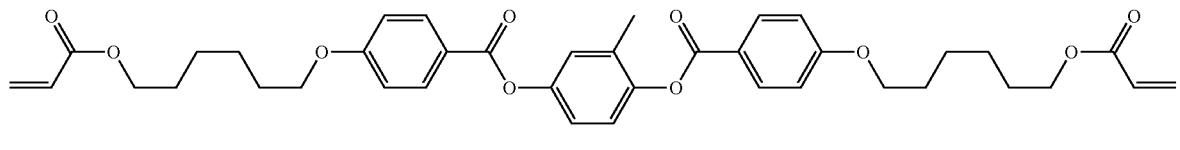

LCA-6

Preparation of Polymer/Liquid Crystal Composite Material

The liquid crystal composition CLC-1M was held between a non-aligned comb-like electrode substrate and the opposite glass substrate (without electrode) with a cell gap of 10 μm, and then the resulting liquid crystal cell was heated until the liquid crystal became isotropic phase at 38.0° C. In this state, the cell was irradiated with UV light of 365 nm in an intensity of 13 mW·cm$^{-2}$ for 1 min for polymerization.

The polymer/liquid crystal composite material CLC-1P thus prepared maintained an optically isotropic liquid crystal phase even being cooled to room temperature.

As shown in FIG. 1, the electrodes on the comb-like electrode substrate were such that parts of the electrode 1 extending from the left side and parts of the electrode 2 from the right side were alternatively arranged. Therefore, when a potential difference is present between the electrodes 1 and 2, the comb-like electrode substrate is provided with an electric field in two directions (upward and downward), as shown in FIG. 1.

Example 3

Figure 2:
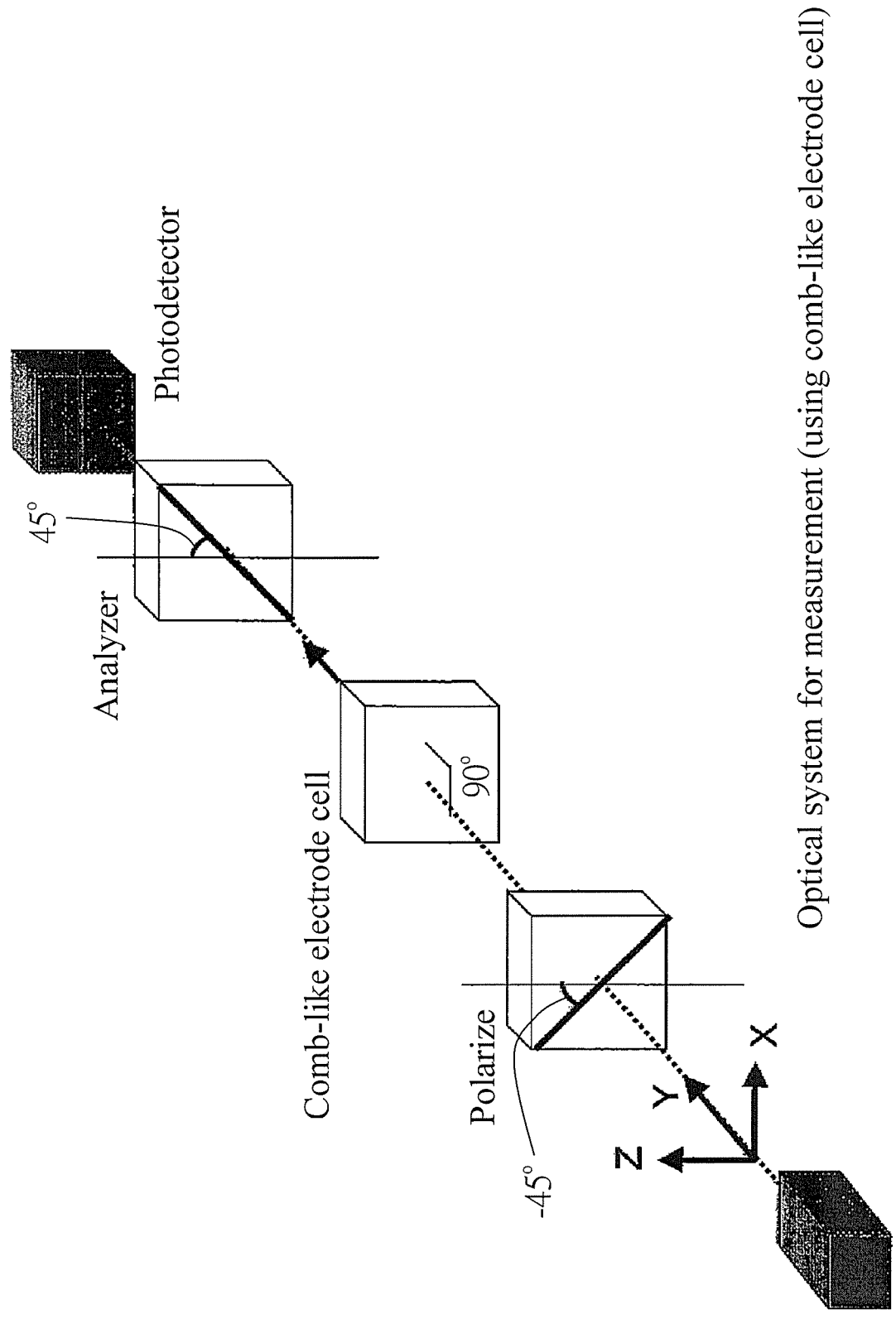
FIG. 2 shows an optical system used in an embodiment.

A liquid crystal cell holding the polymer/liquid crystal composite material CLC-1P obtained in Example 2 was arranged in the optical system of FIG. 2 to measure its electrooptical properties. The light source was the white light source of a polarizing microscope OPTIPHOT-PDL manufactured by Nikon. The above liquid crystal cell was arranged in the optical system in such a manner that the incident light from the light source irradiated on the liquid crystal cell was perpendicular to the surface of the liquid crystal cell, and the line direction of the comb-like electrode was at 45° with respect to the polarizer and the analyzer respectively. The relationship between the voltage and the transmittance was investigated by setting the measuring temperature at the clearing point (50° C.–20° C.=30° C.). When a rectangular wave of 66 V was applied, the transmittance was up to 97.0% and the transmitted light intensity was saturated.

Example 4

A liquid crystal composition NLC-2 was prepared by mixing the liquid crystal compounds below in the following percentages.

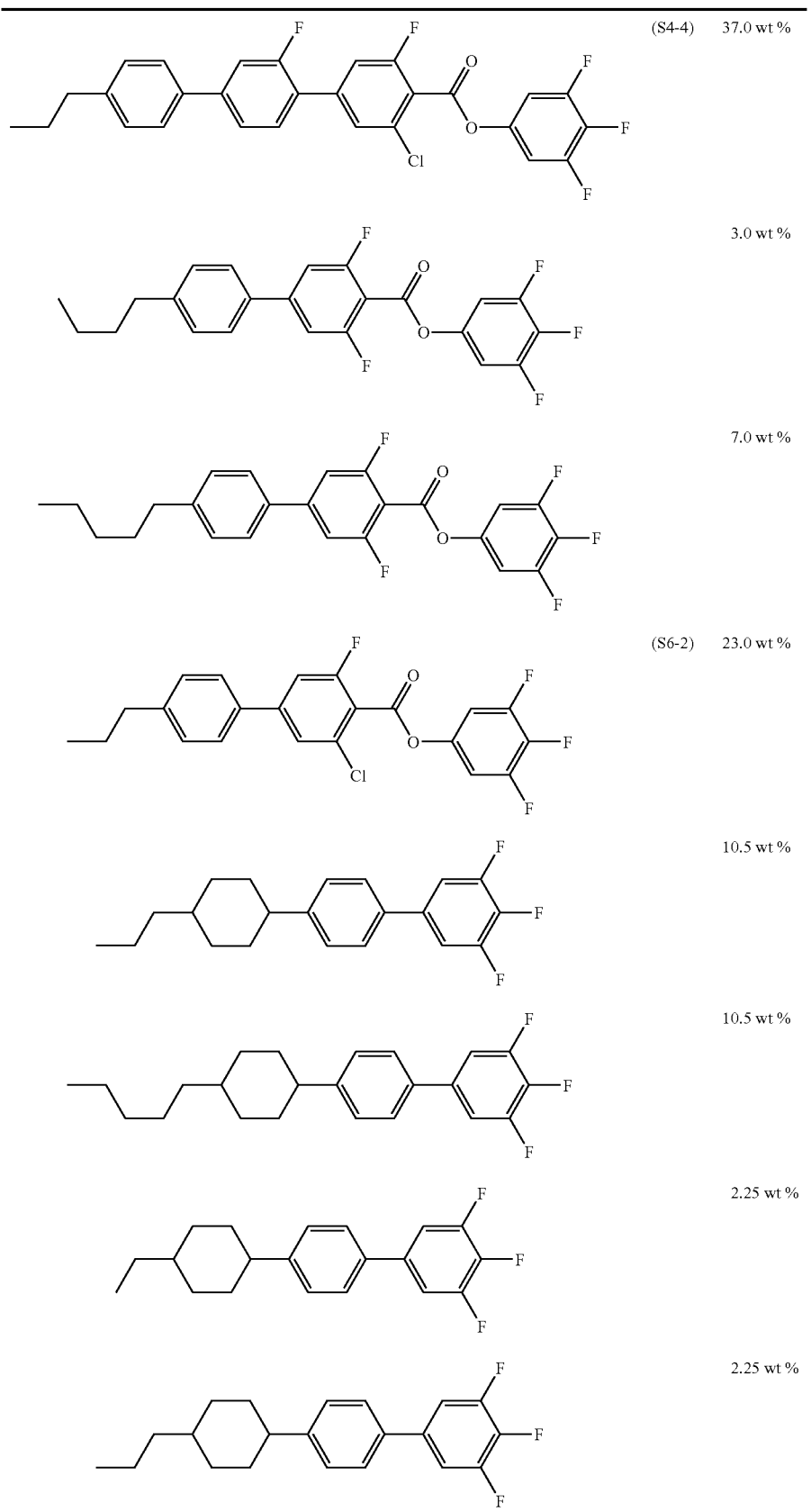

-continued

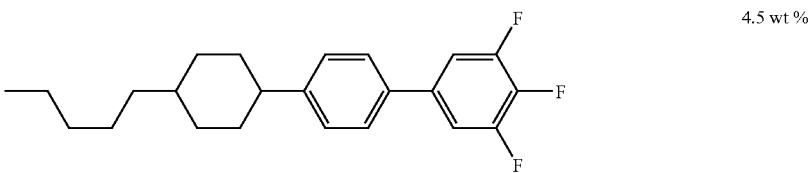
4.5 wt %

The phase transition temperature of NLC-2 is K≦room temperature N 55.5 I.

Next, a liquid crystal composition CLC-2 containing the liquid crystal composition NLC-2 (95 wt %) and the chiral dopant ISO-6OBA2 (5 wt %) of the formula below was prepared.

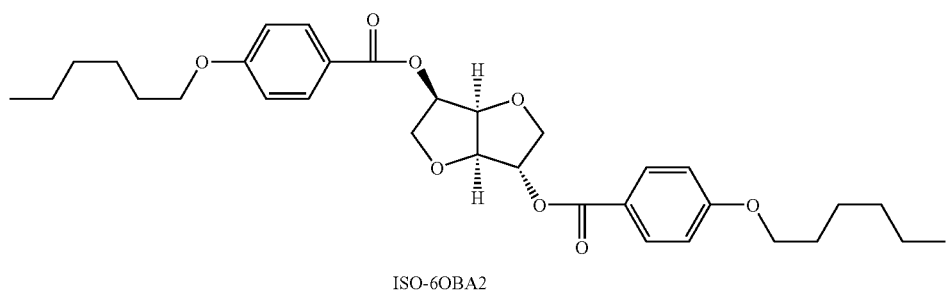

ISO-6OBA2

Example 5

Preparation of Mixture of Monomer with Liquid Crystal Composition

In this example, 88.0 wt % of the liquid crystal composition CLC-2, 5.2 wt % of trimethylolpropane triacrylate, 6.8 wt % of 1,4-di(4-(6-(acryloxy)hexyloxy)-benzoyloxy)-2-methylbenzene (LCA-6) as a mixture of a monomer and a liquid crystal composition, and 0.6 wt % of 2,2'-dimethoxyphenylacetophenone as a photo-polymerization initiator were mixed, to prepare a liquid crystal composition CLC-2M.

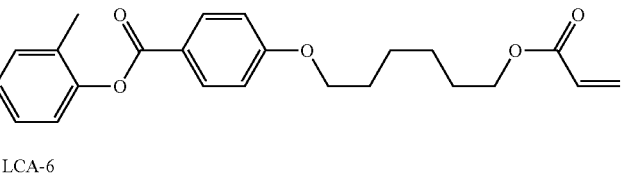

LCA-6

Preparation of Polymer/Liquid Crystal Composite Material

The liquid crystal composition CLC-2M was held between a non-aligned comb-like electrode substrate and the opposite glass substrate (without electrode) with a cell gap of 10 μm), and then the resulting liquid crystal cell was heated until the liquid crystal became isotropic phase at 49° C. In this state, the cell was irradiated with UV light of 365 nm in an intensity of 10 mW·cm$^{-2}$ for 3 min for polymerization.

The polymer/liquid crystal composite material CLC-2P thus prepared maintained an optically isotropic liquid crystal phase even being cooled to the room temperature.

Example 6

A liquid crystal cell holding the polymer/liquid crystal composite material CLC-2P obtained in Example 5 was arranged in the optical system of FIG. 2 to measure its electrooptical properties. The light source was the white light source of a polarizing microscope OPTIPHOT-PDL manufactured by Nikon. The above liquid crystal cell was arranged in the optical system in such a manner that the incident light from the light source irradiated on the liquid crystal cell was perpendicular to the surface of the liquid crystal cell, and the line direction of the comb-like electrode was at 45° with respect to the polarizer and the analyzer respectively. The relationship between the voltage applied and the transmittance was investigated at room temperature. It was found that when a rectangular wave of 70 V was applied, the transmitted light intensity was saturated.

INDUSTRIAL APPLICABILITY

This invention is applicable, for example, in the field of optical device, such as display devices using liquid crystal mediums.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A liquid crystal composition, comprising a compound of formula (1) and a chiral dopant, and exhibiting an optically isotropic liquid crystal phase:

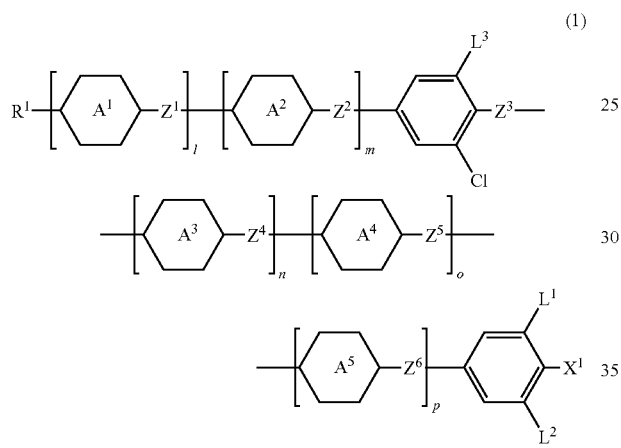

wherein in formula (1), $R^1$ is a hydrogen atom, or $C_{1-20}$ alkyl in which arbitrary —$CH_2$— may be replaced by —O—, —S—, —COO—, —OCO—, —CH=CH—, —CF=CF— or —C≡C— and arbitrary hydrogen atom may be replaced by a halogen atom or $C_{1-3}$ alkyl; the rings $A^1$, $A^2$, $A^3$, $A^4$ and $A^5$ are each independently a benzene ring, a naphthalene ring, a thiophene ring, a piperidine ring, a cyclohexene ring, a bicyclooctane ring, a tetrahydronaphthalene ring or a cyclohexane ring, and in these rings arbitrary hydrogen atom may be replaced by a halogen atom, $C_{1-3}$ alkyl, $C_{1-3}$ alkoxy or $C_{1-3}$ haloalkyl, —$CH_2$— may be replaced by —O— or —S— and —CH= may be replaced by —N=; $Z^1$, $Z^2$, $Z^3$, $Z^4$, $Z^5$ and $Z^6$ are each independently a single bond, or $C_{1-4}$ alkylene in which arbitrary —$CH_2$— may be replaced by —O—, —S—, —COO—, —OCO—, —CSO—, —OCS—, —CH=CH—, —CF=CF— or —C≡C— and arbitrary hydrogen atom may be replaced by a halogen atom; $L^1$, $L^2$ and $L^3$ are each independently a hydrogen atom or a halogen atom; $X^1$ is a hydrogen atom, a halogen atom, —C≡N, —N=C=S, —C≡C—C≡N, —$SF_5$, or $C_{1-10}$ alkyl in which —$CH_2$— may be replaced by —O—, —S—, —CH=CH— or —C≡C—, and arbitrary hydrogen atom may be replaced by a halogen atom; l, m, n, o, and p are each independently 0 or 1, and $1+m+n+o+p \leq 4$.

2. The liquid crystal composition of claim 1, wherein in formula (1), $R^1$ is $C_{1-20}$ alkyl, $C_{2-21}$ alkenyl, $C_{2-21}$ alkynyl, $C_{1-19}$ alkoxy, $C_{2-20}$ alkenyloxy, $C_{1-19}$ alkylthio, $C_{1-19}$ alkenylthio, or —$(CH_2)_v$—CH=$CF_2$ in which v is 0 or an integer of 1-19; and $X^1$ is a hydrogen atom, a halogen atom, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=CH$CH_2$F, —CH=$CHCF_3$, —$(CH_2)_2$—CH=$CF_2$, —$CH_2CH$=$CHCF_3$ or —CH=$CHCF_2CF_3$.

3. The liquid crystal composition of claim 1, wherein in formula (1), $Z^1$, $Z^2$, $Z^3$, $Z^4$, $Z^5$ and $Z^6$ are each independently a single bond, —$CH_2CH_2$—, —CH=CH—, —C≡C—, —COO—, —$CF_2$—, —$CH_2O$— or —$OCH_2$—.

4. The liquid crystal composition of claim 1, wherein the rings $A^1$, $A^2$, $A^3$, $A^4$ and $A^5$ are each independently a group represented by one of formulae (RG-1)-(RG-15), $Y^1$, $Y^2$, $Y^3$ and $Y^4$ are each independently a hydrogen atom or a halogen atom, and fn1, fn2 and fn3 are each independently 0, 1, 2 or 3:

(RG-1)

(RG-2)

(RG-3)

(RG-4)

(RG-5)

(RG-6)

(RG-7)

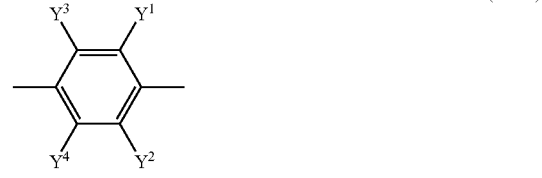
(RG-8)

(RG-9)

-continued
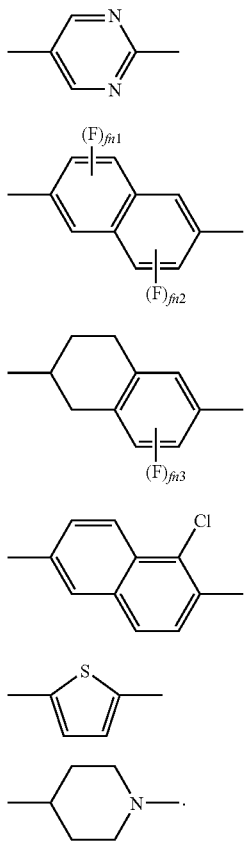
(RG-10)
(RG-11)
(RG-12)
(RG-13)
(RG-14)
(RG-15)
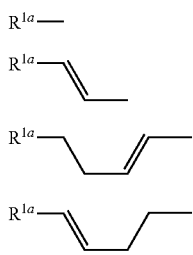
5. The liquid crystal composition of claim 1, wherein $R^1$ is a group represented by any one of formulae (CHN-1)-(CHN-19), and $R^{1a}$ is a hydrogen atom or $C_{1-20}$ alkyl,
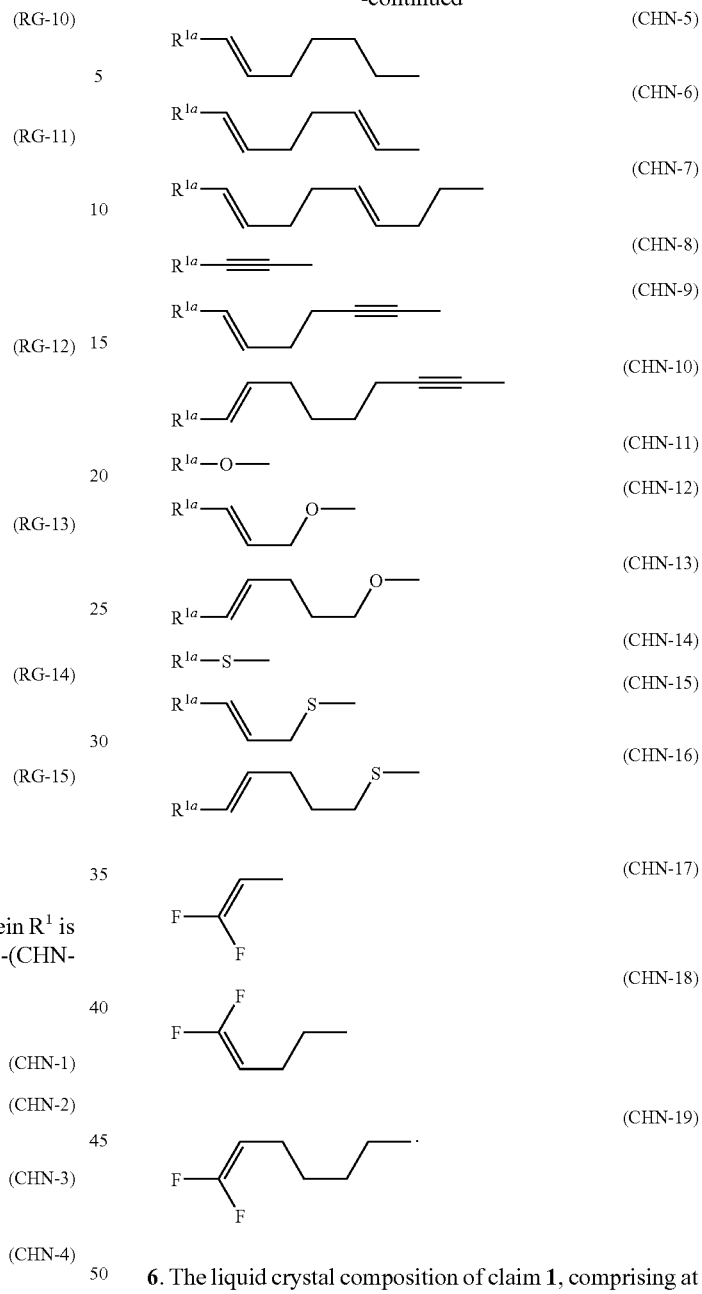
6. The liquid crystal composition of claim 1, comprising at least one compound selected from the group consisting of compounds of formulae (1-1)-(1-9):
(1-1)
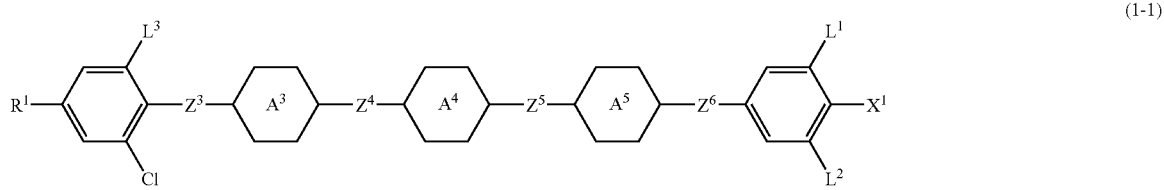

-continued

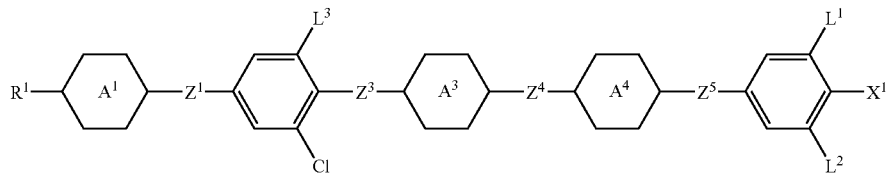
(1-2)

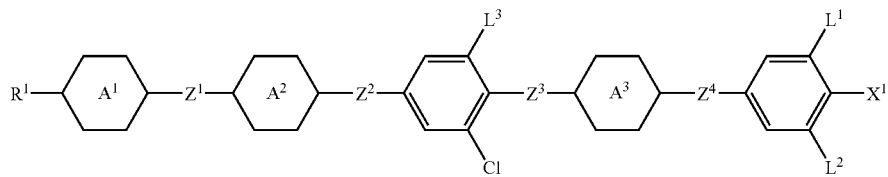
(1-3)

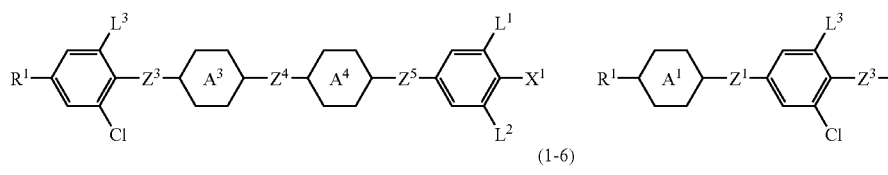
(1-4) (1-5)

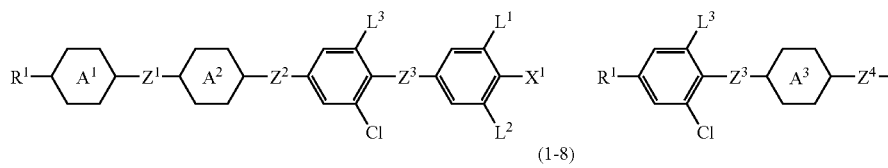
(1-6) (1-7)

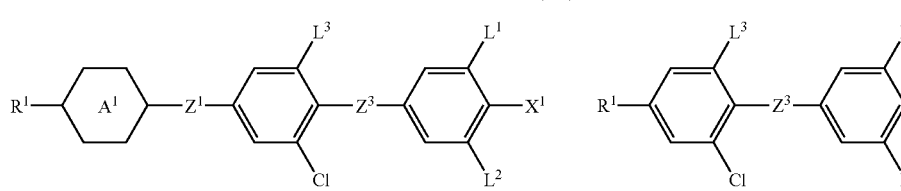
(1-8) (1-9)

wherein in these formulae, $R^1$ is a group represented by any one of formulae (CHN-1)-(CHN-19), $R^{1a}$ is a hydrogen atom or $C_{1-20}$ alkyl; the rings $A^1$, $A^2$, $A^3$, $A^4$ and $A^5$ are each independently a group represented by any one of formulae (RG-1), (RG-5), (RG-7), (RG-8-1)-(RG-8-5), (RG-9), (RG-10), (RG-11-1), (RG-13) and (RG-15); $Z^1$, $Z^2$, $Z^3$, $Z^4$, $Z^5$ $Z^6$ are each independently a single bond, —CH$_2$CH$_2$—, —CH=CH—, —C≡C—, —COO—, —CF$_2$O—, —CH$_2$O— or —OCH$_2$—; $L^1$, $L^2$ and $L^3$ are each independently a hydrogen atom, a fluorine atom or a chlorine atom; and $X^1$ is a fluorine atom, a chlorine atom, —C≡N, —CF$_3$, —CHF$_2$, —CH$_2$F, —OCF$_3$, —OCHF$_2$, —OCH$_2$F or —C=C—CF$_3$

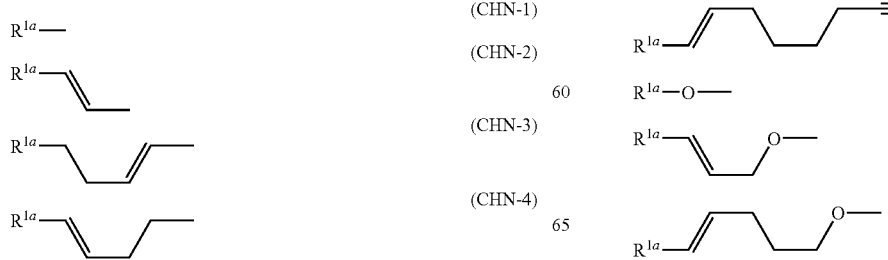

-continued

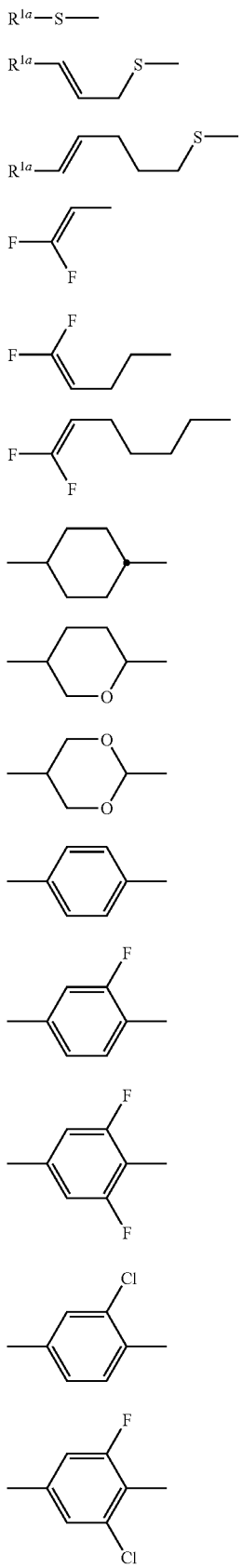

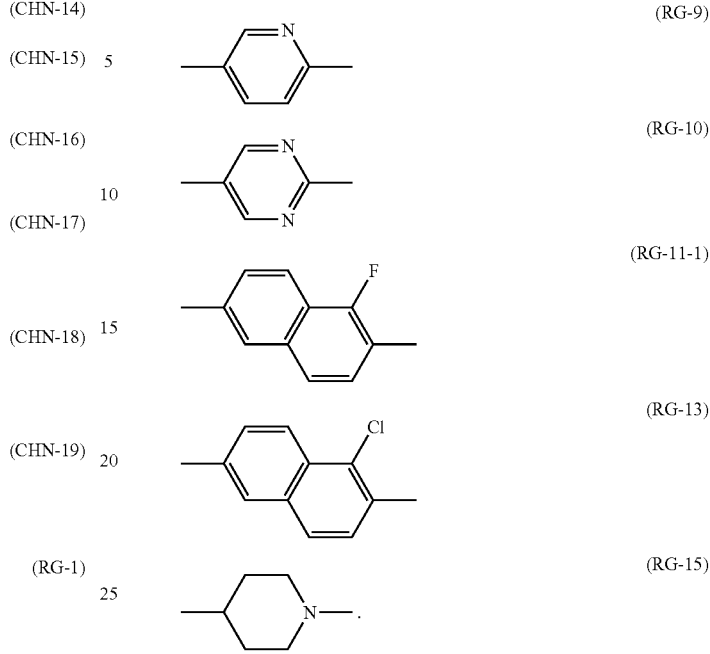

7. The liquid crystal composition of claim 6, wherein in formulae (1-1)-(1-9), at least one of $Z^1, Z^2, Z^3, Z^4, Z^5$ and $Z^6$ is —CF$_2$O—.

8. The liquid crystal composition of claim 6, wherein in formulae (1-1)-(1-9), at least one of $Z^1, Z^2, Z^3, Z^4, Z^5$ and $Z^6$ is —COO—.

9. The liquid crystal composition of claim 6, wherein in formulae (1-1)-(1-9), $R^1$ is a group represented by any one of formulae (CHN-1)-(CHN-4) and (CHN-6)-(CHN-8), and $R^{1a}$ is a hydrogen atom or $C_{1-20}$ alkyl

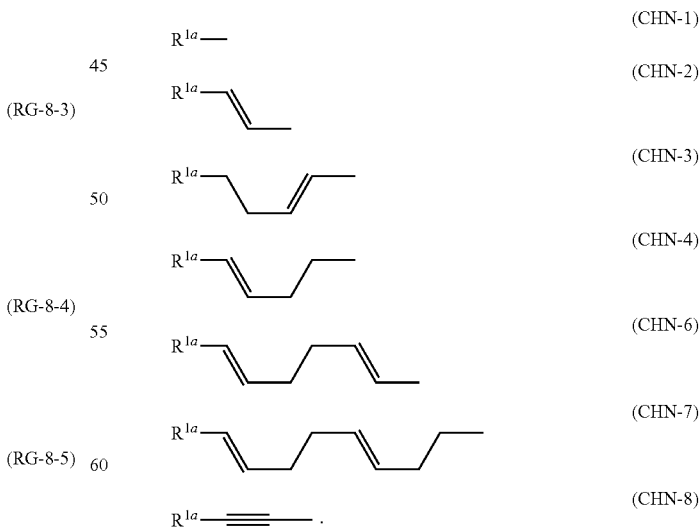

10. The liquid crystal composition of claim 1, further comprising at least one compound selected from the group consisting of compounds of formulae (2), (3) and (4):

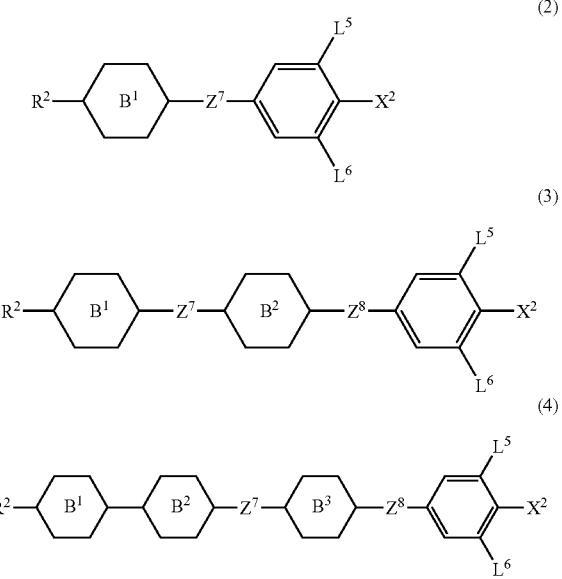

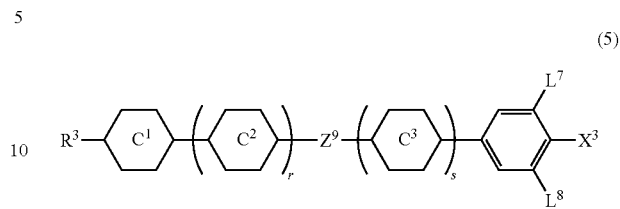

wherein in these formulae, $R^2$ is $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; $X^2$ is a fluorine atom, a chlorine atom, —$OCF_3$, —$OCHF_2$, —$CF_3$, —$CHF_2$, —$CH_2F$, —$OCF_2CHF_2$ or —$OCF_2CHFCF_3$; the rings $B^1$, $B^2$ and $B^3$ are each independently 1,4-cyclohexylene, 1,3-dioxan-2,5-diyl, pyrimidin-2,5-diyl, tetrahydropyran-2,5-diyl, 1,4-phenylene, naphthalene-2,6-diyl, 1,4-phenylene in which arbitrary hydrogen atom is replaced by a fluorine atom, or naphthalene-2,6-diyl in which arbitrary hydrogen atom is replaced by a fluorine atom or a chlorine atom; $Z^7$ and $Z^8$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^5$ and $L^6$ are each independently a hydrogen atom or a fluorine atom.

11. The liquid crystal composition of claim 1, further comprising at least one compound selected from the group consisting of compounds of formula (5):

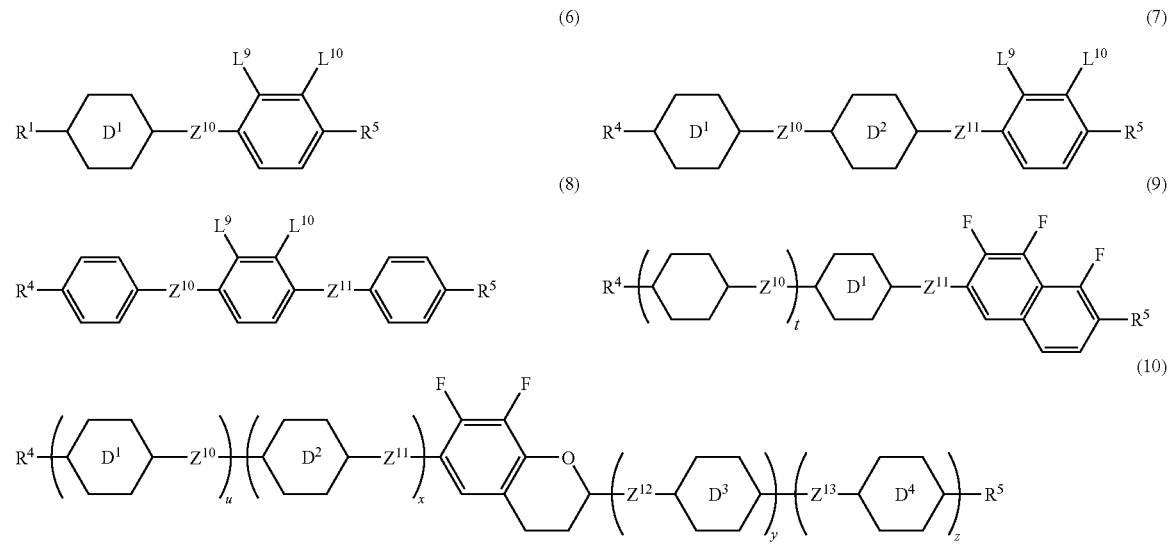

wherein in the formula, $R^3$ is $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; $X^3$ is —C≡N or —C≡C—C≡N; the rings $C^1$, $C^2$ and $C^3$ are each independently 1,4-cyclohexylene, 1,4-phenylene, 1,4-phenylene in which arbitrary hydrogen atom is replaced by a fluorine atom, naphthalene-2,6-diyl, naphthalene-2,6-diyl in which arbitrary hydrogen atom is replaced by a fluorine atom or a chlorine atom, 1,3-dioxan-2,5-diyl, tetrahydropyran-2,5-diyl or pyrimidin-2,5-diyl; $Z^9$ is —$(CH_2)_2$—, —COO—, —$CF_2O$—, —$OCF_2$—, —C≡C—, —$CH_2O$— or a single bond; $L^7$ and $L^8$ are each independently a hydrogen atom or a fluorine atom; r is 0, 1 or 2, s is 0 or 1, and r+s=0, 1 or 2.

12. The liquid crystal composition of claim 1, further comprising at least one compound selected from the group consisting of compounds of formulae (6), (7), (8), (9) and (10):

wherein in these formulae, $R^4$ and $R^5$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $D^1$, $D^2$, $D^3$ and $D^4$ are each independently 1,4-cyclohexylene, 1,4-cyclohexenylene, 1,4-phenylene, 1,4-phenylene in which arbitrary hydrogen atom is replaced by a fluorine atom, tetrahydropyran-2,5-diyl or decahydronaphthalene-2,6-diyl; $Z^{10}$, $Z^{11}$, $Z^{12}$ and $Z^{13}$ are each independently —$(CH_2)_2$—, —COO—, —$CH_2O$—, —$OCF_2$—, —$OCF_2(CH_2)_2$— or a single bond; $L^9$ and $L^{10}$ are each independently a fluorine atom or a chlorine atom; t, u, x, y and z are each independently or 1, and u+x+y+z is equal to 1 or 2.

13. The liquid crystal composition of claim 1, further comprising at least one compound selected from the group consisting of compounds of formulae (11), (12) and (13):

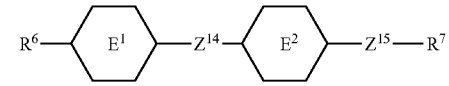
(11)

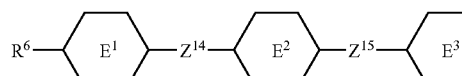
(12)

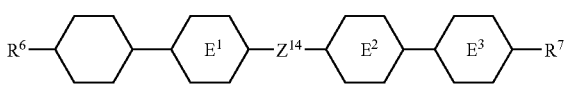
(13)

wherein in these formulae, $R^6$ and $R^7$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

14. The liquid crystal composition of claim 10, further comprising at least one compound selected from the group consisting of compounds of formula (5):

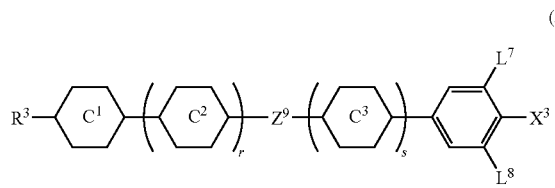
(5)

wherein in the formula, $R^3$ is $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; $X^3$ is —C≡N or —C≡C—C≡N; the rings $C^1$, $C^2$ and $C^3$ are each independently 1,4-cyclohexylene, 1,4-phenylene, 1,4-phenylene in which arbitrary hydrogen atom is replaced by a fluorine atom, naphthalene-2,6-diyl, naphthalene-2,6-diyl in which arbitrary hydrogen atom is replaced by a fluorine atom or a chlorine atom, 1,3-dioxan-2,5-diyl, tetrahydropyran-2,5-diyl or pyrimidin-2,5-diyl; $Z^9$ is —(CH$_2$)$_2$—, —COO—, —CF$_2$O—, —OCF$_2$—, —C≡C—, —CH$_2$O— or a single bond; $L^7$ and $L^8$ are each independently a hydrogen atom or a fluorine atom; r is 0, 1 or 2, s is 0 or 1, and r+s=0, 1 or 2.

15. The liquid crystal composition of claim 10, further comprising at least one compound selected from the group consisting of compounds of formulae (11), (12) and (13):

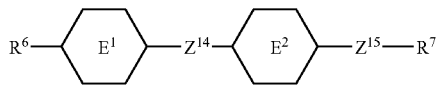
(11)

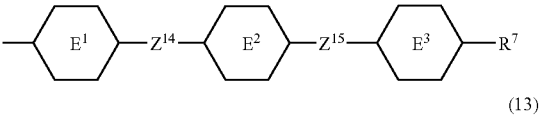
(12)

(13)

wherein in these formulae, $R^6$ and $R^7$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

16. The liquid crystal composition of claim 11, further comprising at least one compound selected from the group consisting of compounds of formulae (11), (12) and (13):

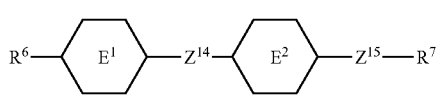
(11)

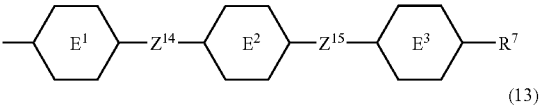
(12)

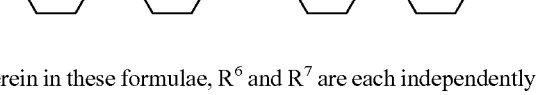
(13)

wherein in these formulae, $R^6$ and $R^7$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

17. The liquid crystal composition of claim 12, further comprising at least one compound selected from the group consisting of compounds of formulae (11), (12) and (13):

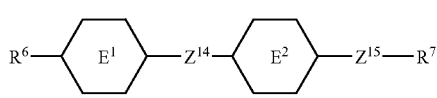
(11)

-continued

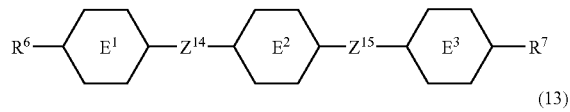
(12)

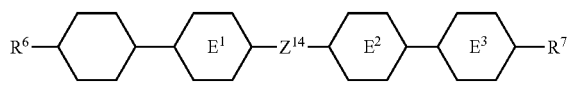
(13)

wherein in these formulae, $R^6$ and $R^7$ are each independently $C_{1-10}$ alkyl or $C_{2-10}$ alkenyl, and in the alkyl or alkenyl arbitrary hydrogen atom may be replaced by a fluorine atom and arbitrary —$CH_2$— may be replaced by —O—; the rings $E^1$, $E^2$ and $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —($CH_2)_2$—, —CH=CH— or a single bond.

18. The liquid crystal composition of claim 1, further comprising at least one compound selected from the group consisting of compounds of formulae (15), (16), (17) and (18):

nylene in which arbitrary hydrogen atom is replaced by a fluorine atom or a chlorine atom, or naphthalene-2,6-diyl in which arbitrary hydrogen atom is replaced by a fluorine atom or a chlorine atom; $Z^{16}$, $Z^{17}$ and $Z^{18}$ are each independently —($CH_2)_2$—, —($CH_2)_4$—, —COO—, —$CF_2O$—, —$OCF_2$—, —CH=CH—, —C≡C—, —$CH_2O$— or a single bond; $L^{11}$ and $L^{12}$ are each independently a hydrogen atom or a fluorine atom.

19. The liquid crystal composition of claim 1, further comprising at least one compound selected from the group consisting of compounds of formula (19):

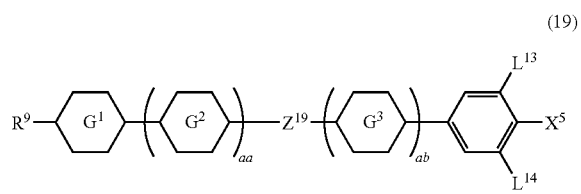
(19)

wherein in this formula, $R^9$ is $C_{1-10}$ alkyl, $C_{2-10}$ alkenyl or $C_{2-10}$ alkynyl, and in the alkyl, alkenyl or alkynyl arbitrary

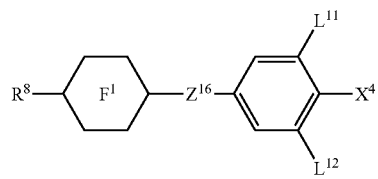
(15)

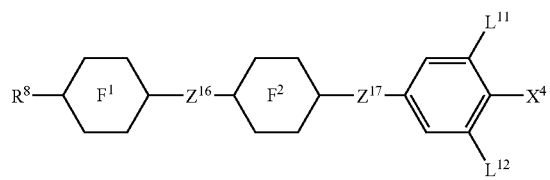
(16)

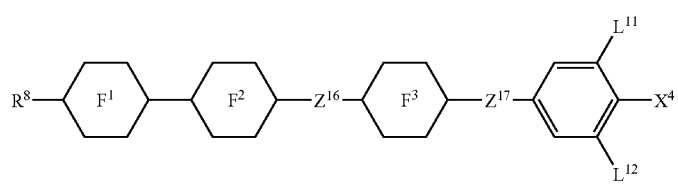
(17)

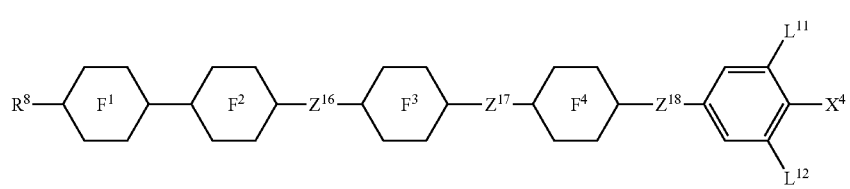
(18)

wherein in these formulae, $R^8$ is $C_{1-10}$ alkyl, $C_{2-10}$ alkenyl or $C_{2-10}$ alkynyl, and in the alkyl, alkenyl or alkynyl arbitrary hydrogen atom may be replaced by a fluorine atom and arbitrary —$CH_2$— may be replaced by —O—; $X^4$ is a fluorine atom, a chlorine atom, —$SF_5$, —$OCF_3$, —$OCHF_2$, —$CF_3$, —$CHF_2$, —$CH_2F$, —$OCF_2CHF_2$ or —$OCF_2CHFCF_3$; the rings $F^1$, $F^2$, $F^3$ and $F^4$ are each independently 1,4-cyclohexylene, 1,3-dioxan-2,5-diyl, pyrimidin-2,5-diyl, tetrahydropyran-2,5-diyl, 1,4-phenylene, naphthalene-2,6-diyl, 1,4-phehydrogen atom may be replaced by a fluorine atom and arbitrary —$CH_2$— may be replaced by —O—; $X^5$ is —C≡N, —N=C=S or —C≡C—C≡N; the rings $G^1$, $G^2$ and $G^3$ are each independently 1,4-cyclohexylene, 1,4-phenylene, 1,4-phenylene in which arbitrary hydrogen atom is replaced by a fluorine atom or a chlorine atom, naphthalene-2,6-diyl, naphthalene-2,6-diyl in which arbitrary hydrogen atom is replaced by a fluorine atom or a chlorine atom, 1,3-dioxan-2,5-diyl, tetrahydropyran-2,5-diyl or pyrimidin-2,5-diyl; $Z^{19}$ is —(CH$_2$)$_2$—, —COO—, —CF$_2$O—, —OCF$_2$—, —C≡C—, —CH$_2$O— or a single bond; L$^{13}$ and L$^{14}$ are each independently a hydrogen atom or a fluorine atom; aa is 0, 1 or 2, ab is 0 or 1, and aa+ab is equal to 0, 1 or 2.

20. The liquid crystal composition of claim 1, further comprising at least one antioxidant, at least one ultraviolet absorbent, or at least one antioxidant and at least one ultraviolet absorbent.

21. The liquid crystal composition of claim 1, wherein the optically isotropic liquid crystal phase does not exhibit two or more colors of diffracted light.

22. The liquid crystal composition of claim 1, wherein the optically isotropic liquid crystal phase exhibits two or more colors of diffracted light.

23. The liquid crystal composition of claim 21, which is obtained by adding a chiral dopant to a composition having a temperature difference of 3-150° C. between an upper-limit temperature and a lower-limit temperature of co-existence of a chiral nematic phase and an isotropic phase.

24. The liquid crystal composition of claim 22, which is obtained by adding a chiral dopant to a composition having a temperature difference of 3-150° C. between an upper-limit temperature and a lower-limit temperature of co-existence of a chiral nematic phase and an isotropic phase.

25. The liquid crystal composition of claim 21, which is obtained by adding a chiral dopant to a composition having a temperature difference of 5-150° C. between an upper-limit temperature and a lower limit temperature of co-existence of a chiral nematic phase and an isotropic phase.

26. The liquid crystal composition of claim 22, which is obtained by adding a chiral dopant to a composition having a temperature difference of 5-150° C. between an upper-limit temperature and a lower limit temperature of co-existence of a chiral nematic phase and an isotropic phase.

27. The liquid crystal composition of claim 21, which is obtained by adding a chiral dopant to a composition having a temperature difference of 3-150° C. between an upper-limit temperature and a lower limit temperature of co-existence of a nematic phase and an isotropic phase.

28. The liquid crystal composition of claim 22, which is obtained by adding a chiral dopant to a composition having a temperature difference of 3-150° C. between an upper-limit temperature and a lower-limit temperature of co-existence of a nematic phase and an isotropic phase.

29. The liquid crystal composition of claim 1, wherein a content of the chiral dopant is 1-40 wt % relative to a total weight of the liquid crystal composition.

30. The liquid crystal composition of claim 1, wherein a content of the chiral dopant is 5-15 wt % relative to a total weight of the liquid crystal composition.

31. The liquid crystal composition of claim 29, which exhibits a chiral nematic phase at any temperature within the range of 70° C. to –20° C. and has a pitch of 700 nm or less at a temperature within at least a part of the range of 70° C. to –20° C.

32. The liquid crystal composition of claim 29, wherein the chiral dopant comprises at least one compound selected from the group consisting of compounds of formulae (K1)-(K5):

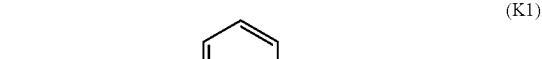
(K1)

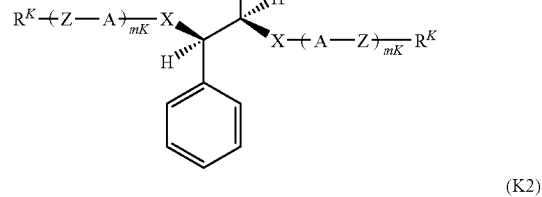
(K2)

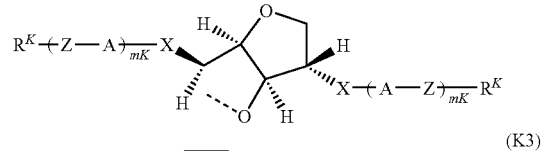
(K3)

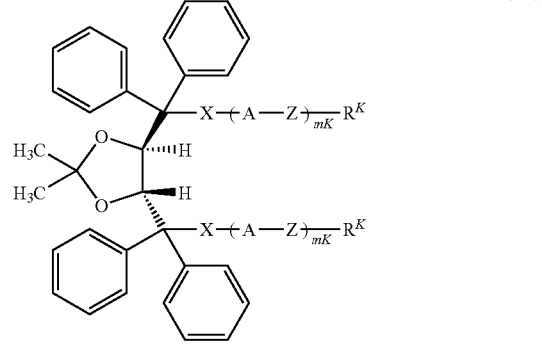
(K4)

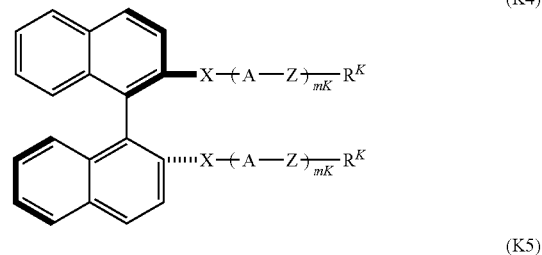
(K5)

wherein in formulae (K1)-(K5), each R$^K$ is independently a hydrogen atom, a halogen atom, —C≡N, —N=C=O, —N=C=S, or C$_{1-20}$ alkyl in which arbitrary —CH$_2$— may be replaced by —O—, —S—, —COO—, —OCO—, —CH=CH—, —CF=CF— or —C≡C— and arbitrary hydrogen atom may be replaced by a halogen atom; each A is independently an aromatic or non-aromatic three- to eight-membered ring, or a fused ring of 9 or more carbons, and in these rings arbitrary hydrogen atom may be replaced by a halogen atom, $C_{1-3}$ alkyl or $C_{1-3}$ haloalkyl, —$CH_2$— may be replaced by —O—, —S— or —NH—, and —CH= may be replaced by —N=; each Z is independently a single bond, or $C_{1-8}$ alkylene wherein arbitrary —$CH_2$— may be replaced by —O—, —S—, —COO—, —OCO—, —CSO—, —OCS—, —N=N—, —CH=N—, —N=CH—, —CH=CH—, —CF=CF— or —C≡C— and arbitrary hydrogen atom may be replaced by a halogen atom;

X is a single bond, —COO—, —OCO—, —$CH_2O$—, —$OCH_2$—, —$CF_2O$—, —$OCF_2$— or —$CH_2CH_2$—; and mK is an integer of 1-4.

33. The liquid crystal composition of claim 29, wherein the chiral dopant comprises at least one compound selected from the group consisting of compounds of formulae (K2-1)-(K2-8) and (K5-1)-(K5-3):

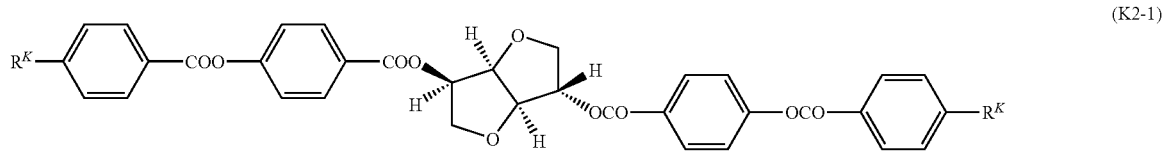
(K2-1)

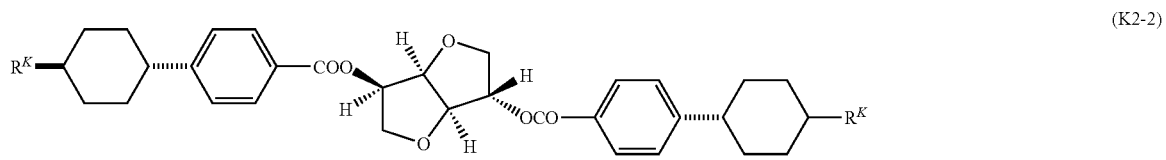
(K2-2)

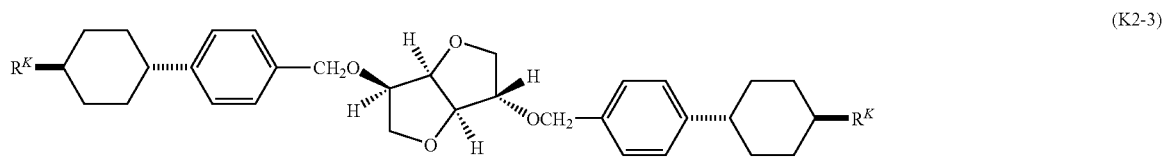
(K2-3)

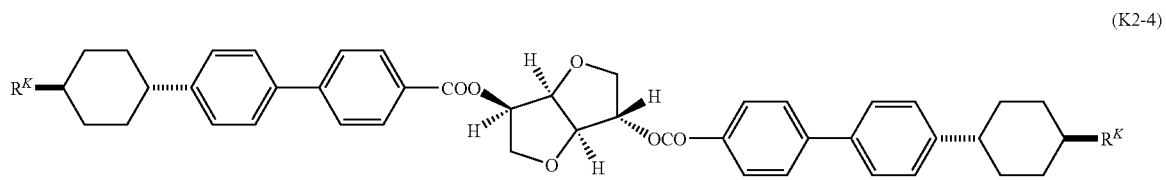
(K2-4)

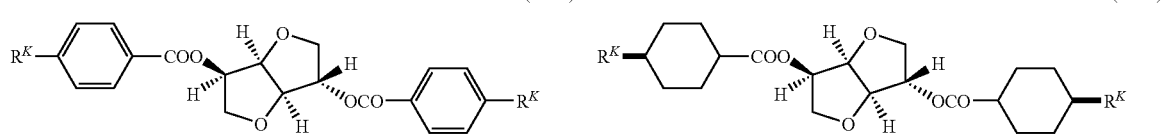
(K2-5) (K2-6)

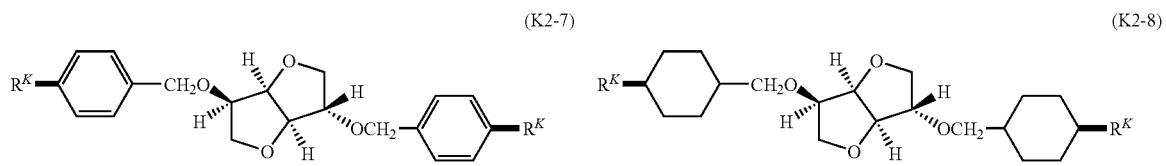
(K2-7) (K2-8)

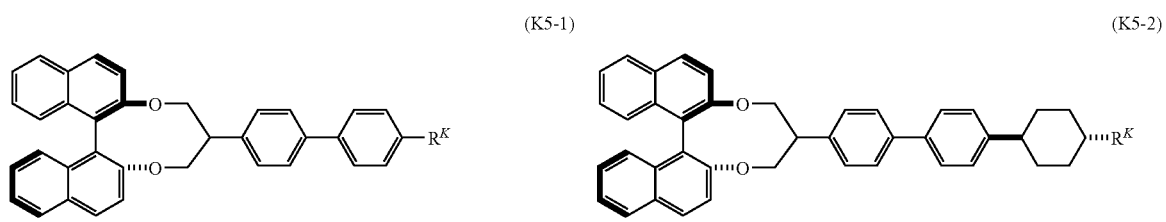
(K5-1) (K5-2)

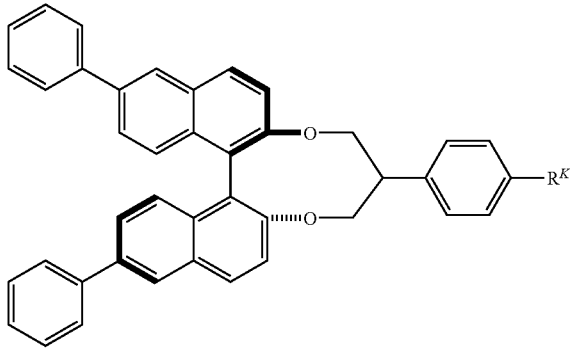

(K5-3)

wherein each $R^K$ is independently $C_{3-10}$ alkyl, wherein the —$CH_2$— adjacent to a ring may be replaced by —O— and arbitrary —$CH_2$— may be replaced by —CH=CH—.

34. A mixture, comprising the liquid crystal composition of claim 1, and a polymerizable monomer.

35. The mixture of claim 34, wherein the polymerizable monomer is a photo-polymerizable monomer or a thermo-polymerizable monomer.

36. A polymer/liquid crystal composite material, obtained by polymerizing the mixture of claim 34, for use in a device driven in an optically isotropic liquid crystal phase.

37. The polymer/liquid crystal composite material of claim 36, obtained by polymerizing the mixture in an isotropic phase or in an optically isotropic liquid crystal phase.

38. The polymer/liquid crystal composite material of claim 36, wherein the polymer has mesogen moieties.

39. The polymer/liquid crystal composite material of claim 36, wherein the polymer has a cross-linked structure.

40. The polymer/liquid crystal composite material of claim 36, wherein a content of the liquid crystal composition is 60-99 wt % and a content of the polymer is 1-40 wt %.

41. An optical device, comprising: two substrates, electrodes disposed on a surface of one or both of the substrates, a liquid crystal medium disposed between the two substrates and electric field applying means for applying an electric field to the liquid crystal medium via the electrodes, wherein the liquid crystal medium is the liquid crystal composition of claim 29.

42. An optical device, comprising: two substrates, electrodes disposed on a surface of one or both of the substrates, a liquid crystal medium disposed between the two substrates and electric field applying means for applying an electric field to the liquid crystal medium via the electrodes, wherein the liquid crystal medium is the polymer/liquid crystal composite material of claim 36.

43. An optical device, comprising: two substrates with one or both thereof disposed with electrodes thereon and at least one thereof being transparent, a liquid crystal medium disposed between the two substrates, a polarizer disposed on an outer side of the substrates, and electric field applying means for applying an electric field to the liquid crystal medium via the electrodes, wherein the liquid crystal medium is the liquid crystal composition of claim 29.

44. An optical device, comprising: two substrates with one or both thereof disposed with electrodes thereon and at least one thereof being transparent, a liquid crystal medium disposed between the two substrates, a polarizer disposed on an outer side of the substrates, and electric field applying means for applying an electric field to the liquid crystal medium via the electrodes, wherein the liquid crystal medium is the polymer/liquid crystal composite material of claim 36.

45. The optical device of claim 43, wherein on at least one of the two substrates, the electrodes are constructed in a manner such that the electric field is applied in at least two directions.

46. The optical device of claim 44, wherein on at least one of the two substrates, the electrodes are constructed in a manner such that the electric field is applied in at least two directions.

47. The optical device of claim 43, wherein the two substrates are arranged parallel to each other, and on one or both of the two substrates, the electrodes are constructed in a manner such that the electric field is applied in at least two directions.

48. The optical device of claim 44, wherein the two substrates are arranged parallel to each other, and on one or both of the two substrates, the electrodes are constructed in a manner such that the electric field is applied in at least two directions.

49. The optical device of claim 41, wherein the electrodes are disposed in a matrix form to form pixel electrodes, and each pixel is provided with an active device being a thin film transistor (TFT).

50. The optical device of claim 42, wherein the electrodes are disposed in a matrix form to form pixel electrodes, and each pixel is provided with an active device being a thin film transistor (TFT).

* * * * *